US010917936B2

(12) United States Patent
Sakamoto et al.

(10) Patent No.: US 10,917,936 B2
(45) Date of Patent: Feb. 9, 2021

(54) COMMUNICATION APPARATUS AND COMMUNICATION METHOD USING AGGREGATE PHYSICAL LAYER CONVERGENCE PROTOCOL DATA UNIT

(71) Applicant: Panasonic Intellectual Property Corporation of America, Torrance, CA (US)

(72) Inventors: Takenori Sakamoto, Kanagawa (JP); Masataka Irie, Kanagawa (JP); Hiroyuki Motozuka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/366,338

(22) Filed: Mar. 27, 2019

(65) Prior Publication Data

US 2019/0223253 A1 Jul. 18, 2019

Related U.S. Application Data

(63) Continuation of application No. PCT/JP2017/033393, filed on Sep. 15, 2017.

(30) Foreign Application Priority Data

Oct. 21, 2016 (JP) ................................. 2016-207310

(51) Int. Cl.
*H04W 80/08* (2009.01)
*H04W 72/04* (2009.01)
(Continued)

(52) U.S. Cl.
CPC ............. *H04W 80/08* (2013.01); *H04L 1/009* (2013.01); *H04L 1/0079* (2013.01);
(Continued)

(58) Field of Classification Search
CPC . H04W 80/08; H04W 28/06; H04W 72/0446; H04W 72/1278; H04W 74/0808;
(Continued)

(56) References Cited

U.S. PATENT DOCUMENTS 7,743,310 B2 * 6/2010 Nishibayashi ........ H04W 99/00 714/776
8,437,317 B2 * 5/2013 Jang ........................ H04L 47/10 370/336
(Continued)

FOREIGN PATENT DOCUMENTS

EP 3306883 A1 4/2018
EP 3425956 A1 1/2019
(Continued)

OTHER PUBLICATIONS

The Extended European Search Report dated Oct. 1, 2019 for the related European Patent Application No. 17862482.1.
(Continued)

*Primary Examiner* — Ian N Moore
*Assistant Examiner* — Latresa A McCallum
(74) *Attorney, Agent, or Firm* — Seed IP Law Group LLP

(57) ABSTRACT

A communication apparatus includes: a PPDU generation circuit that sets a time equal to or greater than a total of a non-legacy STF, a non-legacy CEF, multiple non-legacy header fields, and multiple data fields as a nominal data field length, computes a nominal data octet size based on the nominal data field length, stores the nominal data octet size in a legacy header, and sets an Additional PPDU field in the legacy header to 0; a signal processing circuit that forms an A-PPDU in the nominal data field length or less; and a transmission circuit that transmits the A-PPDU.

8 Claims, 69 Drawing Sheets

(51) Int. Cl.

| | |
|---|---|
| ***H04L 5/00*** | (2006.01) |
| ***H04W 28/06*** | (2009.01) |
| ***H04W 74/08*** | (2009.01) |
| ***H04L 27/26*** | (2006.01) |
| ***H04W 72/12*** | (2009.01) |
| ***H04L 1/00*** | (2006.01) |
| ***H04L 1/16*** | (2006.01) |
| ***H04W 84/12*** | (2009.01) |
| ***H04L 29/08*** | (2006.01) |
| ***H04W 80/02*** | (2009.01) |
| *H04B 7/0413* | (2017.01) |
| *H04L 1/18* | (2006.01) |

(52) U.S. Cl.

CPC .......... *H04L 1/1621* (2013.01); *H04L 5/0055* (2013.01); *H04L 27/2602* (2013.01); *H04L 27/2695* (2013.01); *H04L 29/08* (2013.01); *H04W 28/06* (2013.01); *H04W 72/0446* (2013.01); *H04W 72/1278* (2013.01); *H04W 74/0808* (2013.01); *H04W 80/02* (2013.01); *H04W 84/12* (2013.01); *H04B 7/0413* (2013.01); *H04L 1/1848* (2013.01); *H04L 5/0023* (2013.01); *H04L 5/0048* (2013.01); *H04L 5/0053* (2013.01)

(58) Field of Classification Search

CPC .... H04W 80/02; H04W 84/12; H04L 1/0079; H04L 1/009; H04L 1/1621; H04L 5/0055; H04L 27/2602; H04L 27/2695; H04L 29/08; H04L 1/1848; H04L 5/0023; H04L 5/0048; H04L 5/0053; H04B 7/0413

See application file for complete search history.

(56) References Cited

U.S. PATENT DOCUMENTS

| | | | | |
|---|---|---|---|---|
| 2015/0319782 A1* | 11/2015 | Chu | ...................... | H04L 1/1671 370/336 |
| 2016/0309457 A1 | 10/2016 | Eitan et al. | | |

FOREIGN PATENT DOCUMENTS

| | | | |
|---|---|---|---|
| EP | 3522407 | A1 | 8/2019 |
| WO | 2016/129201 | A1 | 8/2016 |

OTHER PUBLICATIONS

International Search Report of PCT application No. PCT/JP2017/033393 dated Nov. 28, 2017.

IEEE 802.11-15/01358r5, "Specification Framework for TGay", Apr. 19, 2016.

IEEE Std 802.11ad-2012, IEEE Standard for Information Technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, p. 237(9.13a DMGA-PPDU operation).

* cited by examiner

COMMUNICATION APPARATUS AND COMMUNICATION METHOD USING AGGREGATE PHYSICAL LAYER CONVERGENCE PROTOCOL DATA UNIT

BACKGROUND

1. Technical Field

The present disclosure relates to wireless communication, and more specifically, relates to an apparatus and a method of configuring an aggregate PPDU (physical layer convergence protocol (PLCP) protocol data unit) to communicate in a wireless communication system.

2. Description of the Related Art

Interest in millimeter-wave networks using the license-free 60 GHz band is deepening. Wireless Hi-Definition (HD) technology is the industry's first wireless communication standard that uses the 60 GHz band, enabling wireless streaming of high-definition audio, video, and data at several gigabits per second between consumer electronic devices, personal computers, and mobile devices.

Another wireless communication technology that performs processing in the 60 GHz band is the WiGig technology, which is being standardized by the Institute of Electrical and Electronic Engineers (IEEE) as the IEEE 802.11ad standard.

WiGig technology is able to use a standard bandwidth of 2.16 GHz to thereby provide a physical-layer data transmission speed up to a maximum of 6.7 Gbps. WiGig technology supports both single-carrier (SC) modulation and orthogonal frequency-division multiplexing (OFDM) modulation.

Also, to improve the transmission efficiency, WiGig technology supports an aggregate physical layer convergence protocol data unit (Aggregate-PPDU; hereinafter designated "A-PPDU") (see IEEE 802.11ad-2012 P237 9.13a DMG A-PPDU operation). A-PPDU is a technology that transmits without providing inter-frame spacing (IFS) or a preamble between two or more PPDUs. Note that in the case in which the A-PPDU is used in WiGig technology, an aggregate MAC protocol data unit (Aggregate-MPDU; A-MPDU) is used in each PPDU forming the A-PPDU.

At this point, the IEEE 802.11ay task group is aiming to achieve up to double-digit Gbps physical-layer data transmission speeds by combining MIMO technology as next-generation enhanced directional multi-gigabit (EDMG) WiGig technology with channel bonding technology, while also maintaining backwards compatibility with the existing (that is, legacy) WiGig technology (see 11-15-1358-05-00ay Spec Framework).

SUMMARY

To improve the transmission efficiency in IEEE 802.11ay, it is desirable to support technology (hereinafter designated "EDMG A-PPDU") that transmits without providing IFS or a preamble between two or more EDMG PPDUs, but in communication using EDMG A-PPDU, there are no considerations regarding how to define an access control method capable of maintaining backwards compatibility with legacy WiGig devices.

In one general aspect, the techniques disclosed here feature a communication apparatus including: a PPDU generation circuit that, with respect to an aggregate physical layer convergence protocol data unit (A-PPDU) including a legacy STF, a legacy CEF, a legacy header field, a non-legacy STF, a non-legacy CEF, multiple non-legacy header fields, and multiple data fields, sets a nominal data octet size computed on a basis of a nominal data field length in the legacy header field, and sets an Additional PPDU field included in the legacy header field to 0; a signal processing circuit that forms the A-PPDU in the nominal data field length or less; and a transmission circuit that transmits the formed A-PPDU, wherein the nominal data field length is a time equal to or greater than a total of the non-legacy STF, the non-legacy CEF, the multiple non-legacy header fields, and the multiple data fields.

In the case of using the access control method of the present disclosure, an EDMG A-PPDU capable of maintaining backwards compatibility with legacy WiGig technology may be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, various embodiments of the present disclosure will be described in detail and with reference to the attached drawings. In the following description, for the sake of clarity and brevity, a detailed description of publicly available functions and configurations incorporated into this specification will be omitted.

Figure 1:
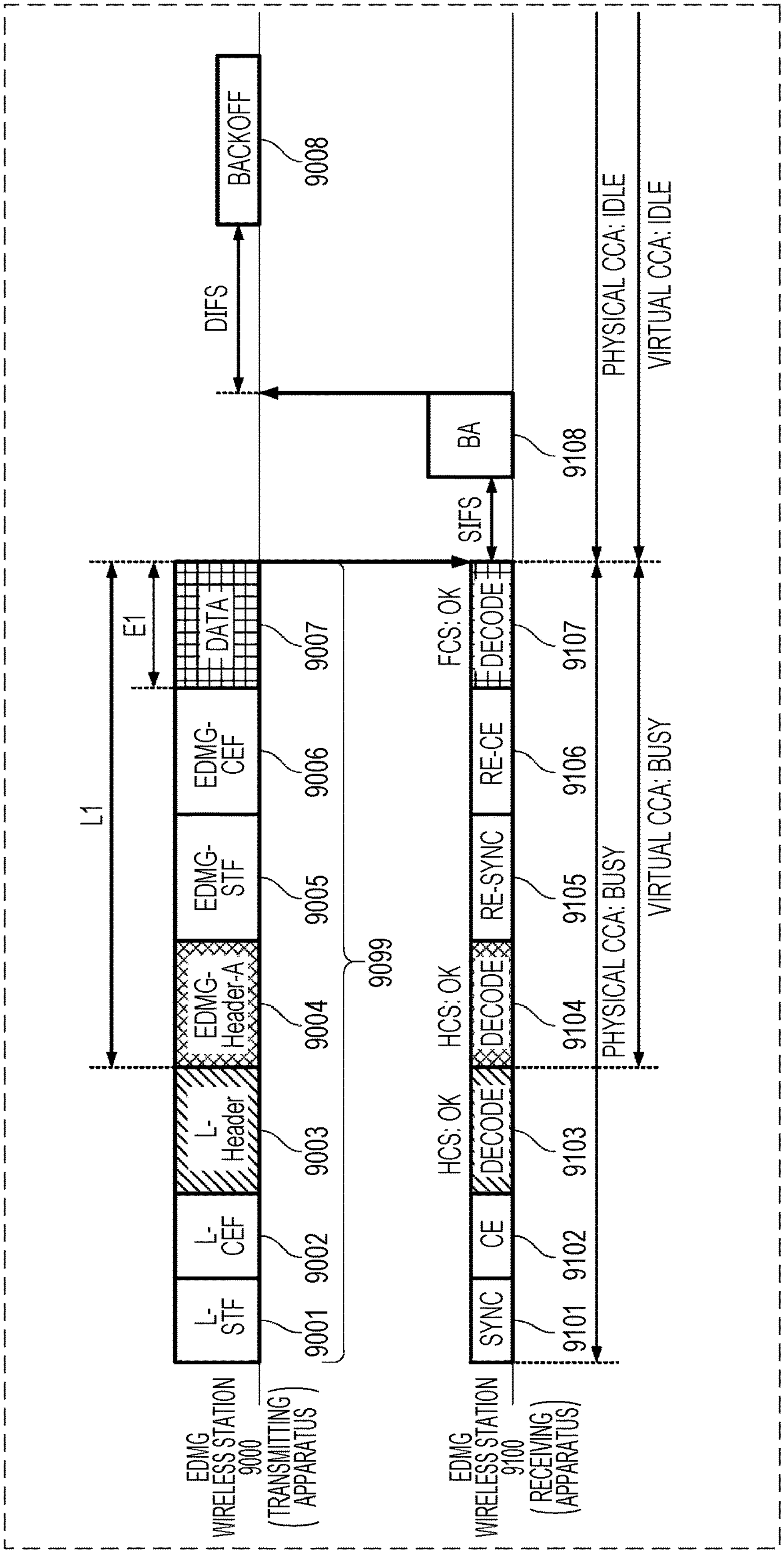
FIG. 1 is a diagram illustrating one example of a process of a transmission source EDMG wireless station and a destination EDMG wireless station when receiving correctly in communication using EDMG PPDU presupposed by the present disclosure.

FIG. 1 is a diagram illustrating one example of a process of a transmission source EDMG wireless station 9000 and a destination EDMG wireless station 9100 in communication using EDMG PPDU presupposed by the present disclosure. In FIG. 1, the transmission source EDMG wireless station 9000 transmits an EDMG PPDU 9099 to the destination EDMG wireless station 9100.

The EDMG PPDU 9099 includes an L-STF 9001, an L-CEF 9002, an L-Header 9003, an EDMG-Header-A 9004, an EDMG-STF 9005, an EDMG-CEF 9006, and Data 9007. Note that the EDMG-STF 9005 and the EDMG-CEF 9006 are fields that exist then the EDMG PPDU 9099 is transmitted using MIMO technology or channel bonding technology.

The transmission source EDMG wireless station 9000 executes the following process in the transmission of the EDMG PPDU 9099.

The transmission source EDMG wireless station 9000 takes into account that a legacy wireless station not illustrated does not support the EDMG PPDU, or in other words, that a legacy wireless station will interpret the fields from the EDMG-Header-A 9004 as data fields, and causes a legacy wireless station to process the EDMG PPDU 9099 as a typical legacy PPDU. For this purpose, the transmission source EDMG wireless station 9000 converts the field length L1 time on the wireless channel of the combined fields of the EDMG-Header-A 9004, the EDMG-STF 9005, the EDMG-CEF 9006, and the Data 9007 to an octet size D1 on the basis of a predetermined calculation method, and sets the size in the Length field of the L-Header 9003. With this arrangement, the legacy wireless station is able to process the combined fields of the EDMG-Header-A 9004, the EDMG-STF 9005, the EDMG-CEF 9006, and the Data 9007 as a nominal data field.

The transmission source EDMG wireless station 9000 provides an EDMG Indication field in the L-Header 9003 and sets the field to 1 to indicate that the EDMG-Header-A 9004 exists in the EDMG PPDU 9099.

The transmission source EDMG wireless station 9000 provides a Length field in the EDMG-Header-A 9004, and sets the field to the octet size E1 of the Data 9007.

The destination EDMG wireless station 9100 executes the following process on the received EDMG PPDU 9099.

First, the destination EDMG wireless station 9100 uses the L-STF 9001 to execute a synchronization process 9101.

Next, the destination EDMG wireless station 9100 uses the L-CEF 9002 to execute channel estimation (CE) 9102. The destination EDMG wireless station 9100 is able to use the channel estimation result in a process of equalizing the fields from the L-Header 9003.

Next, the destination EDMG wireless station 9100 executes decoding 9103 of the L-Header 9003. In the decoding 9103, in the case in which an error is not detected by the header check sequence (HCS), the destination EDMG wireless station 9100 understands that the EDMG-Header-A 9004 exists in the EDMG PPDU 9099. Also, since the destination EDMG wireless station 9100 understands that the size of the nominal data field for the legacy wireless station is D1 octets, the destination EDMG wireless station 9100 converts D1 to the nominal data field length L1 according to a predetermined calculation method, and sets a virtual clear channel assessment (CCA) to busy for the duration of the L1 time. Herein, the virtual CCA is a function that virtually determines that the usage state of a wireless channel is busy on the basis of the nominal data field length.

Next, the destination EDMG wireless station 9100 executes decoding 9104 of the EDMG-Header-A 9004. In the decoding 9104, in the case in which an error is not detected by the HCS, the destination EDMG wireless station 9100 understands that the size of the Data 9007 is E3 octets.

Next, the destination EDMG wireless station 9100 uses the EDMG-STF 9005 to execute a re-synchronization process 9105.

Next, the destination EDMG wireless station 9100 uses the EDMG-CEF 9006 to execute channel re-estimation (re-CE) 9106 to equalize the data field transmitted using MIMO technology or channel bonding technology.

Next, the destination EDMG wireless station 9100 executes decoding 9107 of the Data 9007 in accordance with the set value (E1) of the Length field of the EDMG-Header-A 9004.

In the decoding 9107, in the case in which the destination EDMG wireless station 9100 does not detect an error by the FCS in the one or more MPDUs included in the Data 9007, the destination EDMG wireless station 9100, after standing by for the SIFS, transmits a block Ack (BA) 9108 to the transmission source EDMG wireless station 9000.

If the BA 9108 is received correctly, to obtain the right to transmit the next packet, the transmission source EDMG wireless station 9000 stands by for the duration of the DIFS, and then starts a backoff control 9008.

Figure 2:
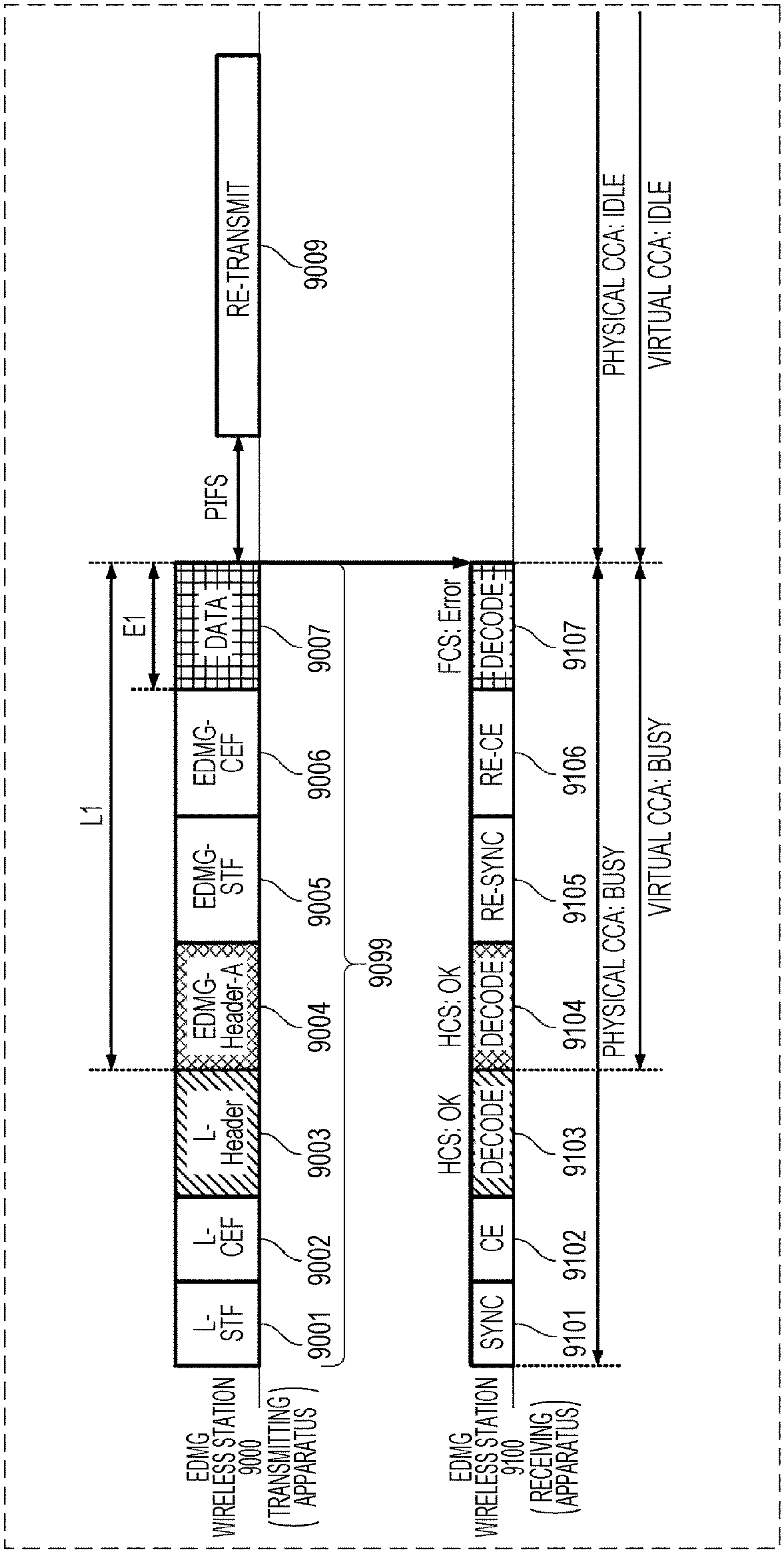
FIG. 2 is a diagram illustrating one example of a process of a transmission source EDMG wireless station and a destination EDMG wireless station when an FCS error occurs in communication using EDMG PPDU presupposed by the present disclosure.
Figure 3:
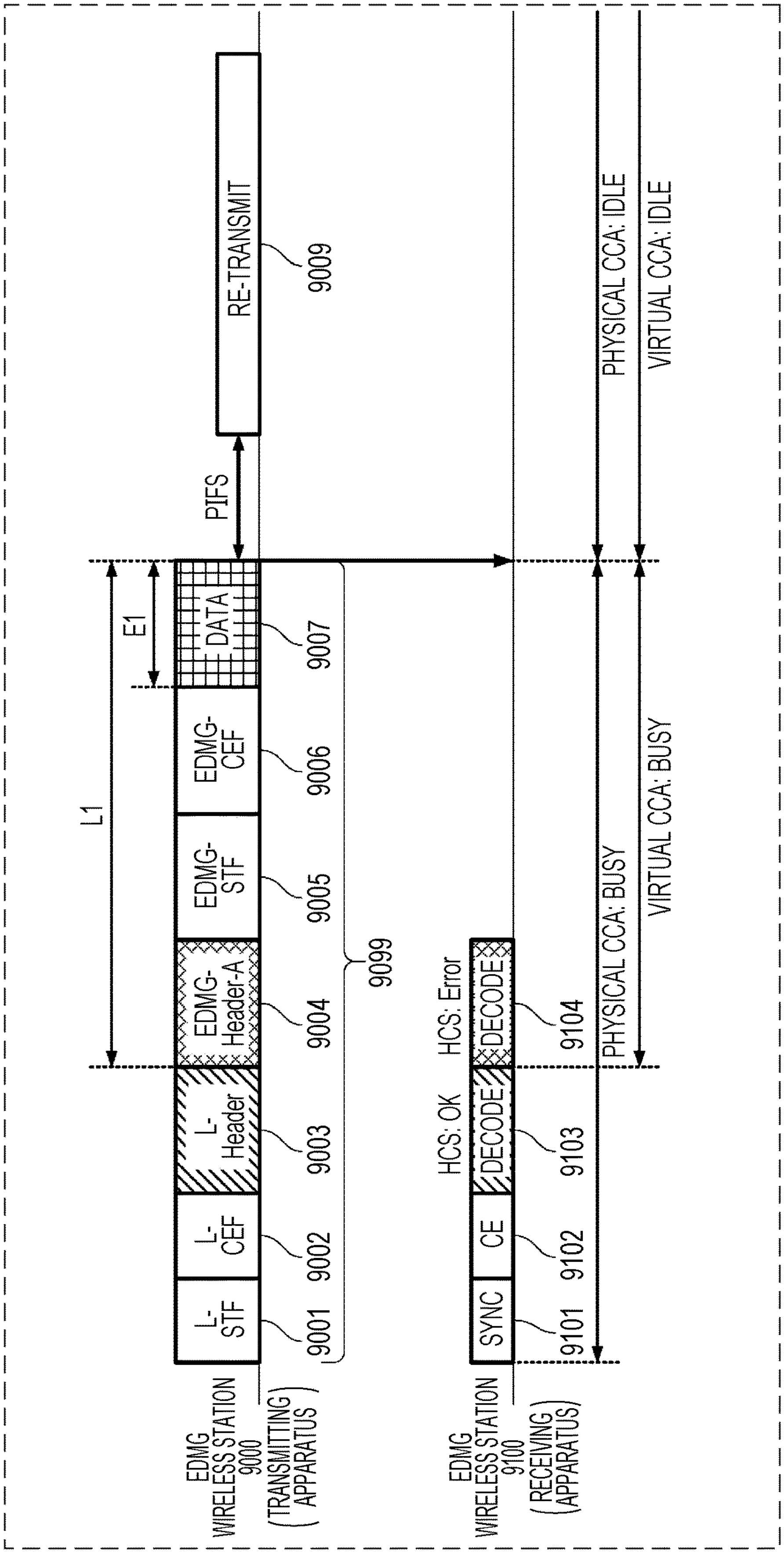
FIG. 3 is a diagram illustrating one example of a process of a transmission source EDMG wireless station and a destination EDMG wireless station when an HCS error occurs in the EDMG-Header-A in communication using EDMG PPDU presupposed by the present disclosure.

Note that in the case in which the destination EDMG wireless station 9100 detects an error by the frame check sequence (FCS) in all of the MPDUs in the decoding 9107 (see FIG. 2), or in the case of detecting an error by the HCS in the decoding 9104 (see FIG. 3), or in other words, in the case of detecting an error in the EDMG-Header-A 9004, since the size of the data field is not understood, the destination EDMG wireless station 9100 may have difficulty receiving the Data 9007 correctly, and the destination EDMG wireless station 9100 may not transmit the BA 9108. In this case, since the transmission source EDMG wireless station 9000 does not receive the BA 9108 within the point IFS (PIFS) from the completion of transmitting the EDMG PPDU 9099, the transmission source EDMG wireless station 9000 determines that the EDMG PPDU 9099 did not reach the destination EDMG wireless station 9100 correctly, and executes a re-transmission 9009 of the EDMG PPDU 9099.

Note that, although not illustrated, in the case in which the transmission source EDMG wireless station 9000 receives the BA 9108 and determines that re-transmission is necessary, the transmission source EDMG wireless station 9000 stands by for the duration of the SIFS or stands by for the duration of the DIFS after the completion of receiving the BA 9108, then executes the backoff control, and then re-transmits.

Note that the backoff control is a control in which, since when a wireless channel is released, the wireless stations that had been on standby while the wireless channel was in use would start transmitting all at once, to alleviate the extremely high probability of packets colliding on the wireless channel, a random number (backoff) is produced in each wireless station from when the wireless channel is released, and transmission is put on standby according to the produced random number.

Figure 4:
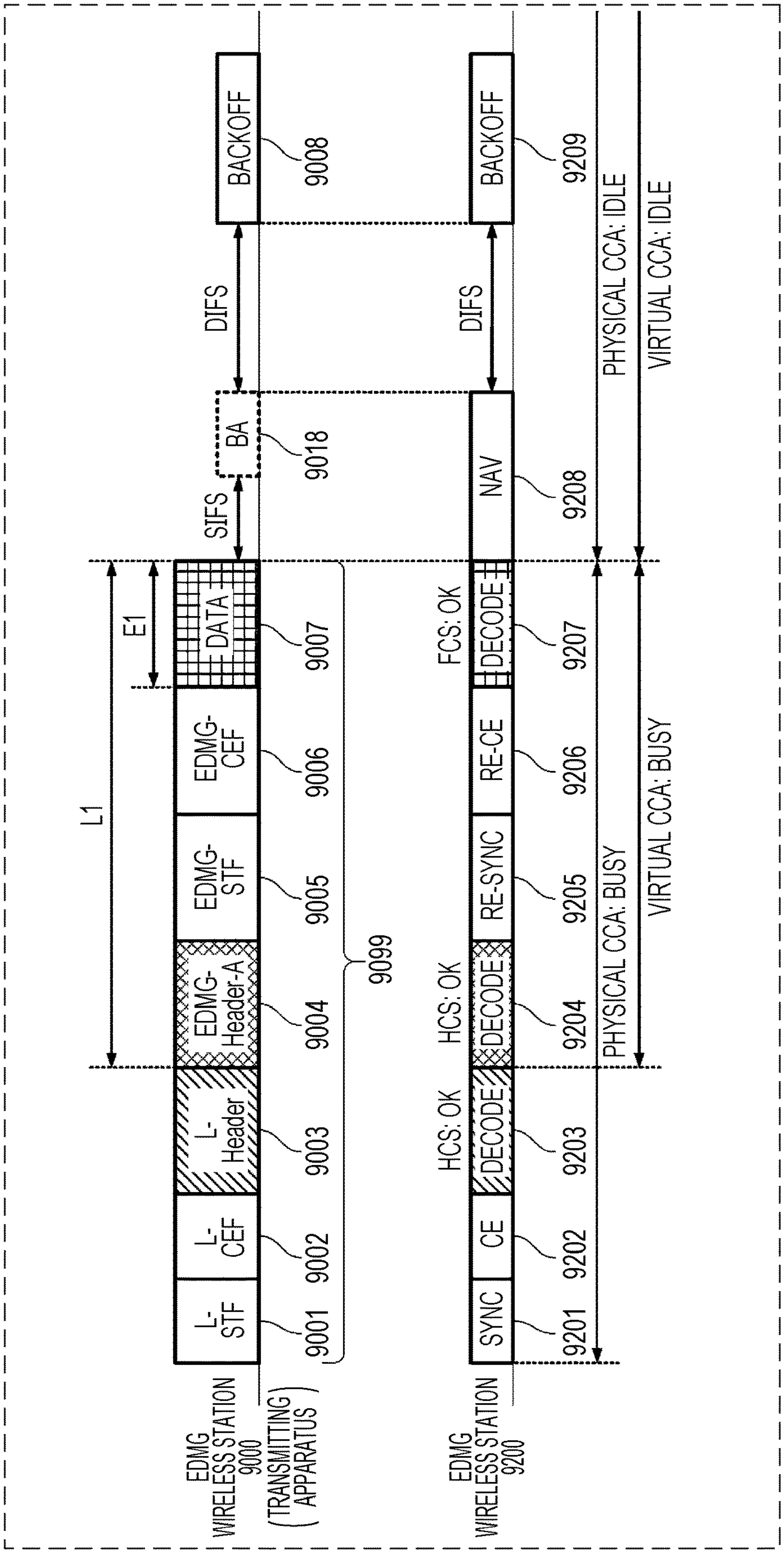
FIG. 4 is a diagram illustrating one example of a process of a transmission source EDMG wireless station and a non-destination EDMG wireless station when receiving correctly in communication using EDMG PPDU presupposed by the present disclosure.

FIG. 4 is a diagram illustrating one example of a process of a transmission source EDMG wireless station 9000 and a non-destination EDMG wireless station 9200 in communication using EDMG PPDU presupposed by the present disclosure. In FIG. 4, assume that the transmission source EDMG wireless station 9000 has transmitted the EDMG PPDU 9099 to the destination EDMG wireless station 9100 in FIG. 1, and has received the BA 9108 from the destination EDMG wireless station 9100 correctly, while the non-destination EDMG wireless station 9200 is not a destination station of the EDMG PPDU 9099, but is in an environment where the EDMG PPDU 9099 is receivable.

The non-destination EDMG wireless station 9200 executes a process similar to the destination EDMG wireless station 9100 in FIG. 1 on the received EDMG PPDU 9099, but the processing after the decoding 9207 is different from the destination EDMG wireless station 9100. Specifically, in the case in which an error is not detected by the FCS for the one or more MPDUs in the decoding 9207, the non-destination EDMG wireless station 9200 understands that the EDMG PPDU 9099 is not addressed to the non-destination EDMG wireless station 9200 itself, and sets a network allocation vector (NAV) 9208 after changing the physical CCA or the virtual CCA from busy to idle. When the NAV 9208 ends, to obtain the right to transmit a packet, the non-destination EDMG wireless station 9200 stands by for the duration of the DIFS, and then starts a backoff control 9209. Herein, the physical CCA is a function that determines the usage state of a wireless channel on the basis of a detected level of the received signal power, while the value of the NAV is designated by a Duration/ID field in the MAC header of the Data 9007, and in FIG. 4, is taken to be NAV=SIFS+the time on the wireless channel of BA 9108.

Figure 5:
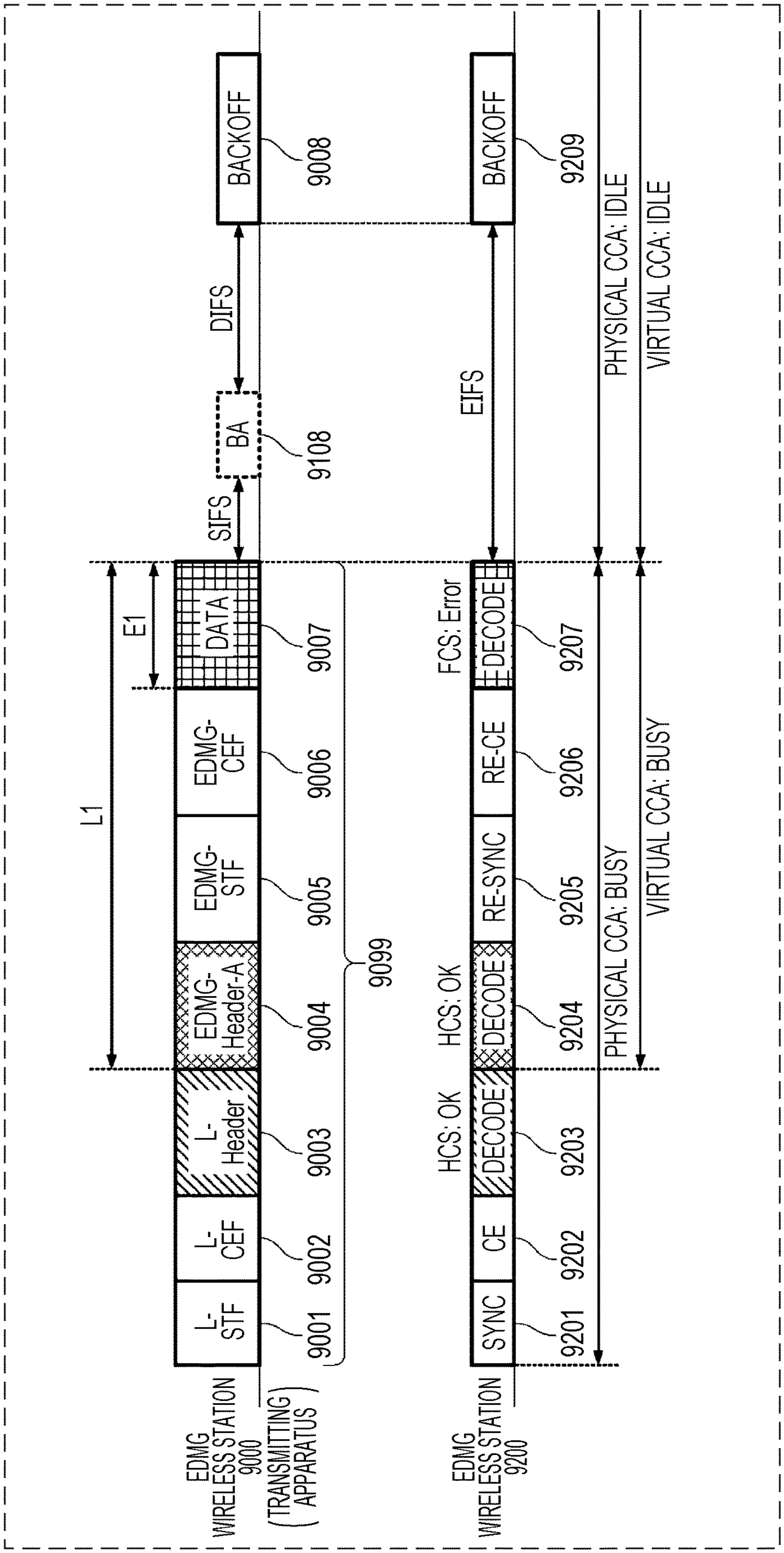
FIG. 5 is a diagram illustrating one example of a process of a transmission source EDMG wireless station and a non-destination EDMG wireless station when an FCS error occurs in communication using EDMG PPDU presupposed by the present disclosure.
Figure 6:
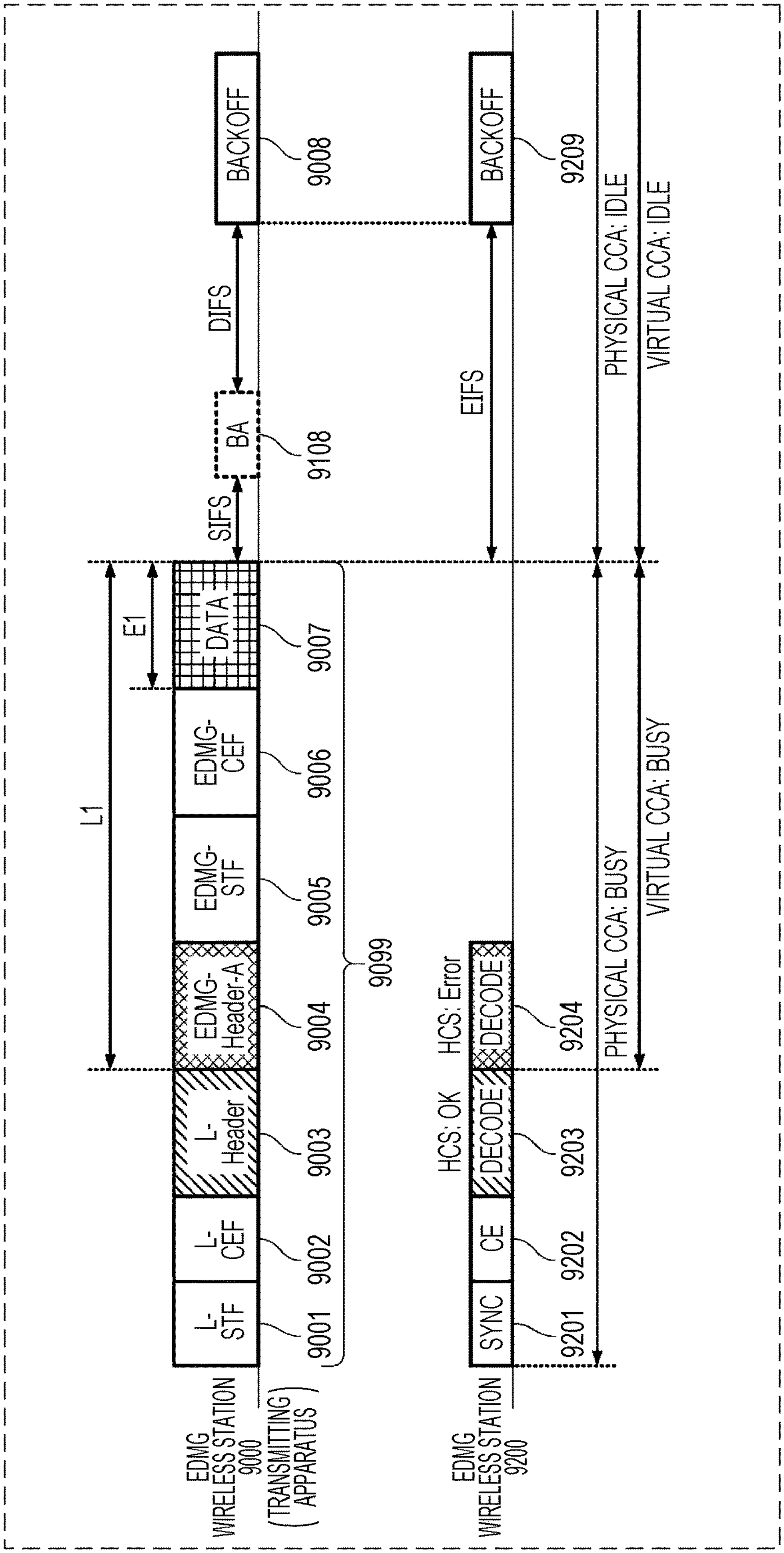
FIG. 6 is a diagram illustrating one example of a process of a transmission source EDMG wireless station and a non-destination EDMG wireless station when an HCS error occurs in the EDMG-Header-A in communication using EDMG PPDU presupposed by the present disclosure.

Note that in the case in which the non-destination EDMG wireless station 9200 detects an error by the FCS in all of the MPDUs in the decoding 9207 (see FIG. 5), or in the case of detecting an error by the HCS in the decoding 9204 (see FIG. 6), after the physical CCA or the virtual CCA changes from busy to idle, the non-destination EDMG wireless station 9200 stands by for the duration of an extended IFS (EIFS), and then starts the backoff control 9209. Herein, EISF=SIFS+the time on the wireless channel of the BA 9108+DIFS.

Figure 7:
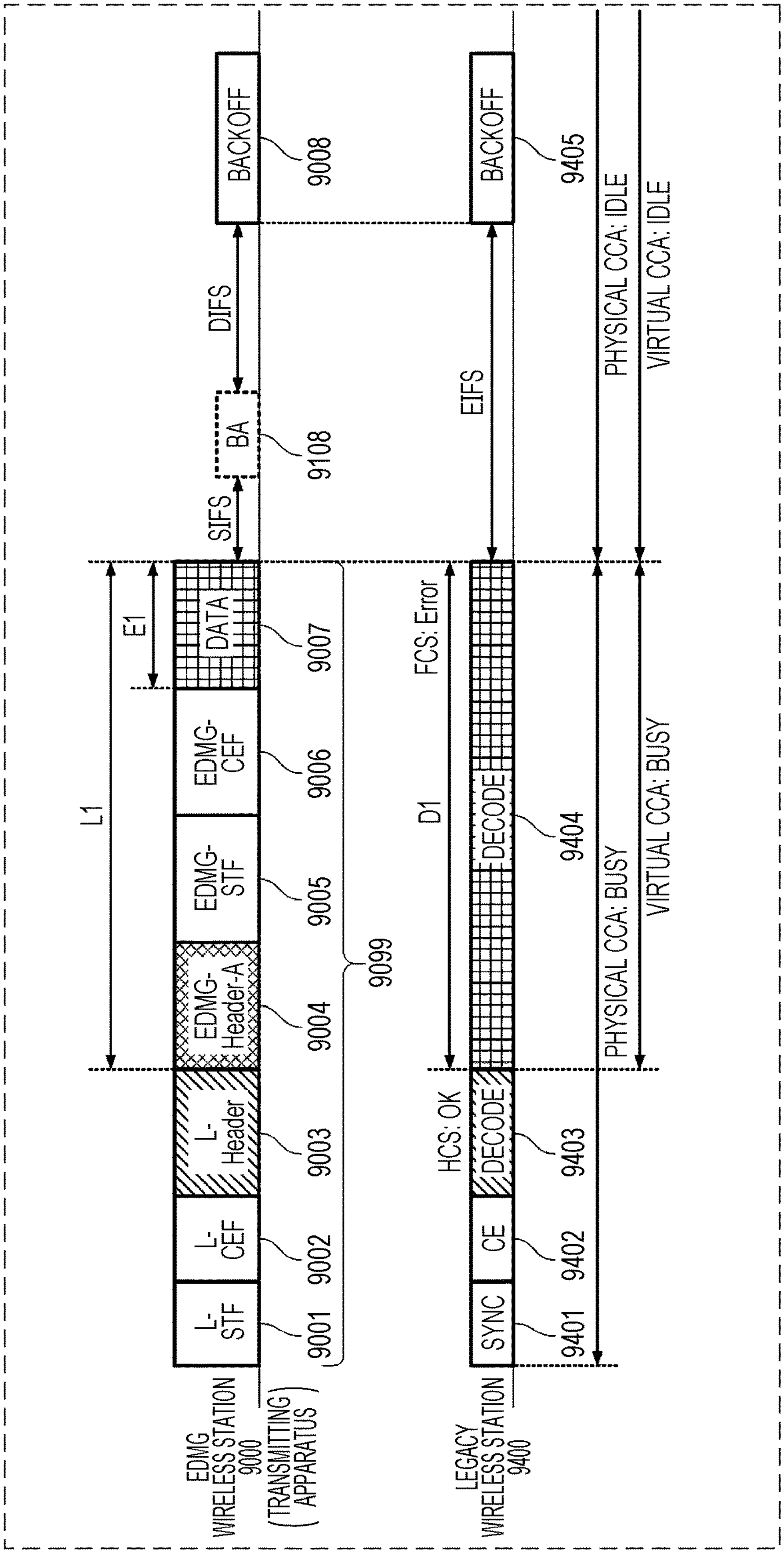
FIG. 7 is a diagram illustrating one example of a process of a transmission source EDMG wireless station and a Legacy EDMG wireless station in communication using EDMG PPDU presupposed by the present disclosure.

FIG. 7 is a diagram illustrating one example of a process of a transmission source EDMG wireless station 9000 and a legacy wireless station 9400 in communication using EDMG PPDU presupposed by the present disclosure. In FIG. 7, assume that the transmission source EDMG wireless station 9000 has transmitted the EDMG PPDU 9099 to the destination EDMG wireless station 9100 in FIG. 1, and has received the BA 9108 from the destination EDMG wireless station 9100 correctly, while the legacy wireless station 9400 is not a destination station of the EDMG PPDU 9099, but is in an environment where the EDMG PPDU 9099 is receivable.

As described earlier, the legacy wireless station 9400 does not support the EDMG PPDU, and therefore receives the EDMG PPDU 9099 as a typical legacy PPDU. In other words, the legacy STA 9400 executes a synchronization process 9401 and channel estimation (CE) 9402, followed by decoding 9403 of the L-Header 9003. In the decoding 9403, in the case in which an error is not detected by the HCS, the legacy wireless station 9400 is able to learn the size D1 of the nominal data field from the Length field.

Subsequently, the legacy wireless station 9400 executes decoding 9404 treating the fields from the EDMG-Header-A 9004 as a data field of the size D1 octets. Since the legacy wireless station 9400 also decodes the EDMG-Header-A 9004, the EDMG-STF 9005, and the EDMG-CEF 9006 in addition to the original data field, namely Data 9007, it is highly probable that an error will be detected by the FCS in all of the MPDUs.

In the case in which an error is detected in the decoding 9404, after the physical CCA or the virtual CCA changes from busy to idle, the legacy wireless station 9400 stands by for the duration of the EIFS, and then starts a backoff control 9405.

Embodiment 1

Figure 8:
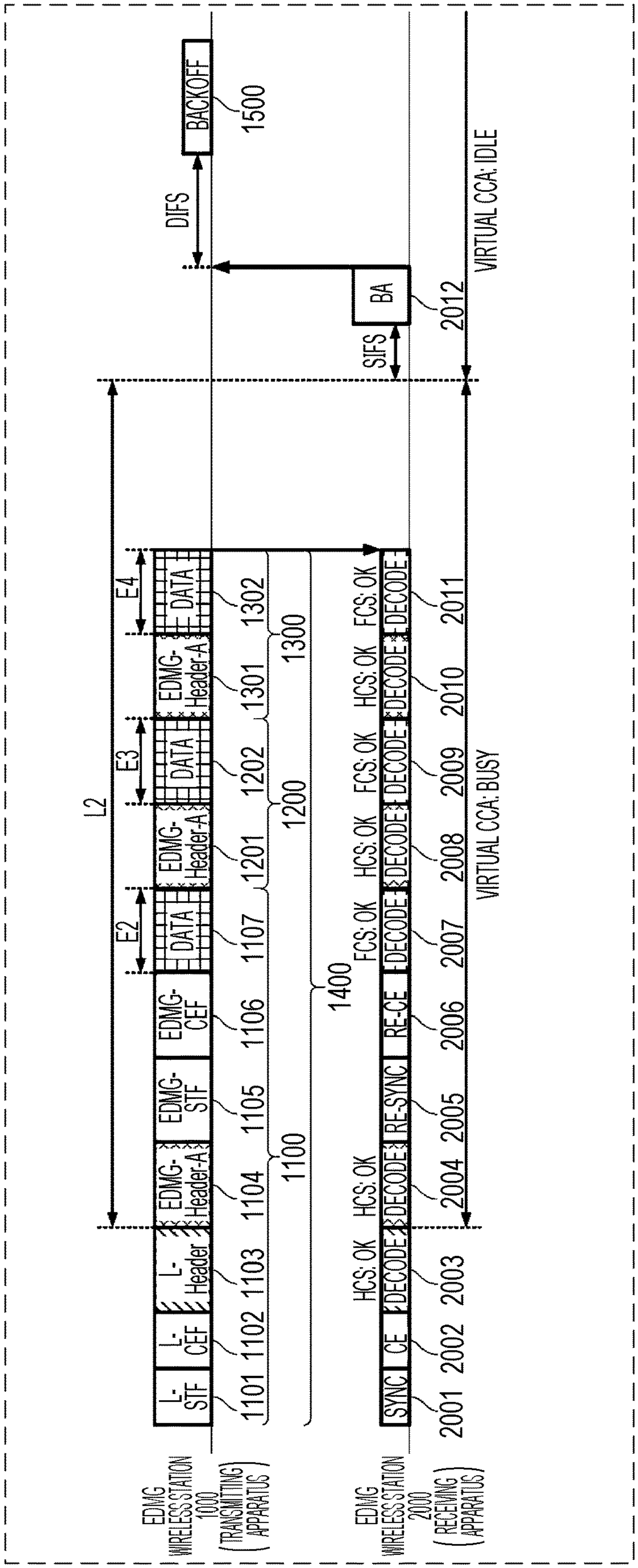
FIG. 8 is a diagram illustrating one example of a process of a transmission source EDMG wireless station and a destination EDMG wireless station when receiving correctly according to Embodiment 1.

FIG. 8 is a diagram illustrating one example of fields transmitted by a transmission source EDMG wireless station 1000 and a process in a destination EDMG wireless station 2000 in communication using EDMG A-PPDU according to Embodiment 1. The transmission source EDMG wireless station 1000 transmits an EDMG A-PPDU 1400 to the destination EDMG wireless station 2000.

The EDMG A-PPDU 1400 includes a first EDMG PPDU 1100, a second EDMG PPDU 1200, and a third EDMG PPDU 1300.

The first EDMG PPDU 1100 includes an L-STF 1101, an L-CEF 1102, an L-Header 1103, an EDMG-Header-A 1104, an EDMG-STF 1105, an EDMG-CEF 1106, and Data 1107. The second EDMG PPDU 1200 includes an EDMG-Header-A 1201 and Data 1202. The third EDMG PPDU 1300 includes an EDMG-Header-A 1301 and Data 1302.

The transmission source EDMG wireless station 1000 executes the following process in the transmission of the EDMG A-PPDU 1400.

The transmission source EDMG wireless station 1000 takes into account that a legacy wireless station not illustrated does not support the EDMG PPDU and the EDMG A-PPDU, and to cause a legacy wireless station to process the EDMG A-PPDU 1400 as a single legacy PPDU, sets an Additional PPDU field in the L-Header 1103 to 0.

Also, the transmission source EDMG wireless station 1000 sets any time L2 equal to or greater than the total field length on the wireless channel of the combined fields of the EDMG-Header-A 1104, the EDMG-STF 1105, the EDMG-CEF 1106, the Data 1107, the EDMG-Header-A 1201, the Data 1202, the EDMG-Header-A 1301, and the Data 1302 as a nominal data field length. The transmission source EDMG wireless station 1000 converts the nominal data field length L2 to a nominal data octet size D2 on the basis of a predetermined calculation method, and sets the size in the Length field of the L-Header 1103.

The transmission source EDMG wireless station 1000 does not transmit newly aggregated EDMG PPDUs over an amount of time exceeding the nominal data field length L2.

With this arrangement, the transmission source EDMG wireless station 1000 is able to inform the legacy wireless station of the nominal data octet size D2.

The transmission source EDMG wireless station 1000 sets the octet size E2 of the Data 1107 in the Length field of the EDMG-Header-A 1104, sets the octet size E3 of the Data 1202 in the Length field of the EDMG-Header-A 1201, and sets the octet size E4 of the Data 1302 in the Length field of the EDMG-Header-A 1301.

The transmission source EDMG wireless station 1000 sets an EDMG Indication field to 1 in the L-Header 1103 to indicate that the EDMG-Header-A exists in each EDMG PPDU forming the EDMG A-PPDU 1400.

To indicate that the first EDMG PPDU 1100, the second EDMG PPDU 1200, and the third EDMG PPDU 1300 are aggregated, the transmission source EDMG wireless station 1000 provides an Additional PPDU field in the EDMG-Header-A 1104, the EDMG-Header-A 1201, and the EDMG-Header-A 1301, sets the Additional PPDU field to 1 in the EDMG-Header-A 1104 and the EDMG-Header-A 1201, and sets the Additional PPDU field to 0 in the EDMG-Header-A 1301.

The destination EDMG wireless station 2000 executes the following process on the received EDMG A-PPDU 1400.

First, the destination EDMG wireless station 2000 uses the L-STF 1101 to execute a synchronization process 2001.

Next, the destination EDMG wireless station 2000 uses the L-CEF 1102 to execute channel estimation (CE) 2002. The destination EDMG wireless station 2000 is able to use the channel estimation result in a process of equalizing the fields from the L-Header 1103.

Next, the destination EDMG wireless station 2000 performs a decoding process 2003 of the L-Header 1103. In the decoding 2003, in the case in which an error is not detected by the HCS, the destination EDMG wireless station 2000 determines that the EDMG-Header-A 1104 exists in the EDMG A-PPDU 1400, and acquires the nominal data field size D2 octets for a legacy wireless station. For this reason, the destination EDMG wireless station 2000 converts the nominal data field size D2 to the nominal data field length L2 according to a predetermined calculation method, and for the duration of the L2 time, sets the virtual CCA to busy.

Next, the destination EDMG wireless station 2000 executes decoding 2004 of the EDMG-Header-A 1104. In the decoding 2004, in the case in which an error is not detected by the HCS, the destination EDMG wireless station 2000 determines that the second EDMG PPDU 1200 exists following the first EDMG PPDU 1100, and acquires the size E2 octets of the Data 1107.

Next, the destination EDMG wireless station 2000 uses the EDMG-STF 1105 to execute a re-synchronization process 2005.

Next, the destination EDMG wireless station 2000 uses the EDMG-CEF 1106 to execute a channel re-estimation (re-CE) process 2006.

Next, the destination EDMG wireless station 2000 executes a decoding process 2007 of the Data 1107 in accordance with the set value (E2) of the Length field of the EDMG-Header-A 1104.

Next, because the destination EDMG wireless station 2000 recognizes the existence of the second EDMG PPDU 1200 from the result of the decoding process 2004, the destination EDMG wireless station 2000 performs a decoding process 2008 of the EDMG-Header-A 1201. In the decoding process 2008, in the case in which an error is not detected by the HCS, the destination EDMG wireless station 2000 determines that the third EDMG PPDU 1300 exists after the second EDMG PPDU 1200.

Next, the destination EDMG wireless station 2000 performs a decoding process 2009 of the Data 1202 in accordance with the set value (E3) of the Length field of the EDMG-Header-A 1301.

Next, because the destination EDMG wireless station 2000 recognizes the existence of the third EDMG PPDU 1300 from the result of the decoding process 2008, the destination EDMG wireless station 2000 performs a decoding process 2010 of the EDMG-Header-A 1301. In the decoding process 2010, in the case in which an error is not detected by the HCS, the destination EDMG wireless station 2000 recognizes that an additional EDMG PPDU does not exist after the third EDMG PPDU 1300.

Next, the destination EDMG wireless station 2000 executes decoding 2011 of the Data 1302 in accordance with the set value (E4) of the Length field of the EDMG-Header-A 1301.

Next, in the case in which an FCS error is not detected in one or more MPDUs in the decoding processes 2007, 2009, and 2011, after the virtual CCA changes from busy to idle, the destination EDMG wireless station 2000 stands by for the duration of the SIFS, and then transmits a block Ack (BA) 2012 to the transmission source EDMG wireless station 1000.

After the BA 2012 is received correctly, to transmit the next packet, the transmission source EDMG wireless station 1000 stands by for the duration of the DIFS, and then starts a backoff control 1500.

Note that, although not illustrated, in the case in which the BA 2012 indicates the existence of an MPDU that was not received correctly, or in the case in which an HCS error or an FCS error occurs in the decoding of the BA 2012, the transmission source EDMG wireless station 1000 stands by for the duration of the SIFS after the completion of receiving the BA 2012 and then re-transmits the MPDU that was not received correctly, or stands by for the duration of the DIFS, and after performing the backoff control 1500, re-transmits the MPDU that was not received correctly.

Figure 9:
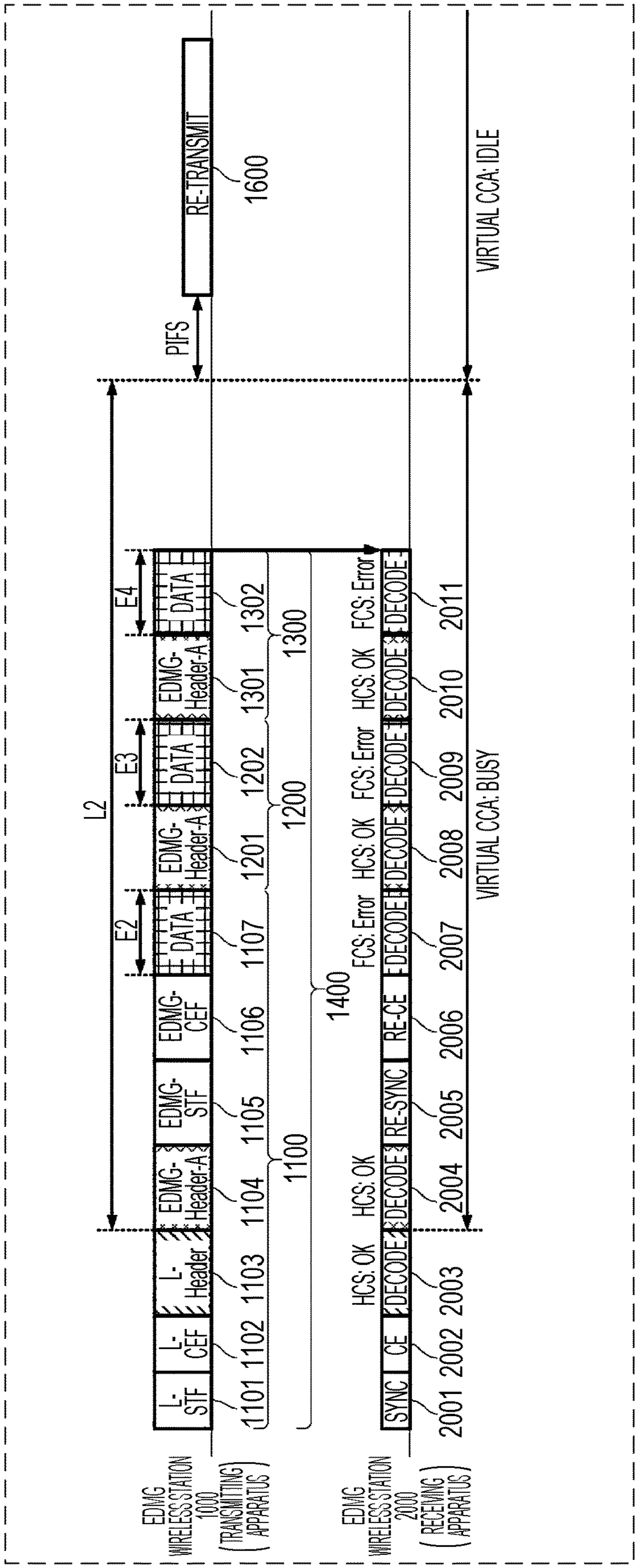
FIG. 9 is a diagram illustrating one example of a process of a transmission source EDMG wireless station and a destination EDMG wireless station when an FCS error occurs in all data fields in communication using EDMG A-PPDU according to Embodiment 1.
Figure 10:
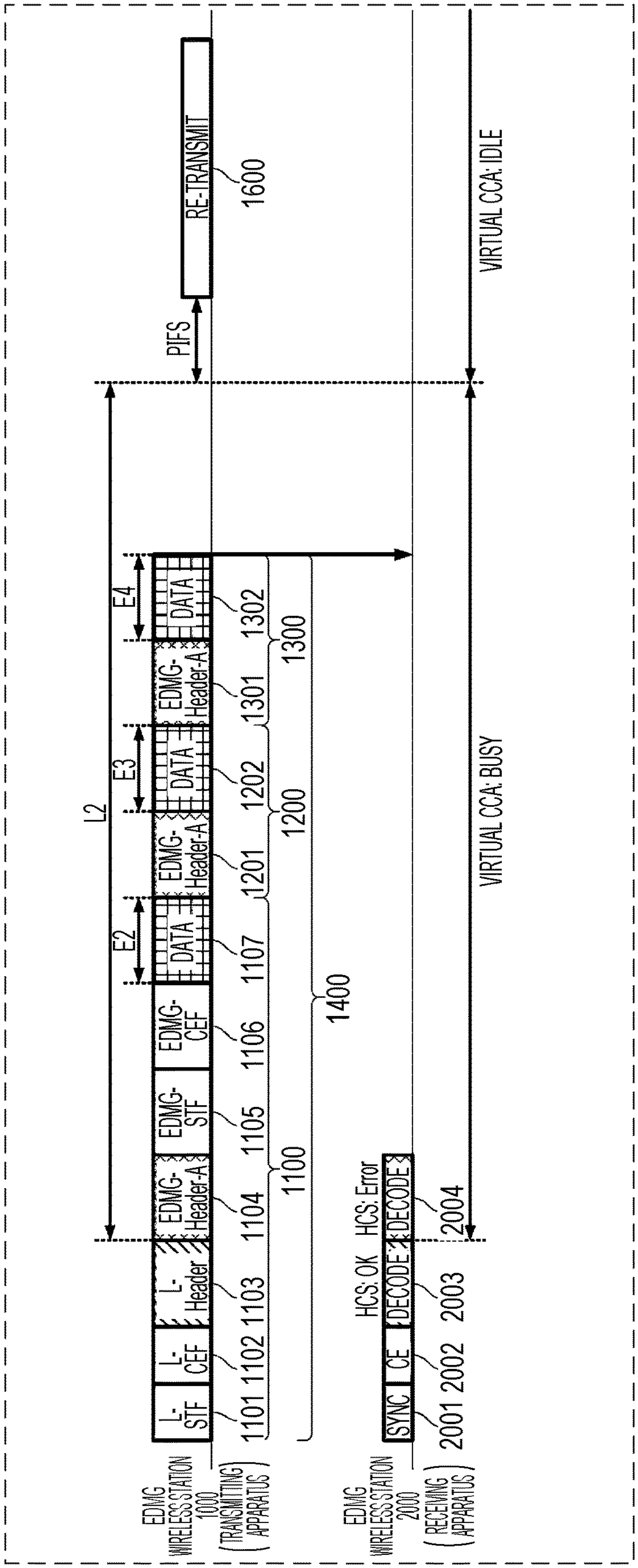
FIG. 10 is a diagram illustrating one example of a process of a transmission source EDMG wireless station and a destination EDMG wireless station when an HCS error occurs in the EDMG-Header-A in communication using EDMG A-PPDU according to Embodiment 1.

Note that in the case in which the destination EDMG wireless station 2000 detects an error by the FCS in all of the MPDUs in the decoding processes 2007, 2008, and 2011 (see FIG. 9), or in the case of detecting an error by the HCS in the decoding process 2004, the destination EDMG wireless station 2000 does not transmit the BA 2012. Note that in the case of detecting an error in the EDMG-Header-A 1104 of the first EDMG PPDU 1100 placed at the front, the destination EDMG wireless station 2000 does not receive the Data 1107, 1202, and 1302 correctly (see FIG. 10).

In this case, the transmission source EDMG wireless station 1000 does not receive the BA 2012 within the PIFS time from the end of the nominal data field length L2, and therefore determines that the EDMG A-PPDU 1400 has not reached the destination EDMG wireless station 2000 correctly, and executes a re-transmission process 1600 of the EDMG A-PPDU 1400.

Figure 11:
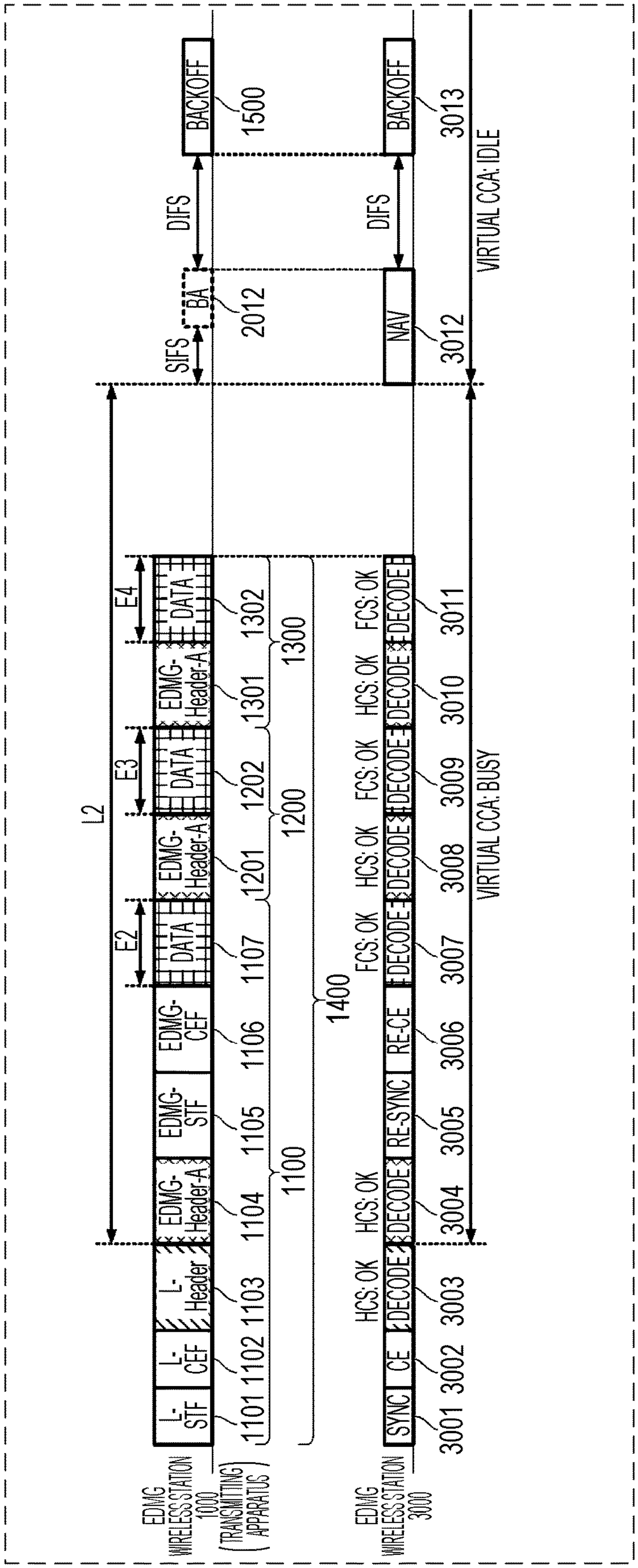
FIG. 11 is a diagram illustrating one example of a process of a transmission source EDMG wireless station and a non-destination EDMG wireless station when receiving correctly in communication using EDMG A-PPDU according to Embodiment 1.

FIG. 11 is a diagram illustrating one example of fields transmitted by and a process executed by a transmission source EDMG wireless station 1000 as well as fields transmitted by and a process executed by a non-destination EDMG wireless station 3000 in communication using EDMG A-PPDU according to Embodiment 1.

The transmission source EDMG wireless station 1000 of FIG. 11 transmits the EDMG A-PPDU 1400 to the destination EDMG wireless station 2000 of FIG. 8 and correctly receives the BA 2012 from the destination EDMG wireless station 2000, while the non-destination EDMG wireless station 3000 of FIG. 11 is not a destination station of the EDMG A-PPDU 1400 of FIG. 11, but exists in an environment where the EDMG A-PPDU 1400 is receivable.

The non-destination EDMG wireless station 3000 of FIG. 11 executes a process similar to the destination EDMG wireless station 2000 of FIG. 8 on the received EDMG A-PPDU 1400, but the processing after the decoding process 3011 is different from the destination EDMG wireless station 2000 of FIG. 8.

Specifically, in the case in which an error is not detected by the FCS in one or more of the MPDUs obtained by the decoding processes 3007, 3009, and 3011, the non-destination EDMG wireless station 3000 determines that the destination of the EDMG A-PPDU 1400 is not the non-destination EDMG wireless station 3000, sets a NAV 3012 after the virtual CCA changes from busy to idle, and additionally, after the NAV 3012 ends, stands by for the duration of the DIFS, and starts a backoff control 3013.

Figure 12:
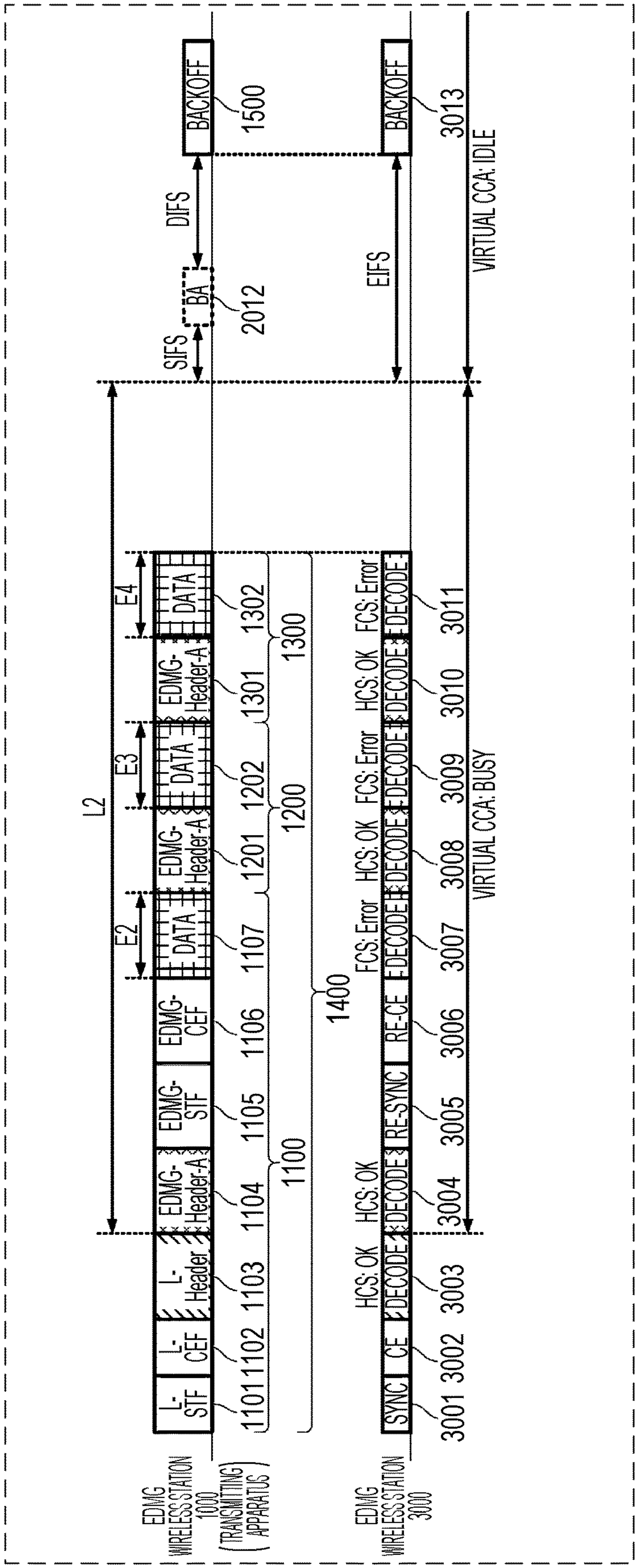
FIG. 12 is a diagram illustrating one example of a process of a transmission source EDMG wireless station and a non-destination EDMG wireless station when an FCS error occurs in all data fields in communication using EDMG A-PPDU according to Embodiment 1.
Figure 13:
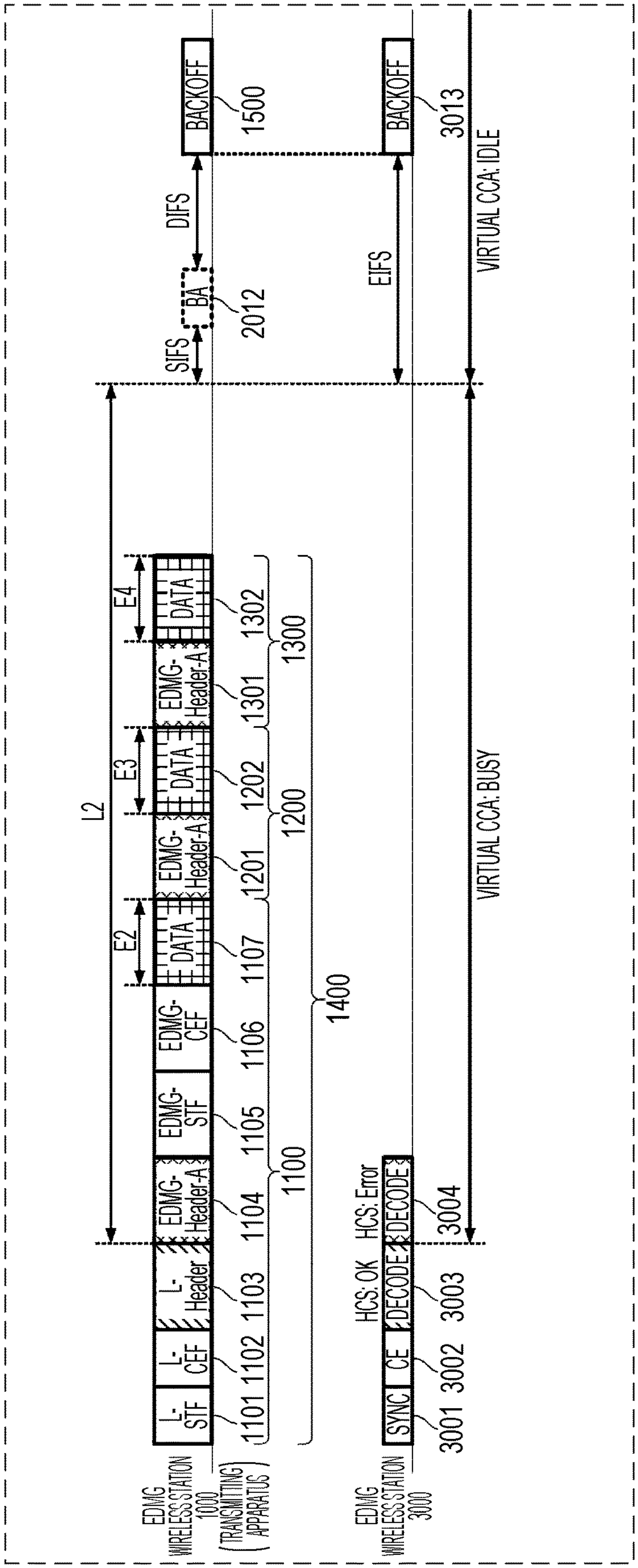
FIG. 13 is a diagram illustrating one example of a process of a transmission source EDMG wireless station and a non-destination EDMG wireless station when an HCS error occurs in the EDMG-Header-A in communication using EDMG A-PPDU according to Embodiment 1.

Note that in the case in which the non-destination EDMG wireless station 3000 detects an error by the FCS in all of the MPDUs obtained by the decoding processes 3007, 3009, and 3011 (see FIG. 12), or in the case of detecting an error by the HCS in the decoding process 3004 (see FIG. 13), after the virtual CCA changes from busy to idle, the non-destination EDMG wireless station 3000 stands by for the duration of the EIFS, and starts the backoff control 3013.

Figure 14:
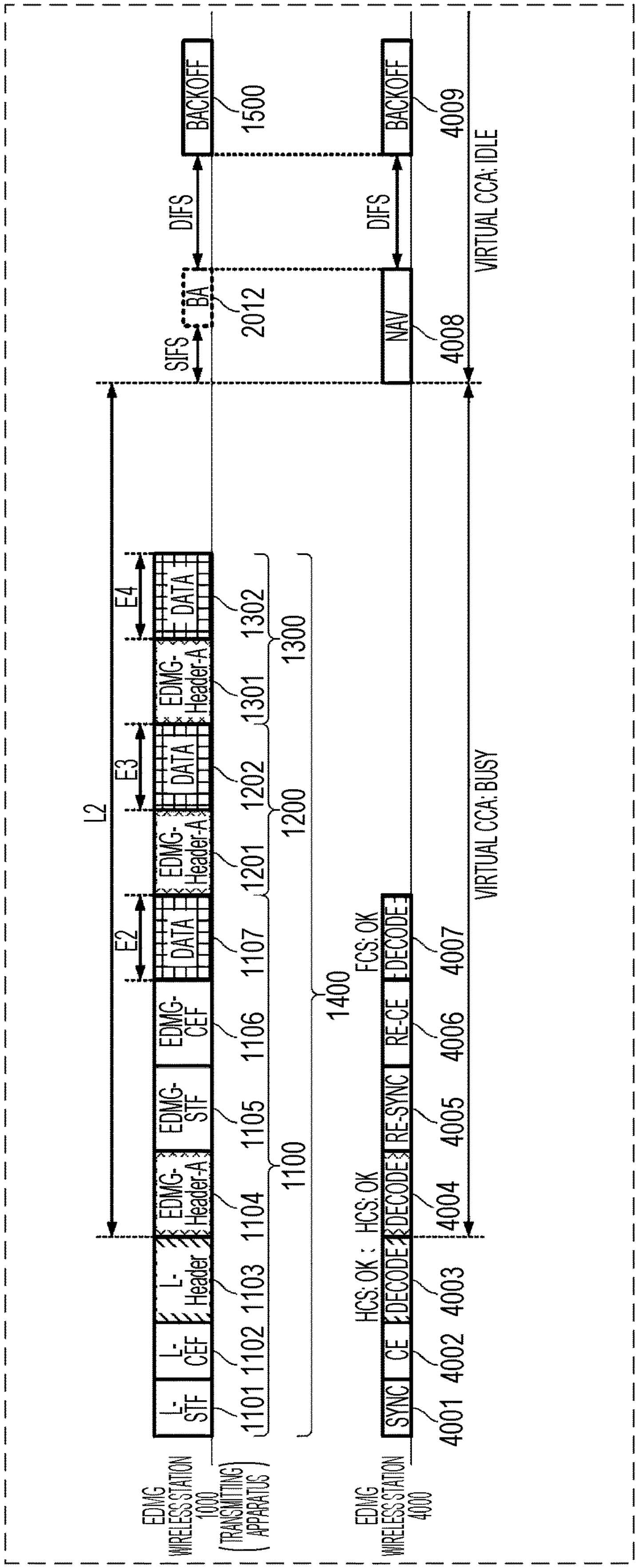
FIG. 14 is a diagram illustrating one example of a process of a transmission source EDMG wireless station and an EDMG wireless station not supporting EDMG A-PPDU when receiving correctly according to Embodiment 1.

FIG. 14 is a diagram illustrating one example of fields transmitted by and a process executed by the transmission source EDMG wireless station 1000 as well as a process executed by an EDMG wireless station 4000 that does not support EDMG A-PPDU in communication using EDMG A-PPDU according to Embodiment 1. The transmission source EDMG wireless station 1000 of FIG. 14 transmits the EDMG A-PPDU 1400 to the destination EDMG wireless station 2000 of FIG. 8 and correctly receives the BA 2012, while the EDMG A-PPDU non-supporting EDMG wireless station 4000 of FIG. 14 is not a destination station of the EDMG A-PPDU 1400, but exists in an environment where the EDMG A-PPDU 1400 is receivable.

The EDMG A-PPDU non-supporting EDMG wireless station 4000 does not support the EDMG A-PPDU, and therefore executes a decoding process 4007 up to the Data 1107, and does not execute a decoding process on the fields from the EDMG-Header-A 1201. In the case in which an error is not detected by the FCS in one or more of the MPDUs obtained by the decoding process 4007, the EDMG A-PPDU non-supporting EDMG wireless station 4000 determines that the destination of the EDMG A-PPDU 1400 is not the EDMG A-PPDU non-supporting EDMG wireless station 4000, sets a NAV 4008 after the virtual CCA changes from busy to idle, and additionally, after the NAV 4008 ends, stands by for the duration of the DIFS, and starts a backoff control 4009.

Figure 15:
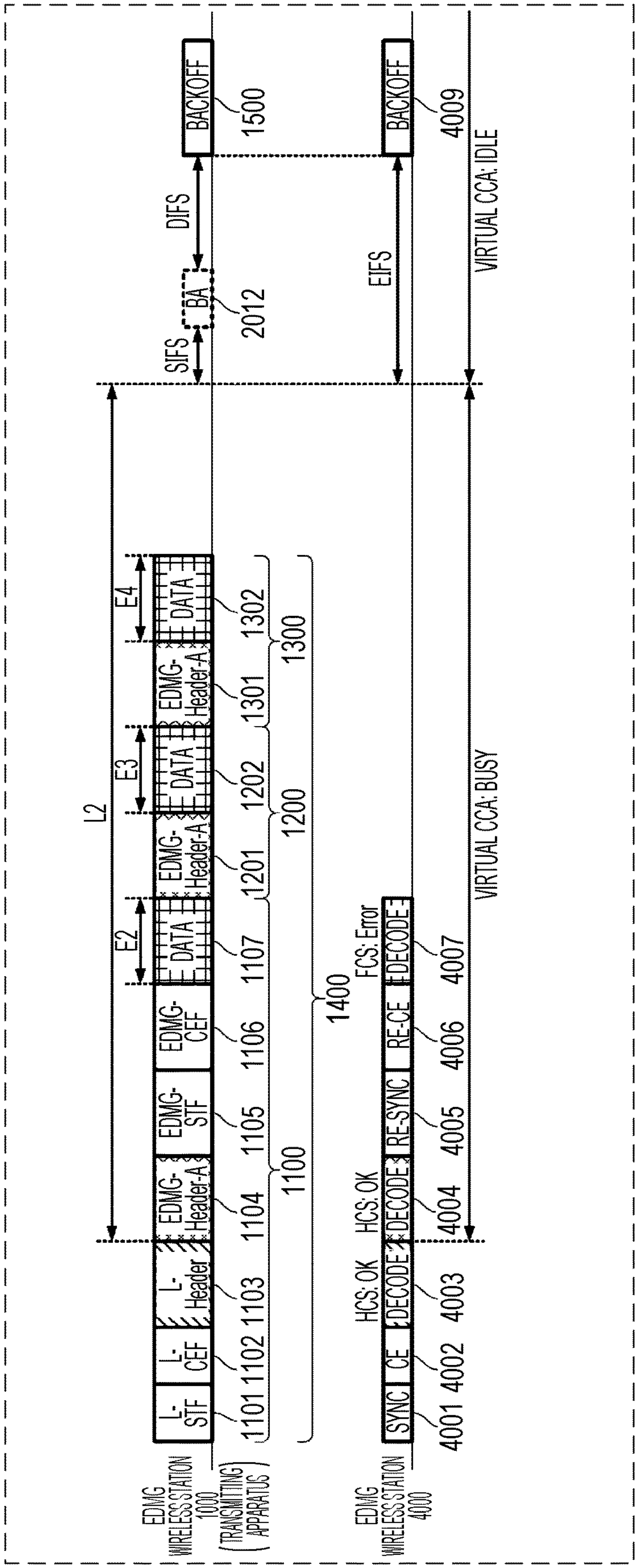
FIG. 15 is a diagram illustrating one example of a process of a transmission source EDMG wireless station and an EDMG wireless station not supporting EDMG A-PPDU when an FCS error occurs in communication using EDMG A-PPDU according to Embodiment 1.
Figure 16:
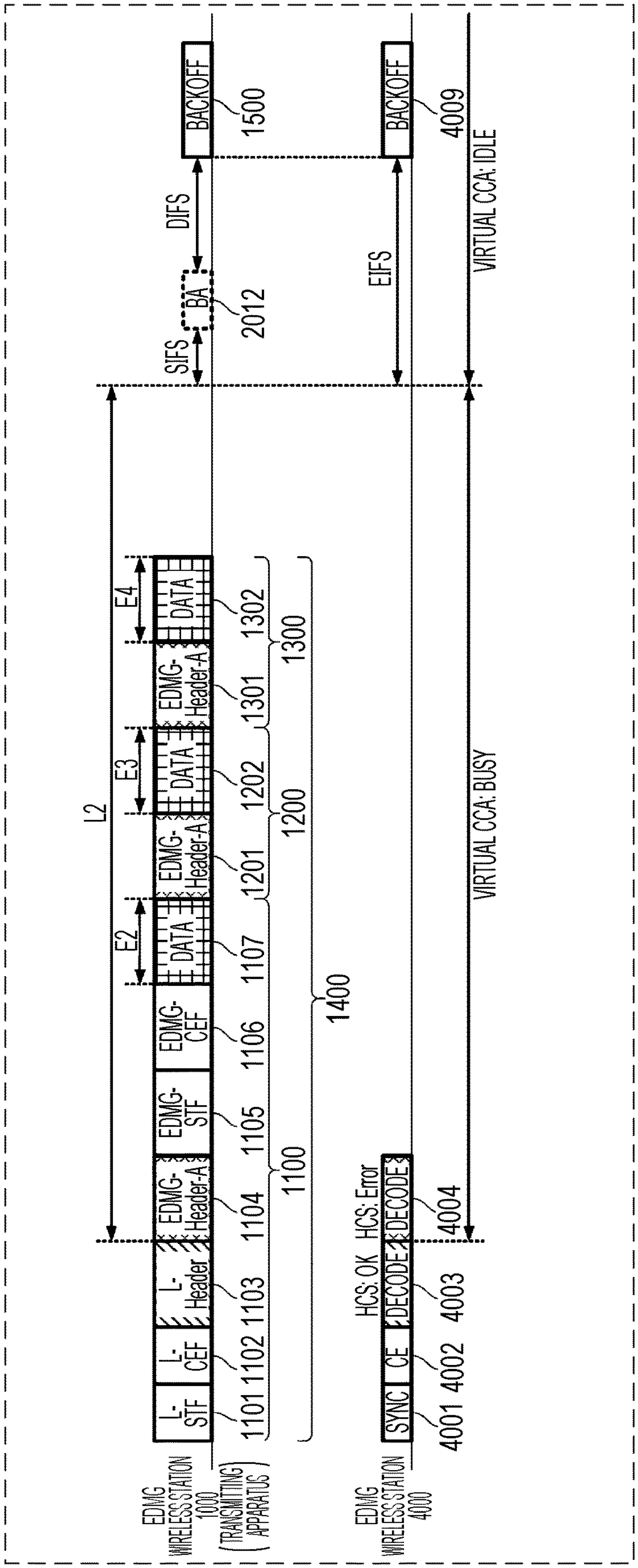
FIG. 16 is a diagram illustrating one example of a process of a transmission source EDMG wireless station and an EDMG wireless station not supporting EDMG A-PPDU when an HCS error occurs in the EDMG-Header-A in communication using EDMG A-PPDU according to Embodiment 1.

Note that in the case in which the EDMG A-PPDU non-supporting EDMG wireless station 4000 detects an error by the FCS in all of the MPDUs obtained by the decoding process 4007 (see FIG. 15), or in the case of detecting an error by the HCS in the decoding process 4004 (see FIG. 16), after the virtual CCA changes from busy to idle, the EDMG A-PPDU non-supporting EDMG wireless station 4000 stands by for the duration of the EIFS, and starts the backoff control 4009.

Figure 17:
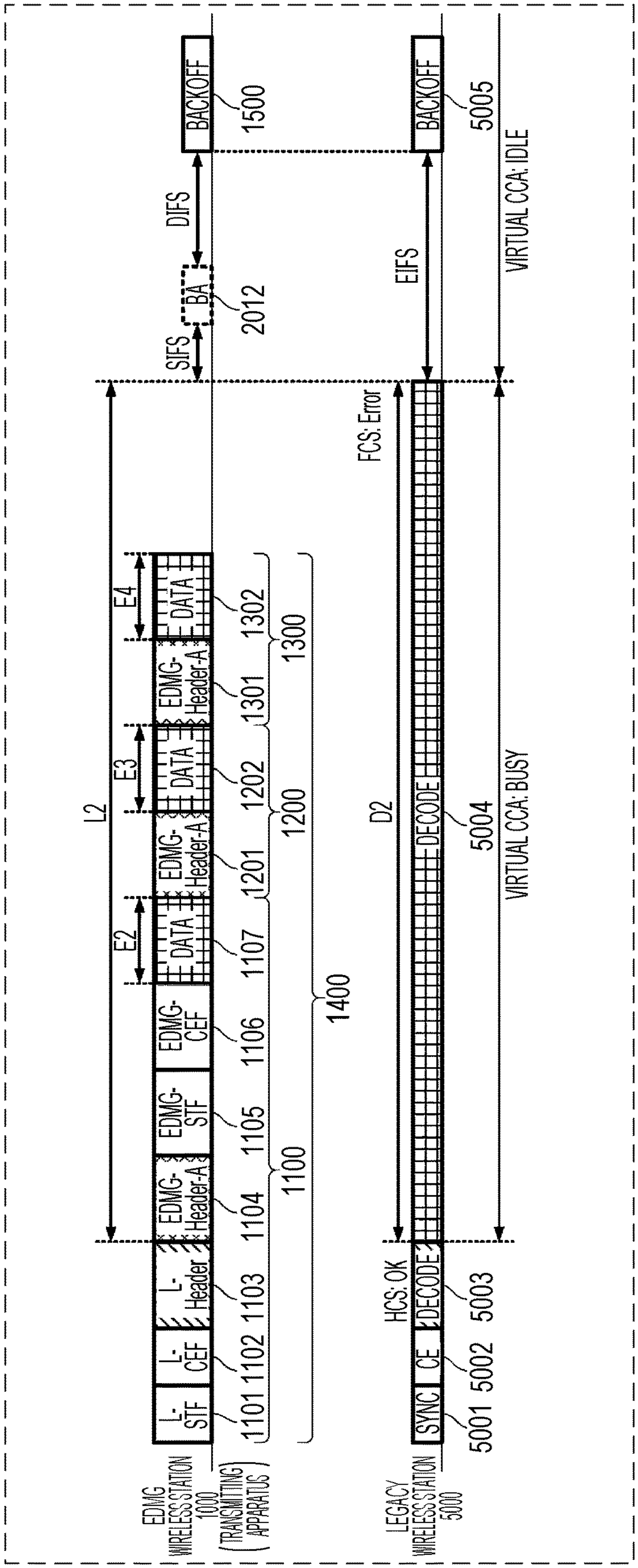
FIG. 17 is a diagram illustrating one example of a process of a transmission source EDMG wireless station and a Legacy EDMG wireless station in communication using EDMG A-PPDU according to Embodiment 1.

FIG. 17 is a diagram illustrating one example of fields transmitted by and a process executed by a transmission source EDMG wireless station 1000 as well as a process executed by a legacy wireless station 5000 in communication using EDMG A-PPDU according to Embodiment 1.

The transmission source EDMG wireless station 1000 of FIG. 17 transmits the EDMG A-PPDU 1400 to the destination EDMG wireless station 2000 of FIG. 8 and correctly receives the BA 2012, while the legacy wireless station 5000 of FIG. 17 is nota destination station of the EDMG A-PPDU 1400, but exists in an environment where the EDMG A-PPDU 1400 is receivable.

The legacy wireless station 5000 does not support the EDMG A-PPDU, and therefore processes the received EDMG A-PPDU 1400 as a typical legacy PPDU. In other words, the legacy wireless station 5000 executes a synchronization process 5001 and a channel estimation (CE) process 5002, followed by a decoding process 5003 of the L-Header 1103. In the decoding process 5003, in the case in which an error is not detected by the HCS, the legacy wireless station 5000 treats the EDMG A-PPDU 1400 as a single legacy PPDU on the basis of the Additional PPDU field set to 0, and additionally recognizes the size D2 of the nominal data field from the Length field.

Subsequently, the legacy wireless station 5000 executes a decoding process 5004 treating the fields from the EDMG-Header-A 1104 as a data field of the size D2 octets. In the decoding process 5004, the legacy wireless station 5000 detects an error by the FCS in all of the MPDUs.

In the decoding process 5004, in the case of detecting an error for all MPDUs, the legacy wireless station 5000 calculates the data field length L2 time on the wireless channel from the octet size D2 of the nominal data field, and after the virtual CCA changes from busy to idle, stands by for the duration of the EIFS, and starts a backoff control 5005.

By the above, according to Embodiment 1, the backoff control start timings of an EDMG wireless station and a legacy wireless station may be aligned, and a transmit opportunity may be given uniformly to each wireless station.

Embodiment 2

Figure 18:
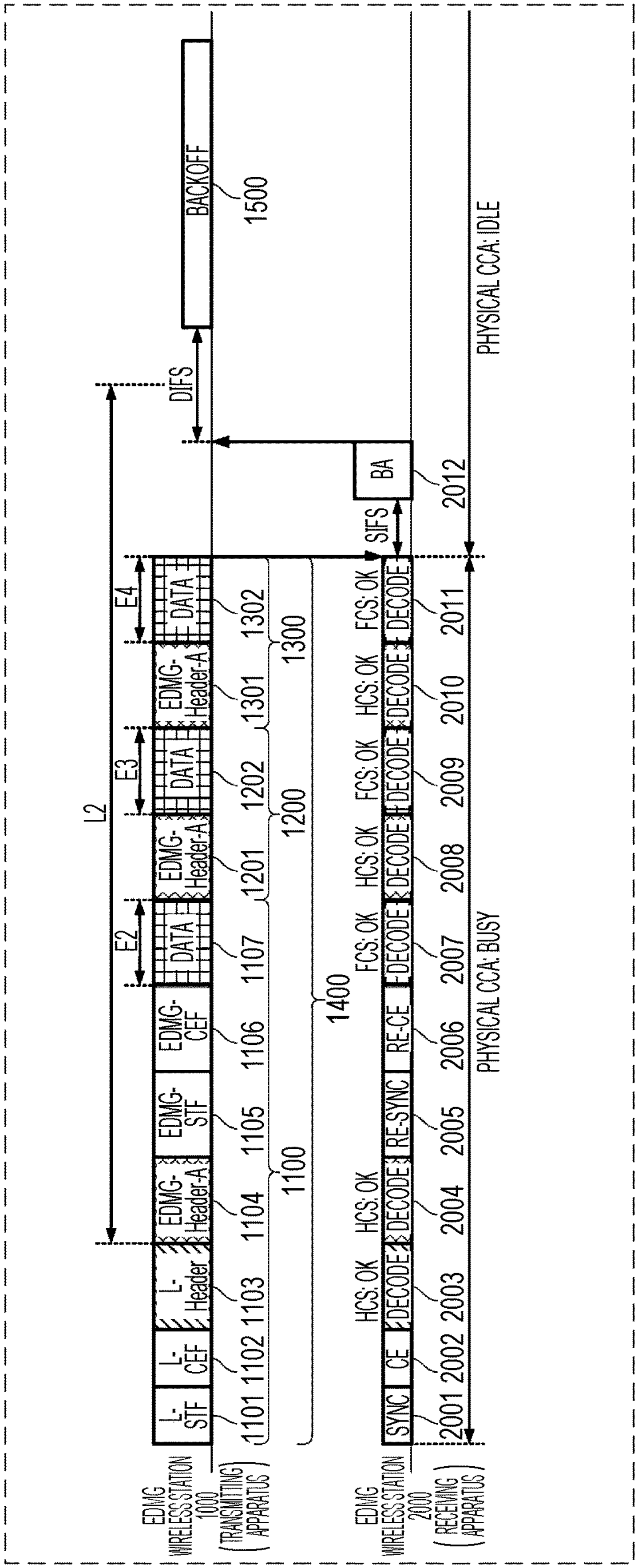
FIG. 18 is a diagram illustrating one example of a process of a transmission source EDMG wireless station and a destination EDMG wireless station when receiving correctly according to Embodiment 2.

FIG. 18 is a diagram illustrating one example of fields transmitted by and processes executed by a transmission source EDMG wireless station 1000 and a destination EDMG wireless station 2000 in communication using EDMG A-PPDU according to Embodiment 2, and corresponds to FIG. 8 of Embodiment 1. Portions which are the same as FIG. 8 are denoted with the same signs, and description thereof is omitted.

In FIG. 8, after the virtual CCA changes from busy to idle, the destination EDMG wireless station 2000 stands by for the duration of the SIFS and transmits the BA 2012 to the transmission source EDMG wireless station 1000, while the transmission source EDMG wireless station 1000 stands by for the duration of the DIFS from the completion of receiving the BA 2012, and starts the backoff control 1500.

However, in FIG. 18, after the physical CCA changes from busy to idle, the destination EDMG wireless station 2000 stands by for the duration of the SIFS and transmits the BA 2012, while the transmission source EDMG wireless station 1000 stands by for the duration of the DIFS after receiving the BA 2012 correctly, and starts the backoff control 1500. In other words, the transmission timing of the block Ack by the receiving station, namely the destination EDMG wireless station 2000, is different from Embodiment 1.

Note that, although not illustrated, in the case in which the BA 2012 indicates the existence of an MPDU that was not received correctly, or in the case in which an HCS error or an FCS error occurs in the decoding process of the BA 2012, the transmission source EDMG wireless station 1000 receives the BA 2012, stands by for the duration of the SIFS, and then re-transmits a packet including the MPDU that was not received correctly, or stands by for the duration of the DIFS, and after performing the backoff control, re-transmits a packet including the MPDU that was not received correctly.

Figure 19:
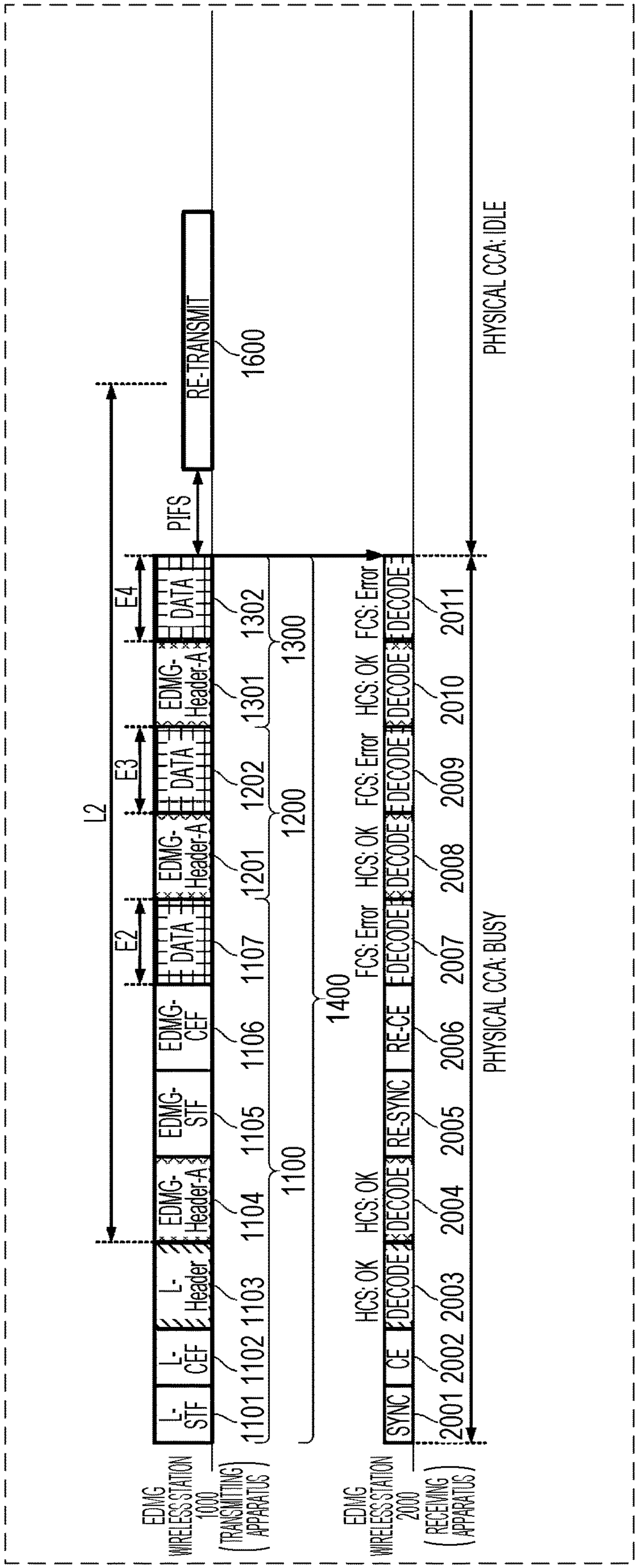
FIG. 19 is a diagram illustrating one example of a process of a transmission source EDMG wireless station and a destination EDMG wireless station when an FCS error occurs in all data fields in communication using EDMG A-PPDU according to Embodiment 2.
Figure 20:
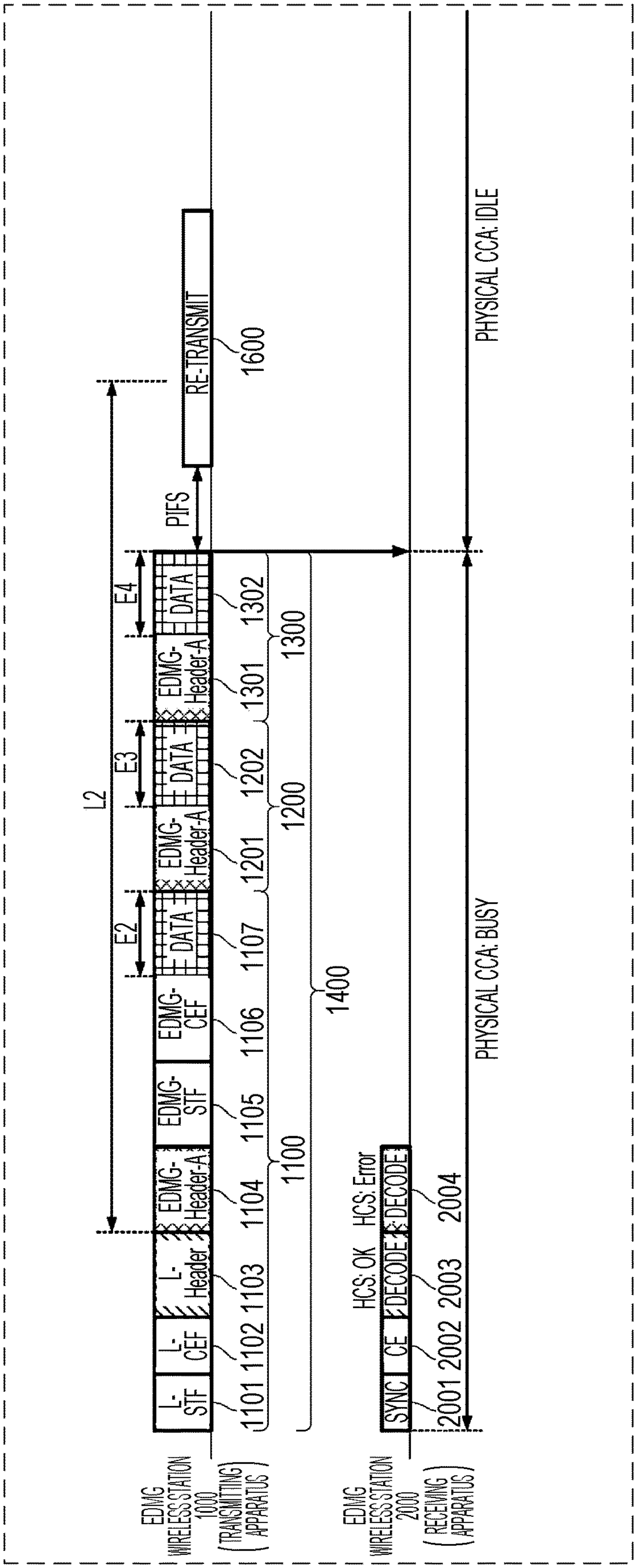
FIG. 20 is a diagram illustrating one example of a process of a transmission source EDMG wireless station and a destination EDMG wireless station when an HCS error occurs in the EDMG-Header-A in communication using EDMG A-PPDU according to Embodiment 2.

Note that in the case in which the destination EDMG wireless station 2000 detects an error by the FCS in all of the MPDUs obtained by the decoding processes 2007, 2008, and 2011 (see FIG. 19), or in the case of detecting an error by the HCS in the decoding process 2004 (see FIG. 20), the destination EDMG wireless station 2000 does not transmit the BA 2012. In this case, the transmission source EDMG wireless station 1000 does not receive the BA 2012 within the PIFS time from the completion of transmitting the EDMG A-PPDU 1400, and therefore determines that the EDMG A-PPDU 1400 has not reached the destination EDMG wireless station 2000 correctly, and executes the re-transmission process 1600 of the EDMG A-PPDU 1400.

Figure 21:
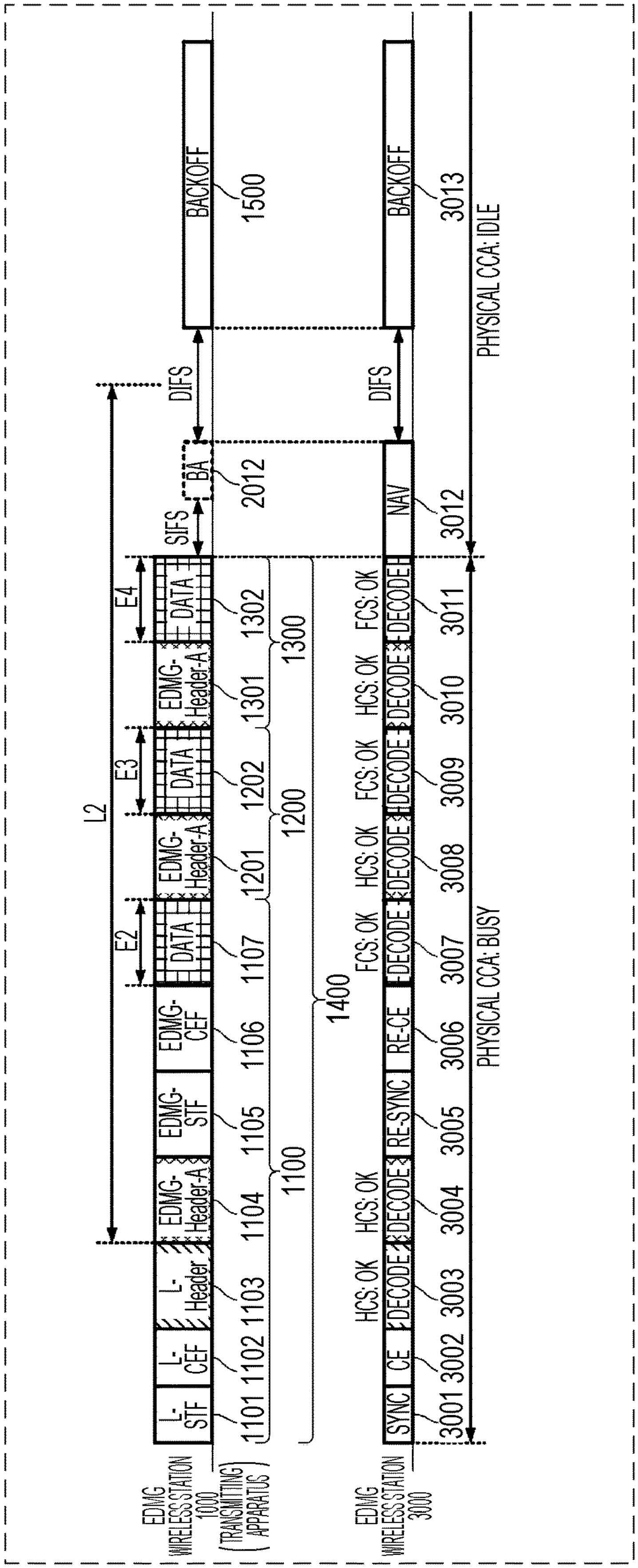
FIG. 21 is a diagram illustrating one example of a process of a transmission source EDMG wireless station and a non-destination EDMG wireless station when receiving correctly in communication using EDMG A-PPDU according to Embodiment 2.

FIG. 21 is a diagram illustrating one example of fields transmitted by and processes executed by a transmission source EDMG wireless station 1000 and a non-destination EDMG wireless station 3000 in communication using EDMG A-PPDU according to Embodiment 2, and corresponds to FIG. 11 of Embodiment 1. Portions which are the same as FIG. 11 are denoted with the same signs, and description thereof is omitted.

In FIG. 11, after the virtual CCA that is busy for the duration of the nominal data field length L2 changes to idle, the non-destination EDMG wireless station 3000 sets the NAV 3012, and after the NAV 3012 ends, stands by for the duration of the DIFS, and starts the backoff control 3013. However, in FIG. 21, after the physical CCA changes from busy to idle partway through the nominal data field length L2, the non-destination EDMG wireless station 3000 sets the NAV 3012, additionally stands by for the duration of the DIFS, and starts the backoff control 3013.

Figure 22:
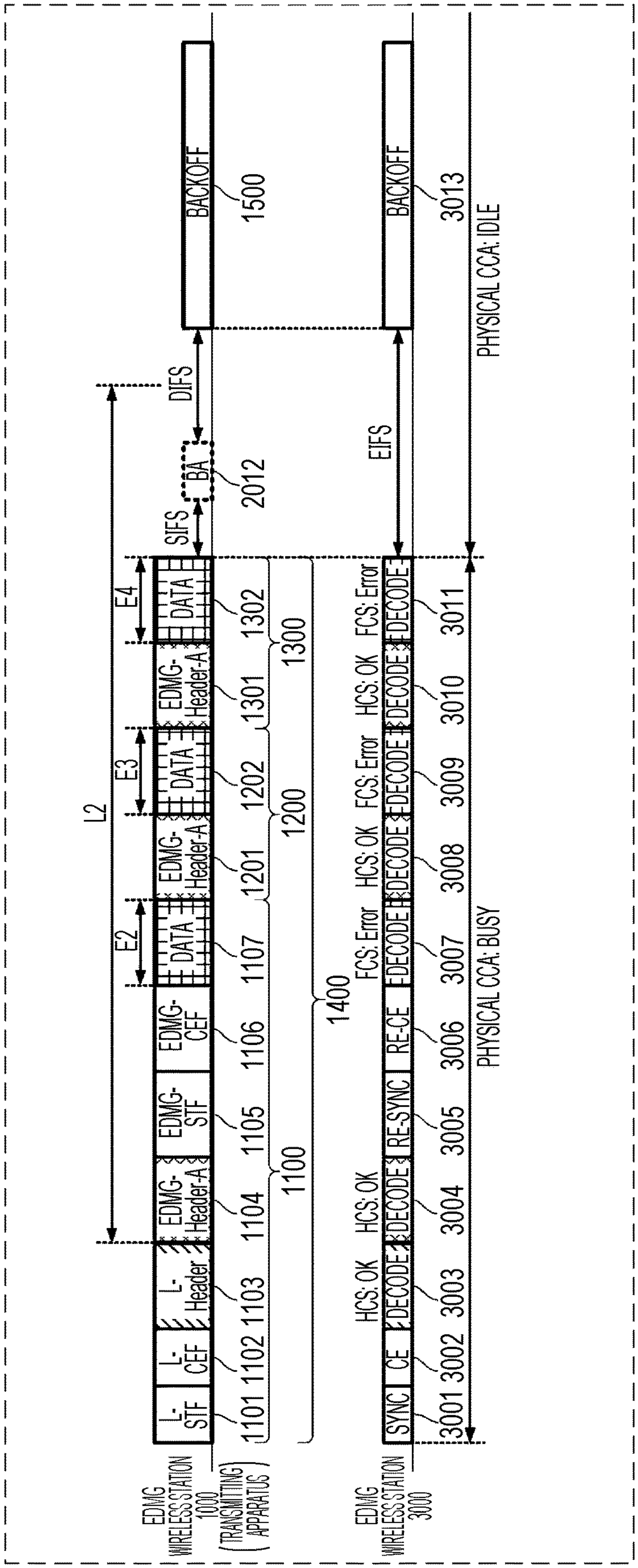
FIG. 22 is a diagram illustrating one example of a process of a transmission source EDMG wireless station and a non-destination EDMG wireless station when an FCS error occurs in all data fields in communication using EDMG A-PPDU according to Embodiment 2.
Figure 23:
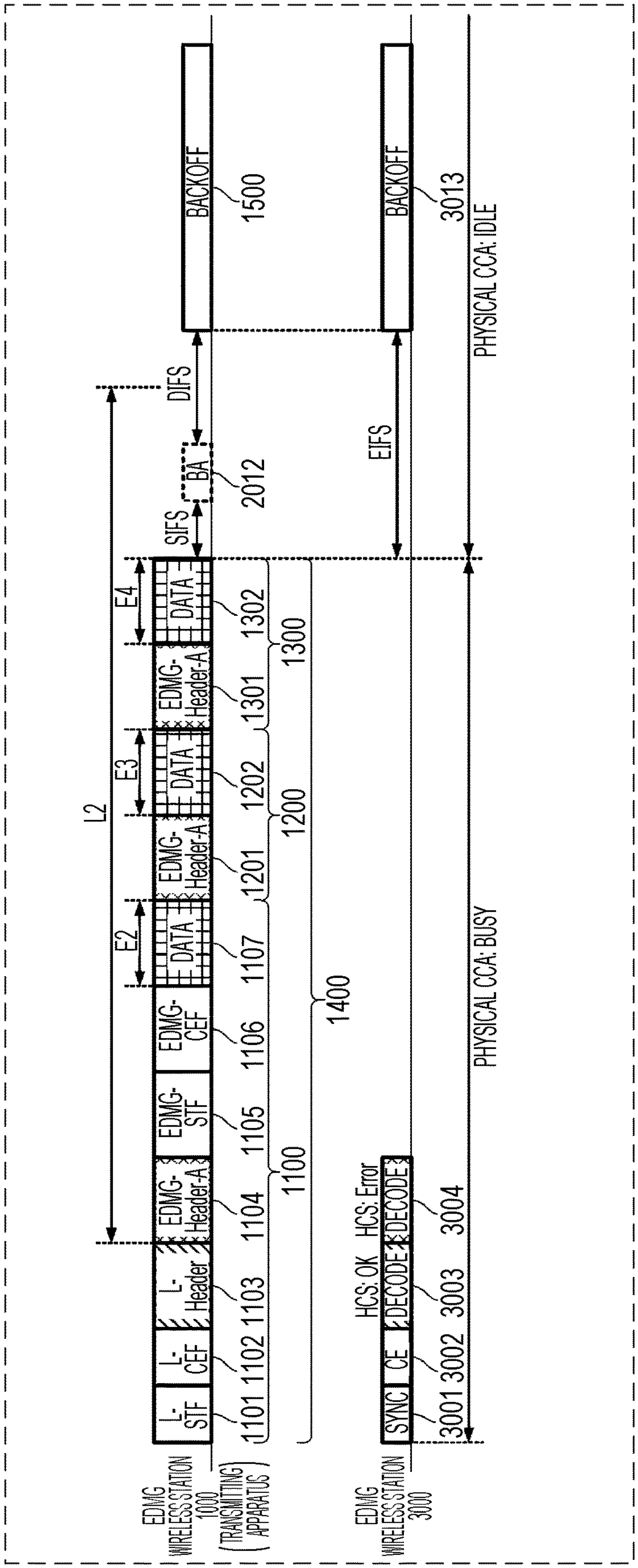
FIG. 23 is a diagram illustrating one example of a process of a transmission source EDMG wireless station and a non-destination EDMG wireless station when an HCS error occurs in the EDMG-Header-A in communication using EDMG A-PPDU according to Embodiment 2.

Note that in the case in which the non-destination EDMG wireless station 3000 detects an error by the FCS in all of the MPDUs obtained by the decoding processes 3007, 3009, and 3011 (see FIG. 22), or in the case of detecting an error by the HCS in the decoding 3004 (see FIG. 23), after the physical CCA changes from busy to idle, the non-destination EDMG wireless station 3000 stands by for the duration of the EIFS, and starts the backoff control 3013.

Figure 24:
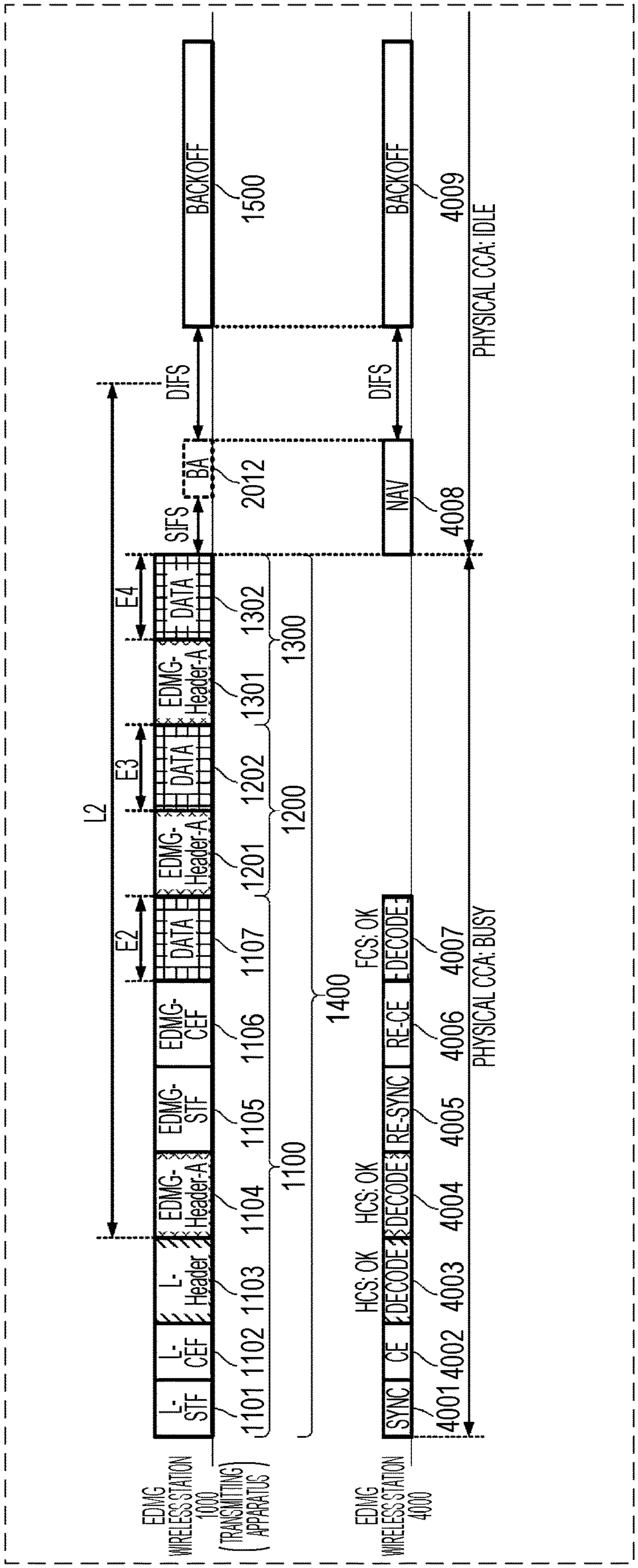
FIG. 24 is a diagram illustrating one example of a process of a transmission source EDMG wireless station and an EDMG wireless station not supporting EDMG A-PPDU when receiving correctly according to Embodiment 2.

FIG. 24 is a diagram illustrating one example of fields transmitted by and processes executed by a transmission source EDMG wireless station 1000 and an EDMG A-PPDU non-supporting EDMG wireless station 4000 in communication using EDMG A-PPDU according to Embodiment 2, and corresponds to FIG. 14 of Embodiment 1. Portions which are the same as FIG. 14 are denoted with the same signs, and description thereof is omitted.

In FIG. 14, after the virtual CCA that is busy for the duration of the nominal data field length L2 changes to idle, the EDMG A-PPDU non-supporting EDMG wireless station 4000 sets the NAV 4008, and after the NAV 4008 ends, stands by for the duration of the DIFS, and starts the backoff control 4009. However, in FIG. 24, after the physical CCA changes from busy to idle partway through the nominal data field length L2, the EDMG A-PPDU non-supporting EDMG wireless station 4000 sets the NAV 4008, and after the NAV 4008 ends, stands by for the duration of the DIFS, and starts the backoff control 4009.

Figure 25:
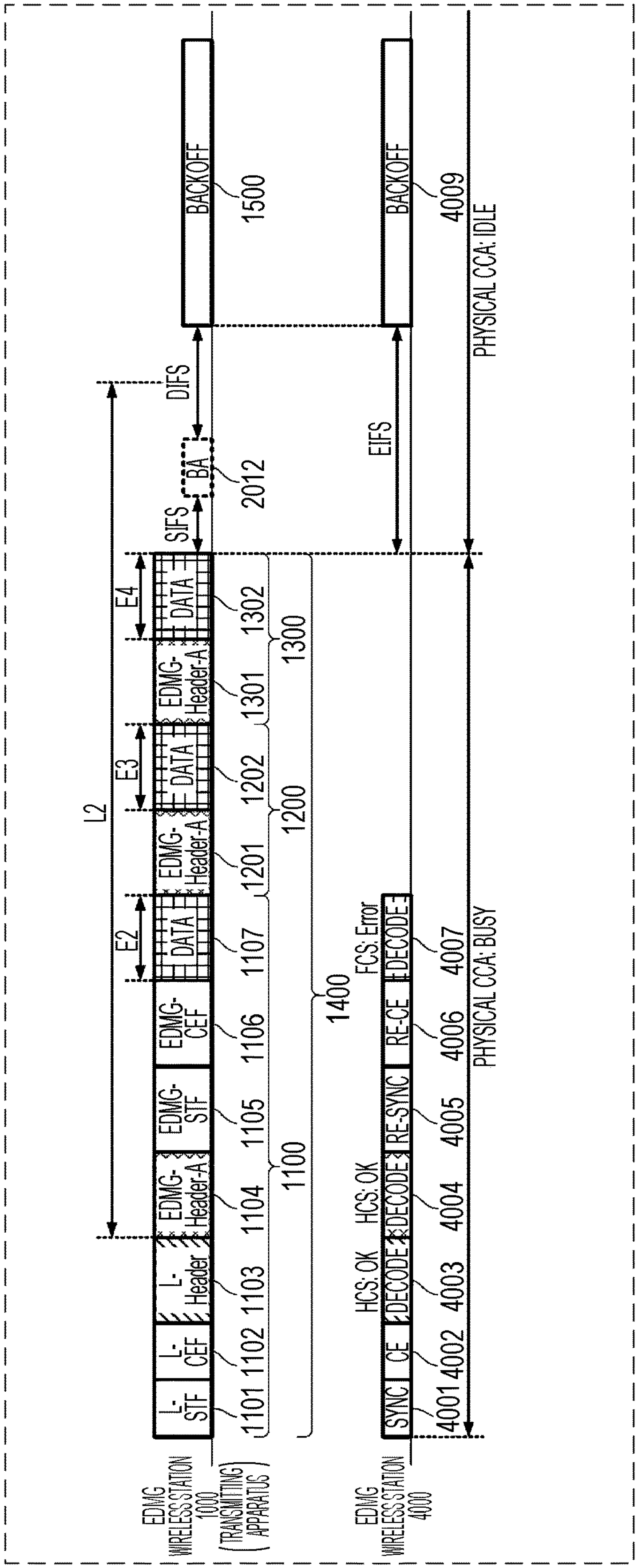
FIG. 25 is a diagram illustrating one example of a process of a transmission source EDMG wireless station and an EDMG wireless station not supporting EDMG A-PPDU when an FCS error occurs in communication using EDMG A-PPDU according to Embodiment 2.
Figure 26:
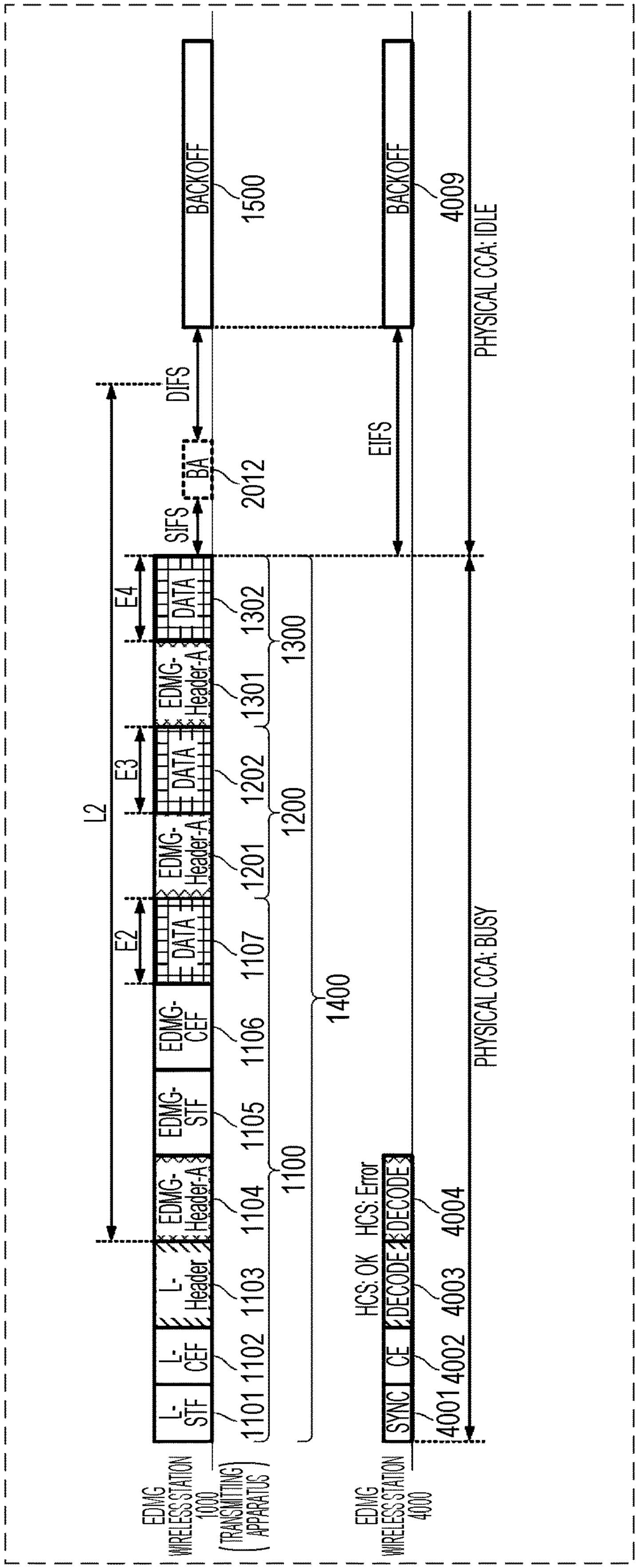
FIG. 26 is a diagram illustrating one example of a process of a transmission source EDMG wireless station and an EDMG wireless station not supporting EDMG A-PPDU when an HCS error occurs in the EDMG-Header-A in communication using EDMG A-PPDU according to Embodiment 2.

Note that in the case in which the EDMG A-PPDU non-supporting EDMG wireless station 4000 detects an error by the FCS in all of the MPDUs obtained by the decoding 4007 (see FIG. 25), or in the case of detecting an error by the HCS in the decoding 4004 (see FIG. 26), after the physical CCA changes from busy to idle, the EDMG A-PPDU non-supporting EDMG wireless station 4000 stands by for the duration of the EIFS, and starts the backoff control 4009.

Figure 27:
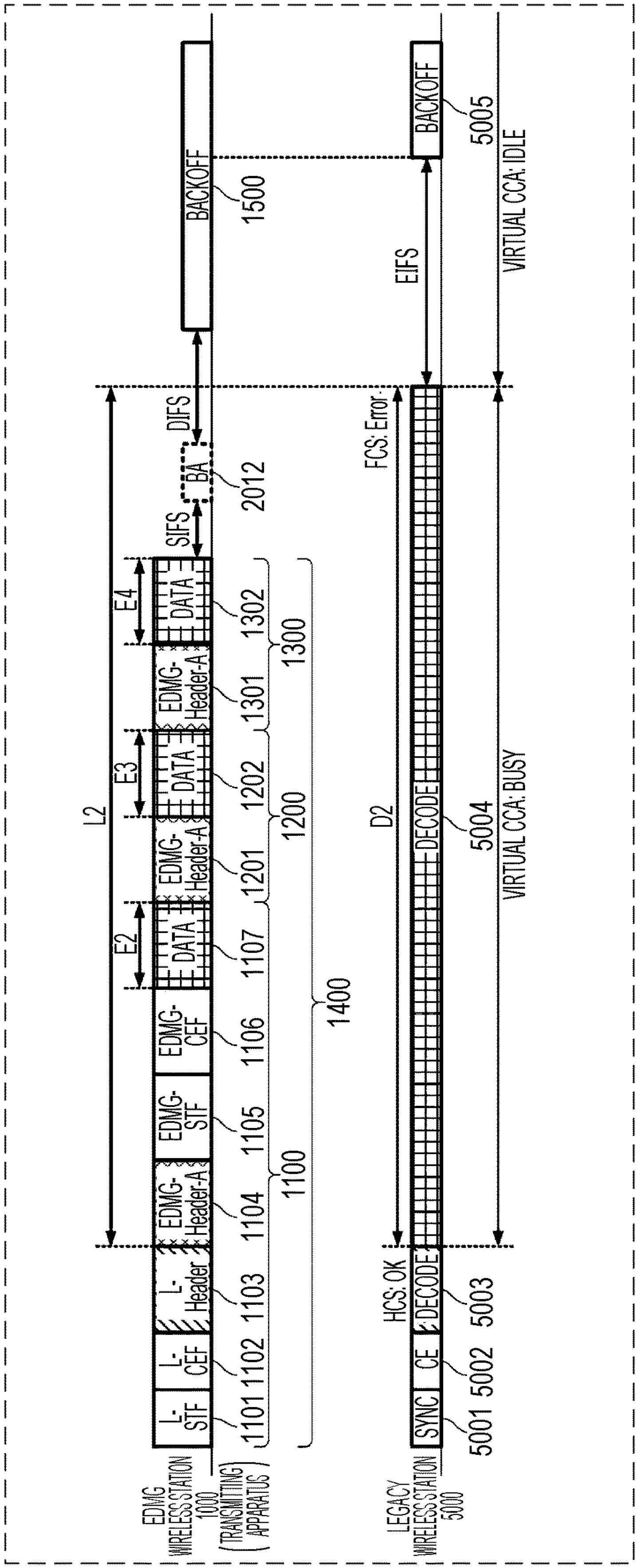
FIG. 27 is a diagram illustrating one example of a process of a transmission source EDMG wireless station and a Legacy EDMG wireless station in communication using EDMG A-PPDU according to Embodiment 2.

FIG. 27 is a diagram illustrating one example of fields transmitted by and processes executed by a transmission source EDMG wireless station 1000 and a legacy wireless station 5000 in communication using EDMG A-PPDU according to Embodiment 2, and corresponds to FIG. 17 of Embodiment 1. Portions which are the same as FIG. 17 are denoted with the same signs, and description thereof is omitted.

In FIG. 27, because the transmission source EDMG wireless station 1000 receives the BA 2012 partway through the nominal data field length L2, the timing at which to start the backoff control 1500 is earlier compared to FIG. 17, but the timing at which the legacy wireless station 5000 starts the backoff control 5005 is the same as FIG. 17. As a result, in FIG. 27, since the backoff control starting timing of the EDMG wireless station is earlier than the backoff control start timing of the legacy wireless station, the EDMG wireless station is advantageously given a transmit opportunity.

By the above, according to Embodiment 2, even in the case in which the transmission source EDMG wireless station 1000 sets a long L2 compared to the actual frame length of the EDMG A-PPDU 1400, the destination EDMG wireless station 2000 is able to transmit the BA 2012 after the completion of receiving the EDMG A-PPDU 1400, without being interrupted by another wireless station.

Embodiment 3

Figure 28:
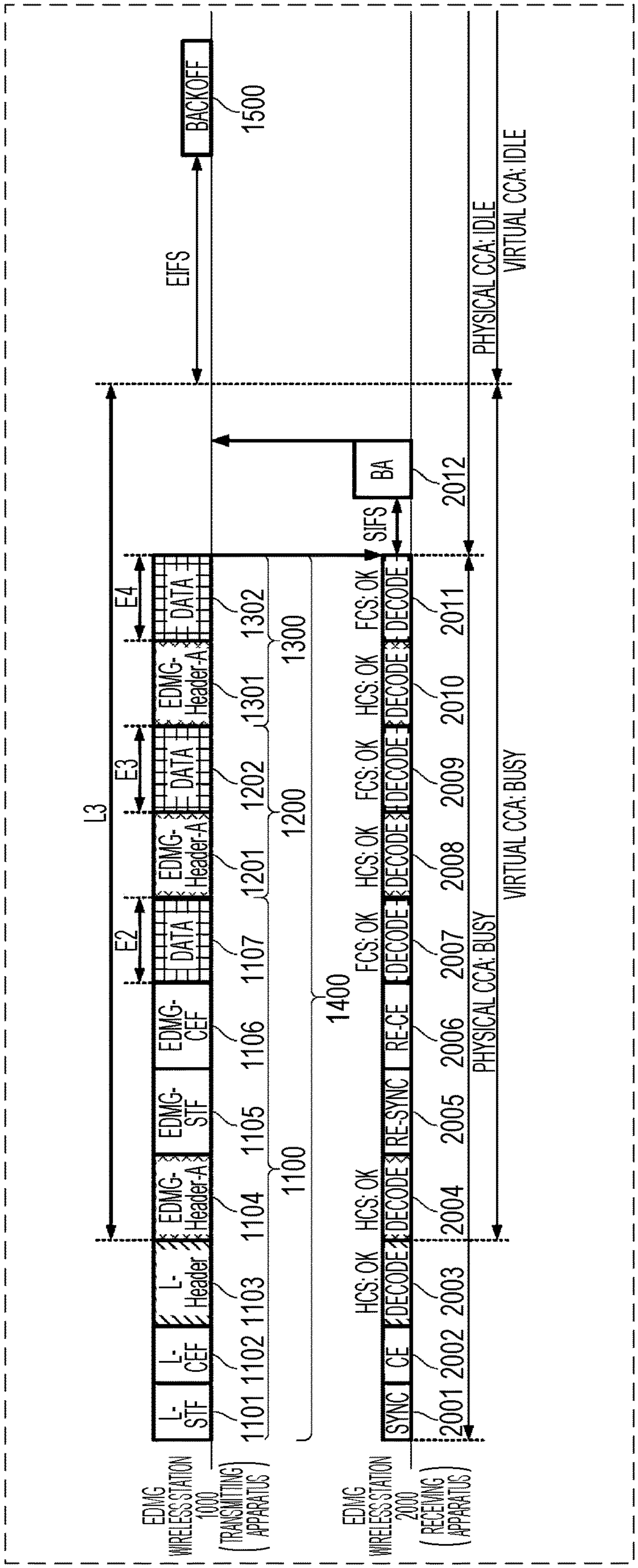
FIG. 28 is a diagram illustrating one example of a process of a transmission source EDMG wireless station and a destination EDMG wireless station when receiving correctly according to Embodiment 3.

FIG. 28 is a diagram illustrating one example of fields transmitted by and processes executed by a transmission source EDMG wireless station 1000 and a destination EDMG wireless station 2000 in communication using EDMG A-PPDU according to Embodiment 3, and corresponds to FIG. 8 of Embodiment 1. Portions which are the same as FIG. 8 are denoted with the same signs, and description thereof is omitted.

In FIG. 8, the transmission source EDMG wireless station 1000 converts any time L2 equal to or greater than the combined field length of the EDMG-Header-A 1104, the EDMG-STF 1105, the EDMG-CEF 1106, the Data 1107, the EDMG-Header-A 1201, the Data 1202, the EDMG-Header-A 1301, and the Data 1302 to the octet size D2 on the basis of a predetermined calculation method and sets the size in the Length field of the L-Header 1103. However, in FIG. 28, the transmission source EDMG wireless station 1000 sets any time L3 equal to or greater than the total time of the combined field length of the EDMG-Header-A 1104, the EDMG-STF 1105, the EDMG-CEF 1106, the Data 1107, the EDMG-Header-A 1201, the Data 1202, the EDMG-Header-A 1301, and the Data 1302, the frame length of the BA 2012, and the SIFS time as a nominal data field length, converts the nominal data field length L3 to a nominal data octet size D3 on the basis of a predetermined calculation method, and sets the size in the Length field of the L-Header 1103. Additionally, the transmission source EDMG wireless station 1000 does not transmit newly aggregated EDMG PPDUs over an amount of time obtained by subtracting the frame length of the BA 2012 and the SIFS time from the nominal data field length L3.

Also, in FIG. 8, in the case of receiving the BA 2012 correctly, the transmission source EDMG wireless station 1000 stands by for the duration of the DIFS and starts the backoff control 1500, but in FIG. 28, after the virtual CCA changes from busy to idle, the transmission source EDMG wireless station 1000 stands by for the duration of the EIFS, and starts the backoff control 1500.

Note that, although not illustrated, in the case in which the BA 2012 indicates the existence of an MPDU that was not received correctly, or in the case in which an HCS error or an FCS error occurs in the decoding of the BA 2012, the transmission source EDMG wireless station 1000 stands by for the duration of the PIFS from the completion of the nominal data field length L3, and then executes a re-transmission process 1600 of a packet including the MPDU that was not received correctly, or stands by for the duration of the DIFS, and after the backoff control ends, re-transmits a packet including the MPDU that was not received correctly.

Figure 29:
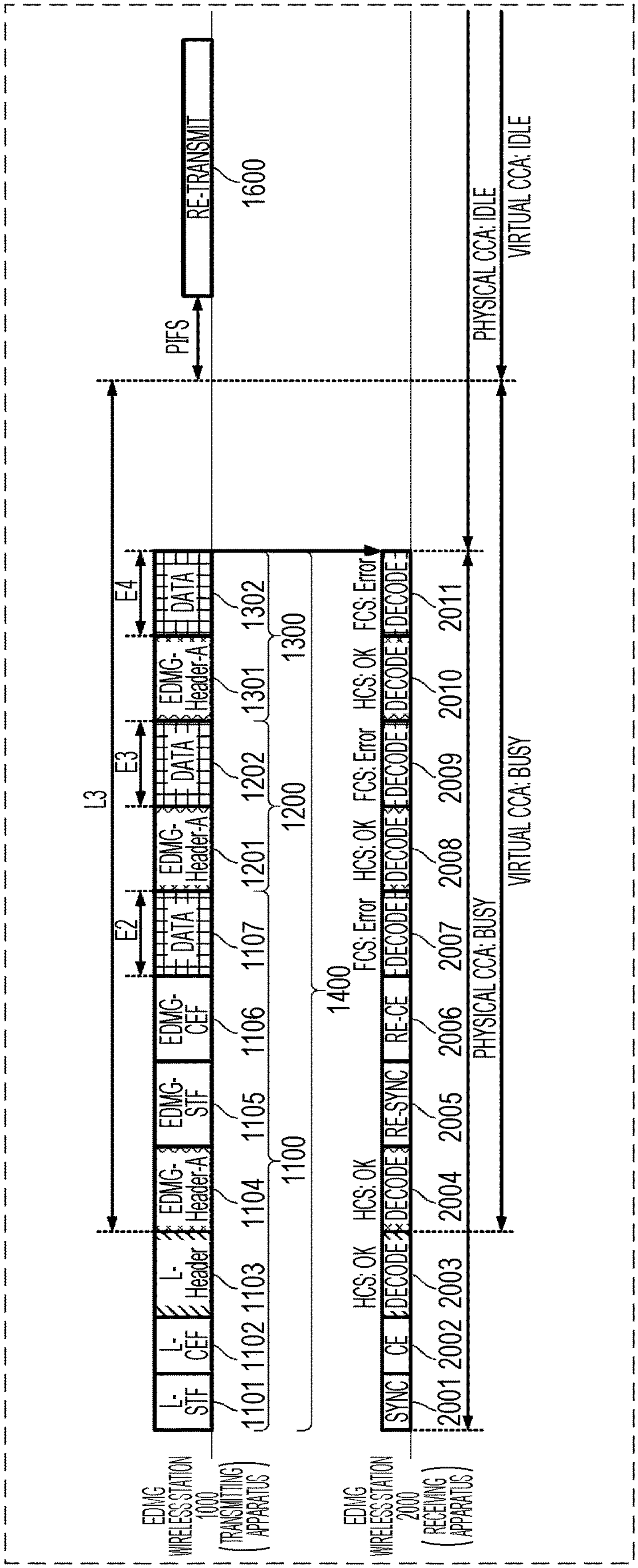
FIG. 29 is a diagram illustrating one example of a process of a transmission source EDMG wireless station and a destination EDMG wireless station when an FCS error occurs in all data fields in communication using EDMG A-PPDU according to Embodiment 3.
Figure 30:
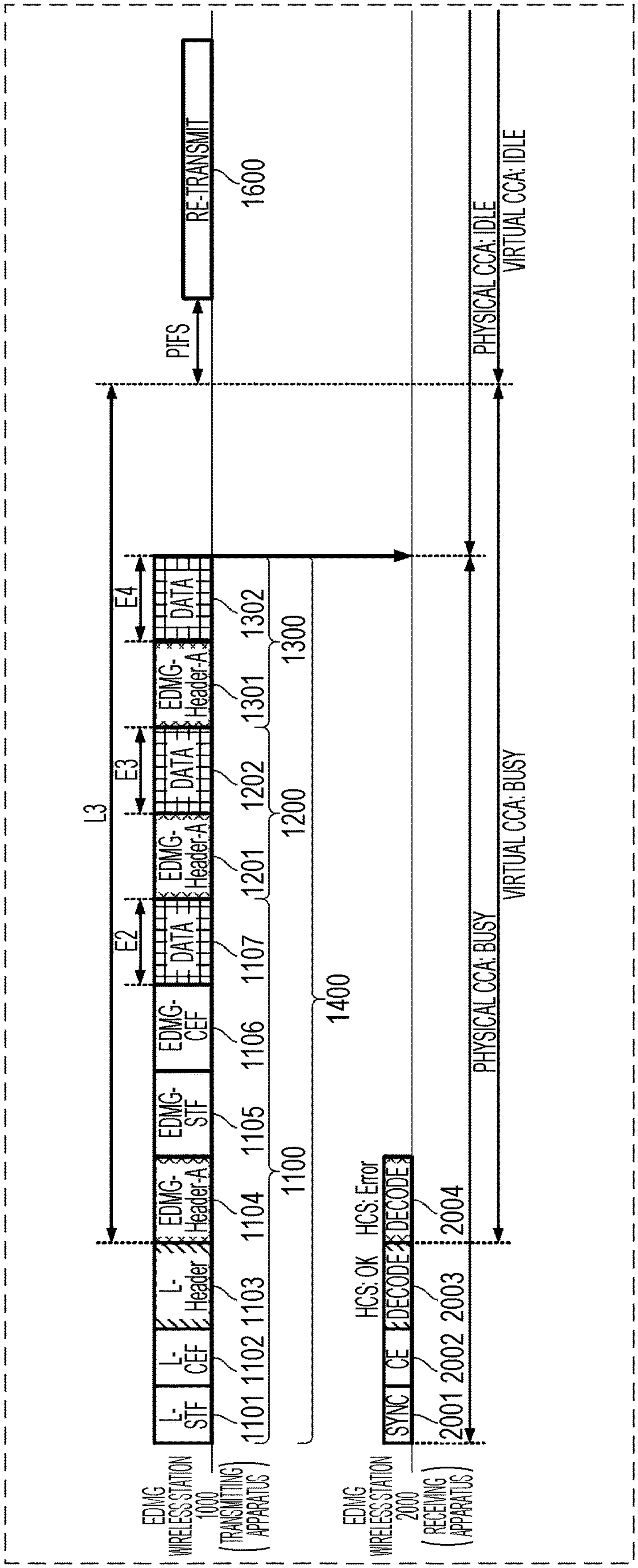
FIG. 30 is a diagram illustrating one example of a process of a transmission source EDMG wireless station and a destination EDMG wireless station when an HCS error occurs in the EDMG-Header-A in communication using EDMG A-PPDU according to Embodiment 3.

Note that in the case in which the destination EDMG wireless station 2000 detects an error by the FCS in all of the MPDUs obtained by the decoding processes 2007, 2009, and 2011 (see FIG. 29), or in the case of detecting an error by the HCS in the decoding 2004 (see FIG. 30), the destination EDMG wireless station 2000 does not transmit the BA 2012. In this case, the transmission source EDMG wireless station 1000 does not receive the BA 2012 within the PIFS time from the completion of transmitting the EDMG A-PPDU 1400, and therefore determines that the EDMG A-PPDU 1400 has not reached the destination EDMG wireless station 2000 correctly, stands by for the duration of the PIFS from the end of the nominal data field length L3, and executes the re-transmission process 1600 of the EDMG A-PPDU 1400.

Figure 31:
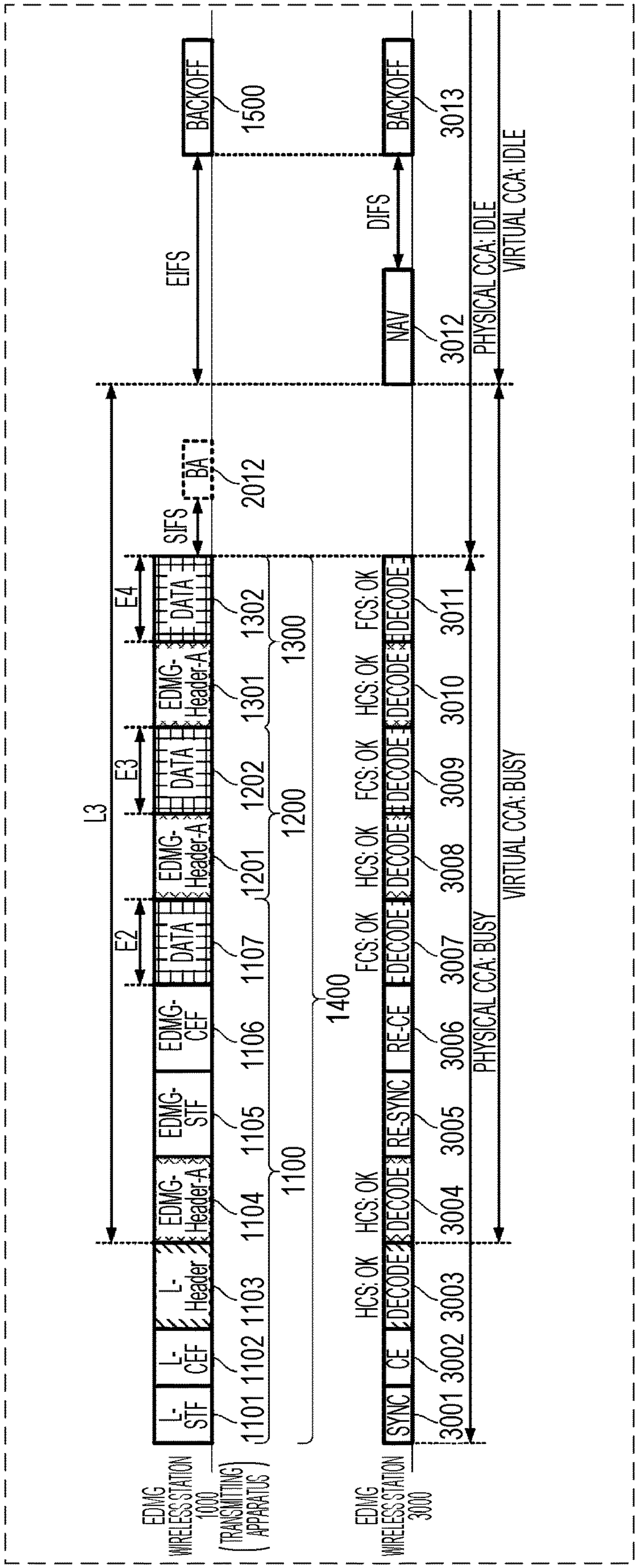
FIG. 31 is a diagram illustrating one example of a process of a transmission source EDMG wireless station and a non-destination EDMG wireless station when receiving correctly in communication using EDMG A-PPDU according to Embodiment 3.

FIG. 31 is a diagram illustrating one example of fields transmitted by and processes executed by a transmission source EDMG wireless station 1000 and a non-destination EDMG wireless station 3000 in communication using EDMG A-PPDU according to Embodiment 3, and corresponds to FIG. 11 of Embodiment 1. Portions which are the same as FIG. 11 are denoted with the same signs, and description thereof is omitted.

Similarly to FIG. 11, in FIG. 31, after the virtual CCA changes from busy to idle, the non-destination EDMG wireless station 3000 sets the NAV 3012, and after the end of the NAV 3012, stands by for the duration of the DIFS, and starts the backoff control 3013.

Figure 32:
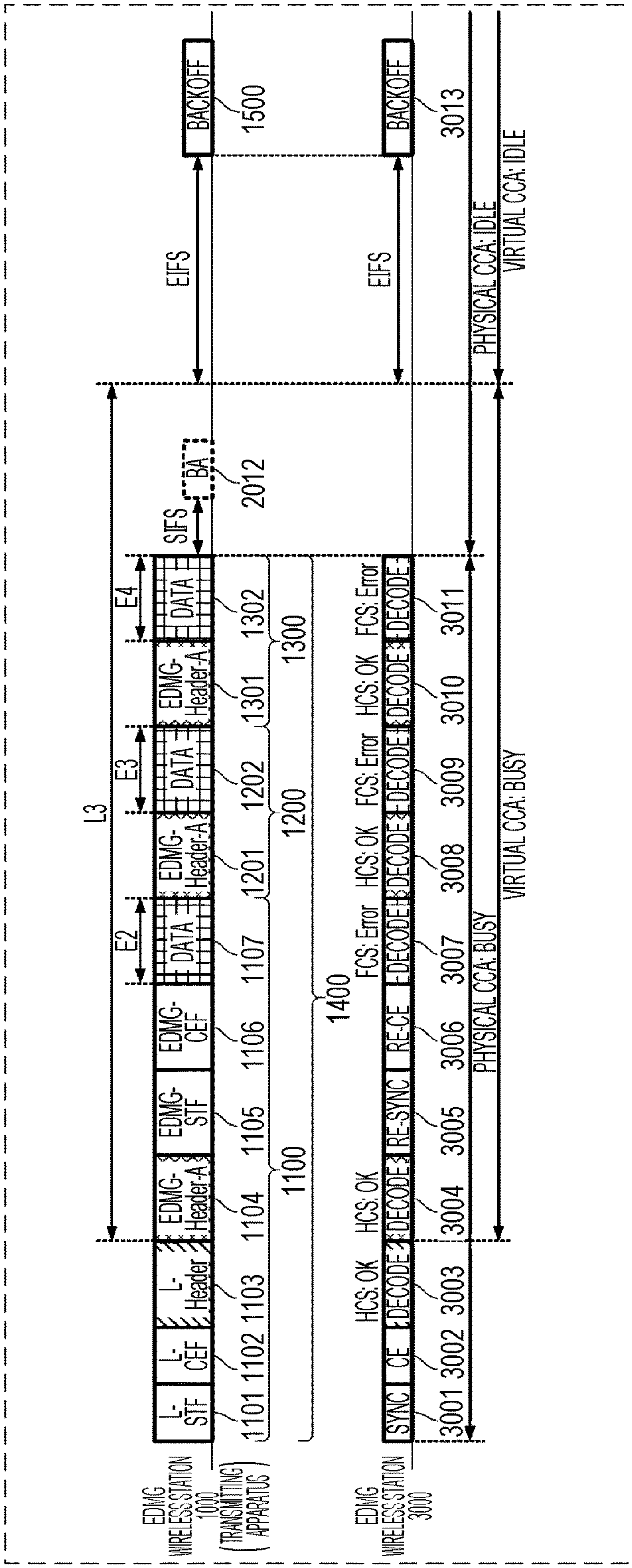
FIG. 32 is a diagram illustrating one example of a process of a transmission source EDMG wireless station and a non-destination EDMG wireless station when an FCS error occurs in all data fields in communication using EDMG A-PPDU according to Embodiment 3.
Figure 33:
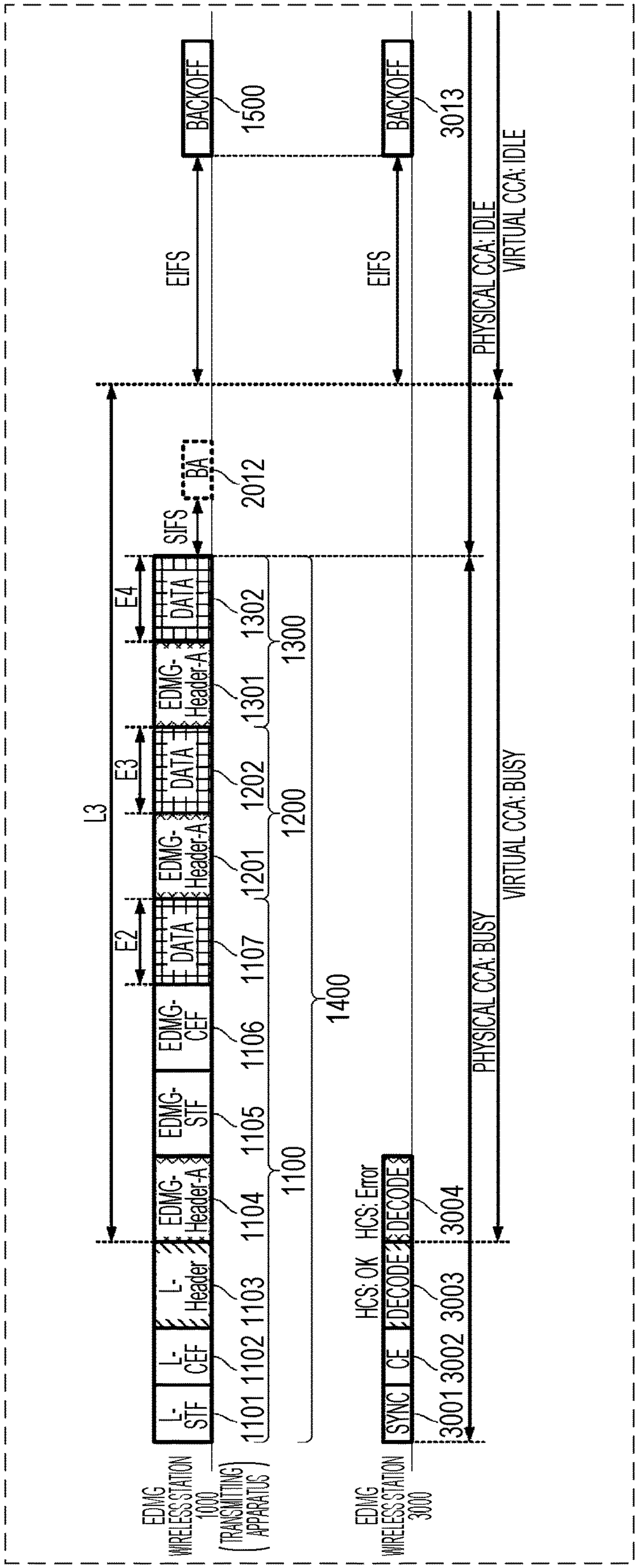
FIG. 33 is a diagram illustrating one example of a process of a transmission source EDMG wireless station and a non-destination EDMG wireless station when an HCS error occurs in the EDMG-Header-A in communication using EDMG A-PPDU according to Embodiment 3.

Note that in the case in which the non-destination EDMG wireless station 3000 detects an error by the FCS in all of the MPDUs obtained by the decoding processes 3007, 3009, and 3011 (see FIG. 32), or in the case of detecting an error by the HCS in the decoding 3004 (see FIG. 33), after the virtual CCA changes from busy to idle, the non-destination EDMG wireless station 3000 stands by for the duration of the EIFS, and starts the backoff control 3013. These processes are the same as the processes of the non-destination EDMG wireless station 3000 in FIGS. 12 and 13 of Embodiment 1.

Figure 34:
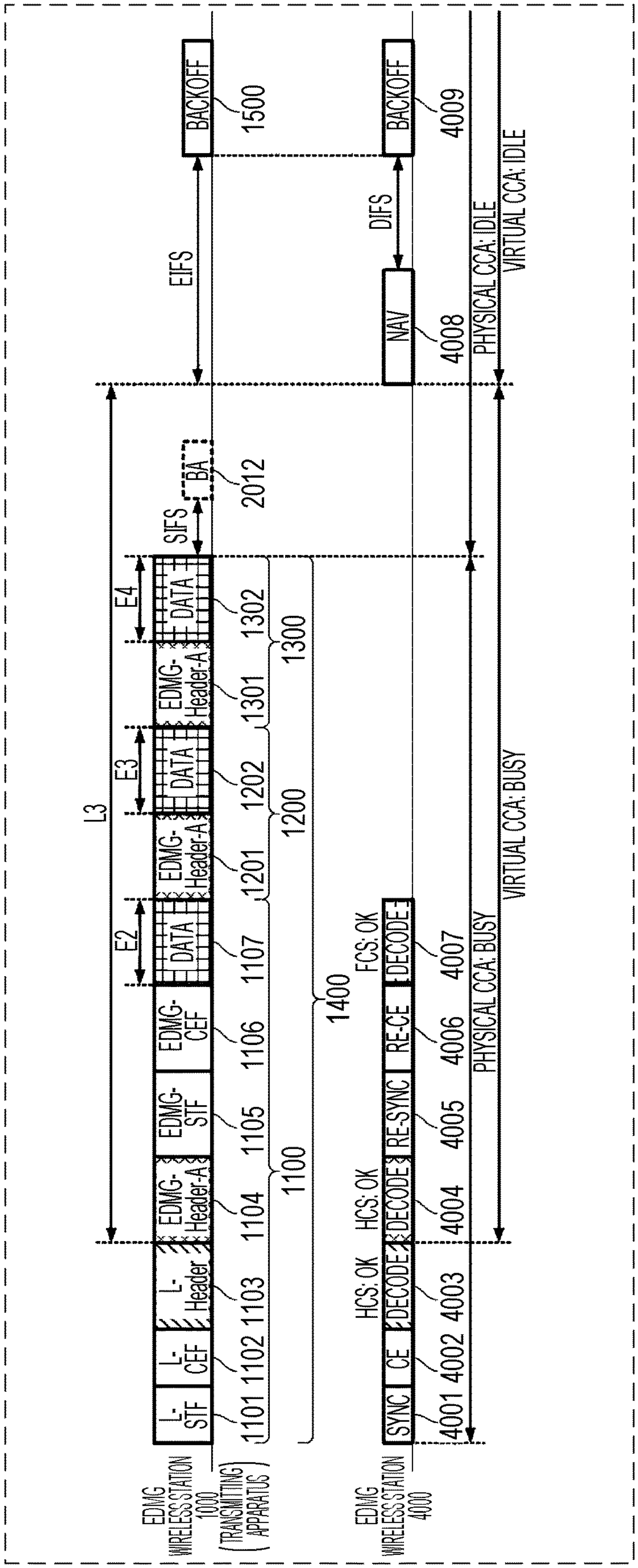
FIG. 34 is a diagram illustrating one example of a process of a transmission source EDMG wireless station and an EDMG wireless station not supporting EDMG A-PPDU when receiving correctly according to Embodiment 3.

FIG. 34 is a diagram illustrating one example of fields transmitted by and processes executed by a transmission source EDMG wireless station 1000 and an EDMG A-PPDU non-supporting EDMG wireless station 4000 in communication using EDMG A-PPDU according to Embodiment 3, and corresponds to FIG. 14 of Embodiment 1. Portions which are the same as FIG. 14 are denoted with the same signs, and description thereof is omitted.

Similarly to FIG. 14, in FIG. 34, after the virtual CCA changes from busy to idle, the EDMG A-PPDU non-supporting EDMG wireless station 4000 sets the NAV 4008, and after the end of the NAV 4008, stands by for the duration of the DIFS, and starts the backoff control 4009. This process is the same as the process of the EDMG A-PPDU non-supporting EDMG wireless station 4000 in FIG. 14 of Embodiment 1.

Figure 35:
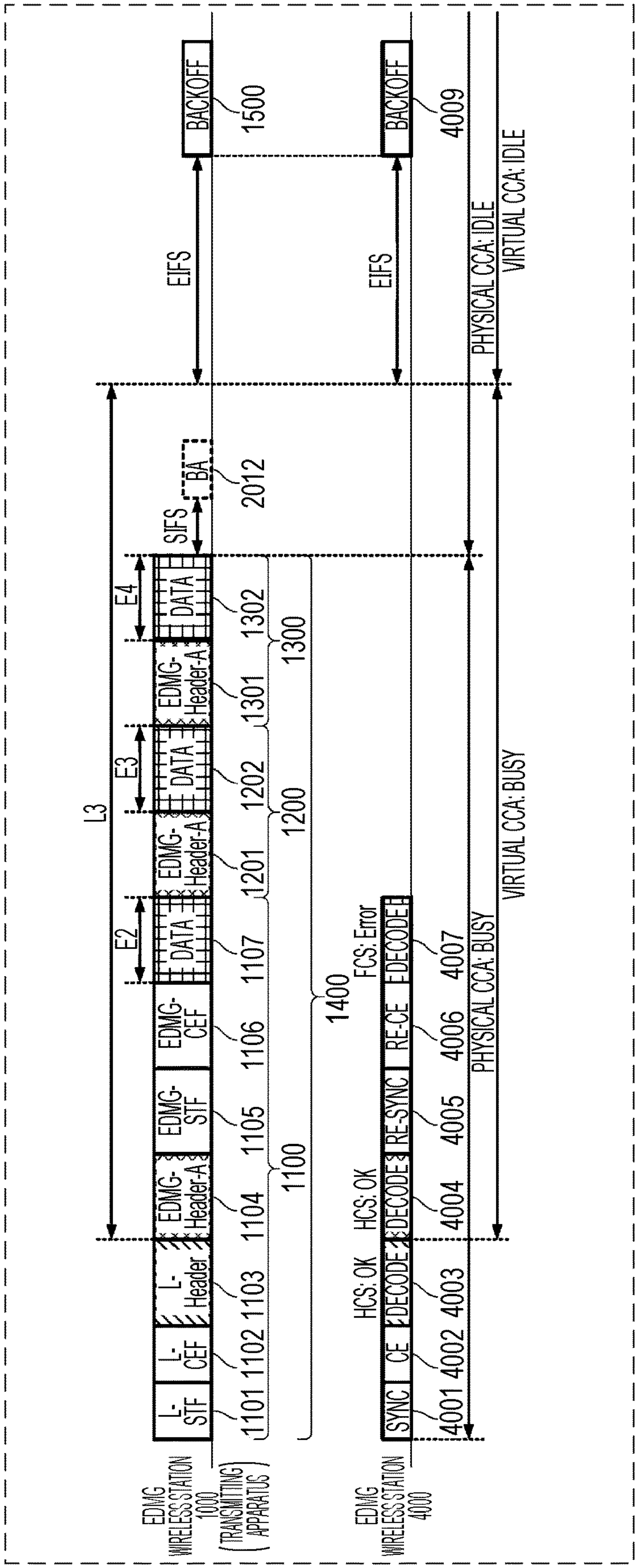
FIG. 35 is a diagram illustrating one example of a process of a transmission source EDMG wireless station and an EDMG wireless station not supporting EDMG A-PPDU when an FCS error occurs in communication using EDMG A-PPDU according to Embodiment 3.
Figure 36:
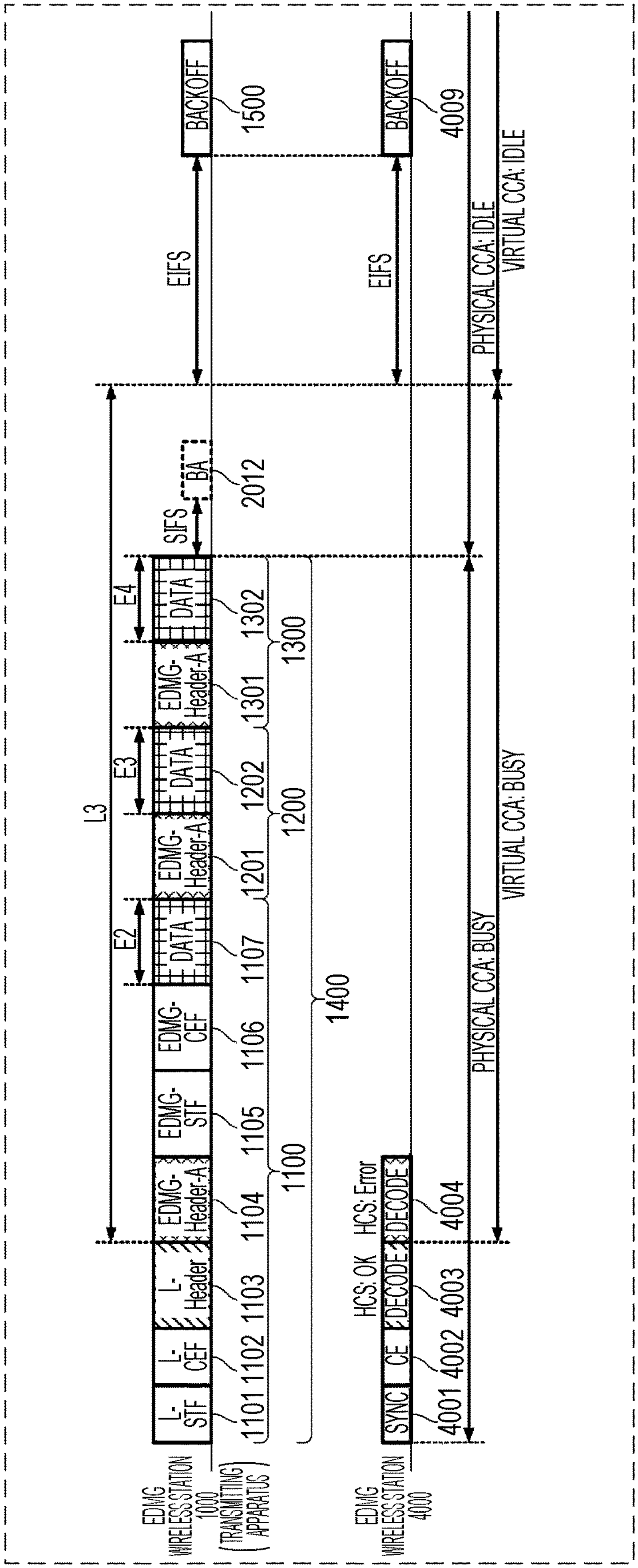
FIG. 36 is a diagram illustrating one example of a process of a transmission source EDMG wireless station and an EDMG wireless station not supporting EDMG A-PPDU when an HCS error occurs in the EDMG-Header-A in communication using EDMG PPDU according to Embodiment 3.

Note that in the case in which the EDMG A-PPDU non-supporting EDMG wireless station 4000 detects an error by the FCS in all of the MPDUs obtained by the decoding process 4007 (see FIG. 35), or in the case of detecting an error by the HCS in the decoding process 4004 (see FIG. 36), after the virtual CCA changes from busy to idle, the EDMG A-PPDU non-supporting EDMG wireless station 4000 stands by for the duration of the EIFS, and starts the backoff control 4009. These processes are the same as the processes of the EDMG A-PPDU non-supporting EDMG wireless station 4000 in FIGS. 15 and 16 of Embodiment 1.

Figure 37:
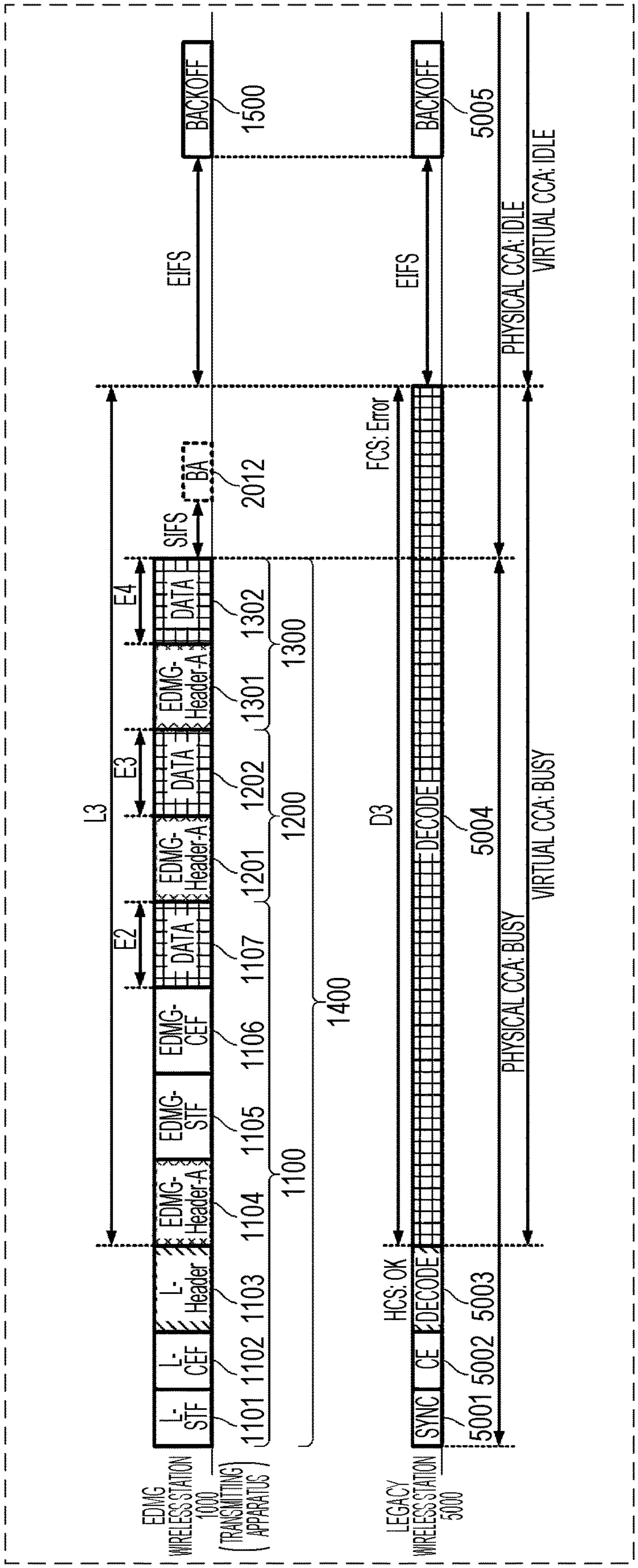
FIG. 37 is a diagram illustrating one example of a process of a transmission source EDMG wireless station and a Legacy EDMG wireless station in communication using EDMG A-PPDU according to Embodiment 3.

FIG. 37 is a diagram illustrating one example of fields transmitted by and processes executed by a transmission source EDMG wireless station 1000 and a legacy wireless station 5000 in communication using EDMG A-PPDU according to Embodiment 3, and corresponds to FIG. 17 of Embodiment 1. Portions which are the same as FIG. 17 are denoted with the same signs, and description thereof is omitted.

Similarly to FIG. 17, in FIG. 37, after the nominal data field length L3 ends, the transmission source EDMG wireless station 1000 stands by for the duration of the EIFS and starts the backoff control 1500, while after the virtual CCA changes from busy to idle, the legacy wireless station 5000 stands by for the duration of the EIFS and starts the backoff control 5005. For this reason, the timings at which the transmission source EDMG wireless station 1000 and the legacy wireless station 5000 start backoff control are aligned.

By the above, according to Embodiment 3, even in the case in which the transmission source EDMG wireless station 1000 sets a long L3 compared to the actual frame length of the EDMG A-PPDU 1400, the destination EDMG wireless station 2000 is able to transmit the BA 2012 after the completion of receiving the EDMG A-PPDU 1400, while moderating interruptions by other wireless stations. Also, the backoff control start timings of an EDMG wireless station and a legacy wireless station may be aligned, and a transmit opportunity may be given uniformly to each wireless station.

Note that in Embodiment 3, the transmission source EDMG wireless station 1000 sets any time L3 equal to or greater than the total time of the combined field length of the EDMG-Header-A 1104, the EDMG-STF 1105, the EDMG-CEF 1106, the Data 1107, the EDMG-Header-A 1201, the Data 1202, the EDMG-Header-A 1301, and the Data 1302, the frame length of the BA 2012, and the SIFS time as a nominal data field length, and does not transmit newly aggregated EDMG PPDUs exceeding a time obtained by subtracting the frame length of the BA 2012 and the SIFS time from the nominal data field length L3. However, like in Embodiment 1, the transmission source EDMG wireless station 1000 may also set any time equal to or greater than the combined field length of the EDMG-Header-A 1104, the EDMG-STF 1105, the EDMG-CEF 1106, the Data 1107, the EDMG-Header-A 1201, the Data 1202, the EDMG-Header-A 1301, and the Data 1302 as the nominal data field length L3, and not transmit newly aggregated EDMG PPDUs exceeding the nominal data field length L3. In this case, the behavior of each wireless station is the same, except that the BA 2012 is transmitted past the nominal data field length L3.

Embodiment 4

Figure 38:
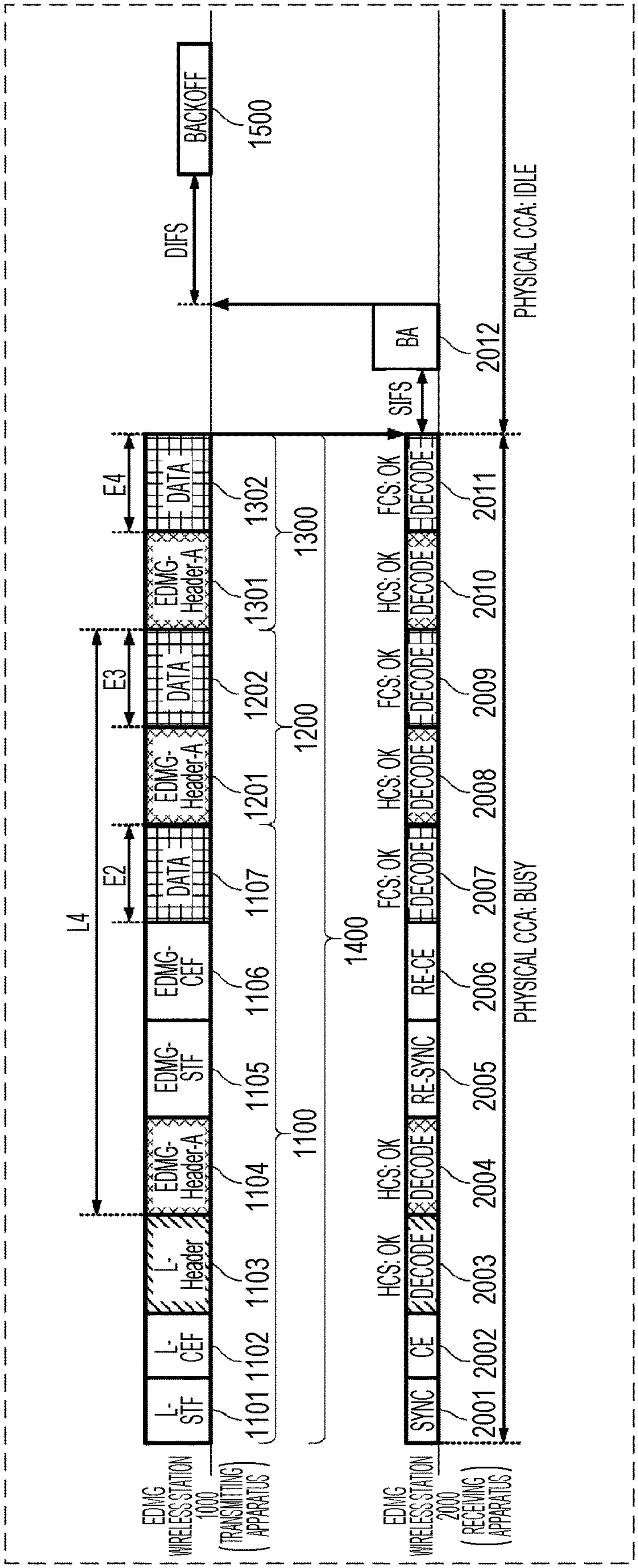
FIG. 38 is a diagram illustrating one example of a process of a transmission source EDMG wireless station and a destination EDMG wireless station when receiving correctly according to Embodiment 4.

FIG. 38 is a diagram illustrating one example of fields transmitted by and processes executed by a transmission source EDMG wireless station 1000 and a destination EDMG wireless station 2000 in communication using EDMG A-PPDU according to Embodiment 4, and corresponds to FIG. 8 of Embodiment 1. Portions which are the same as FIG. 8 are denoted with the same signs, and description thereof is omitted.

The transmission source EDMG wireless station 1000 of FIG. 8 converts any time L2 equal to or greater than the combined field length of the EDMG-Header-A 1104, the EDMG-STF 1105, the EDMG-CEF 1106, the Data 1107, the EDMG-Header-A 1201, the Data 1202, the EDMG-Header-A 1301, and the Data 1302 to an octet size D2 on the basis of a predetermined calculation method, and sets the size in the Length field of the L-Header 1103, but in FIG. 38, the transmission source EDMG wireless station 1000 sets a nominal data field length L4 for a legacy wireless station from a data size known in advance before the transmission of the EDMG A-PPDU 1400, such as a data size accumulated in a buffer, for example, converts L4 into a nominal data octet size D4 on the basis of a predetermined calculation method, and sets the size in the Length field of the L-Header 1103. In FIG. 38, the Data 1107 and 1202 are accumulated in a buffer.

Also, in FIG. 8, the transmission source EDMG wireless station 1000 does not transmit newly aggregated EDMG PPDUs exceeding the nominal data field length L2, but in FIG. 38, in the case in which the Data 1302 to be added is input into the buffer before the transmission of the EDMG-Header-A 1201 of the second EDMG PPDU 1200 placed at the tail end when starting transmission, the transmission source EDMG wireless station 1000 may aggregate the third EDMG PPDU 1300 after the second EDMG PPDU 1200.

The operations of the destination EDMG wireless station 2000 in FIG. 38 are the same as the operations illustrated in FIG. 18 of Embodiment 2.

Note that, although not illustrated, in the case in which the BA 2012 indicates the existence of an MPDU that was not received correctly, or in the case in which an HCS error or an FCS error occurs in the decoding of the BA 2012, the transmission source EDMG wireless station 1000 stands by for the duration of the SIFS after the completion of receiving the BA 2012, and re-transmits a packet including the MDPU that was not received correctly.

Figure 39:
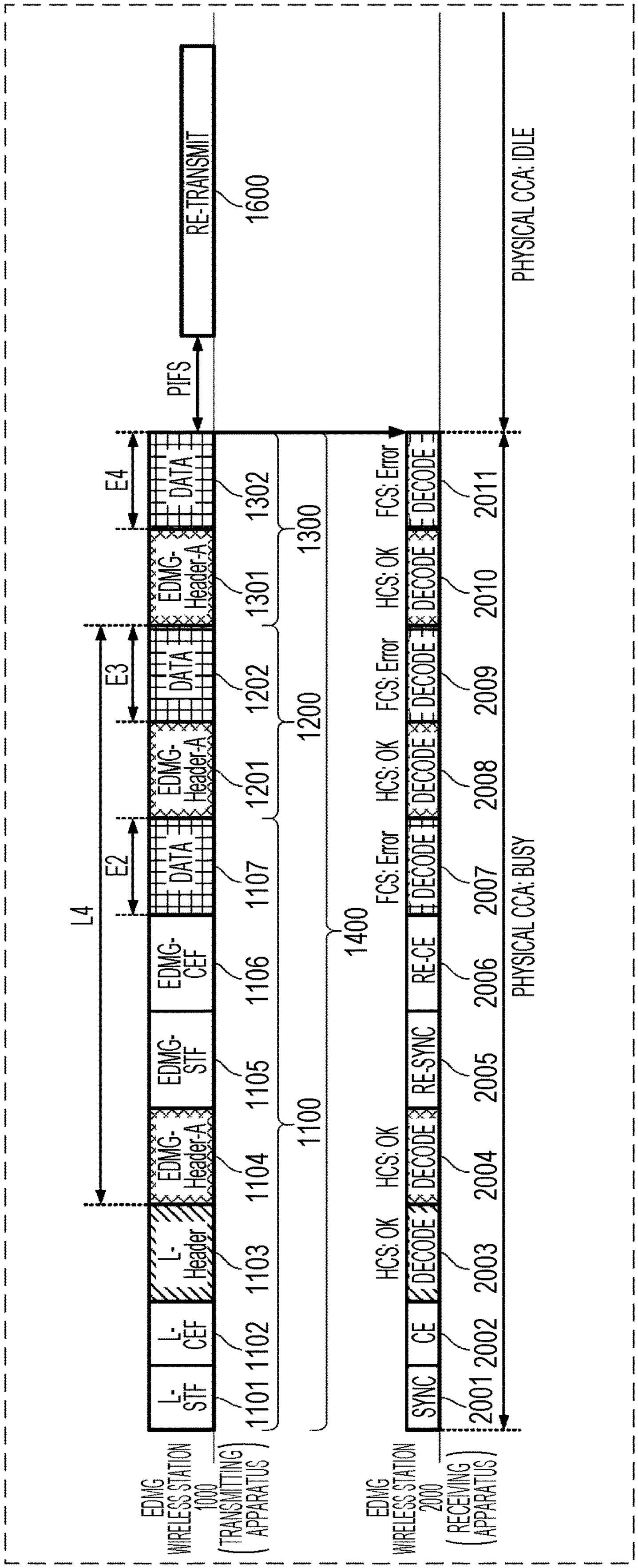
FIG. 39 is a diagram illustrating one example of a process of a transmission source EDMG wireless station and a destination EDMG wireless station when an FCS error occurs in all data fields in communication using EDMG A-PPDU according to Embodiment 4.
Figure 40:
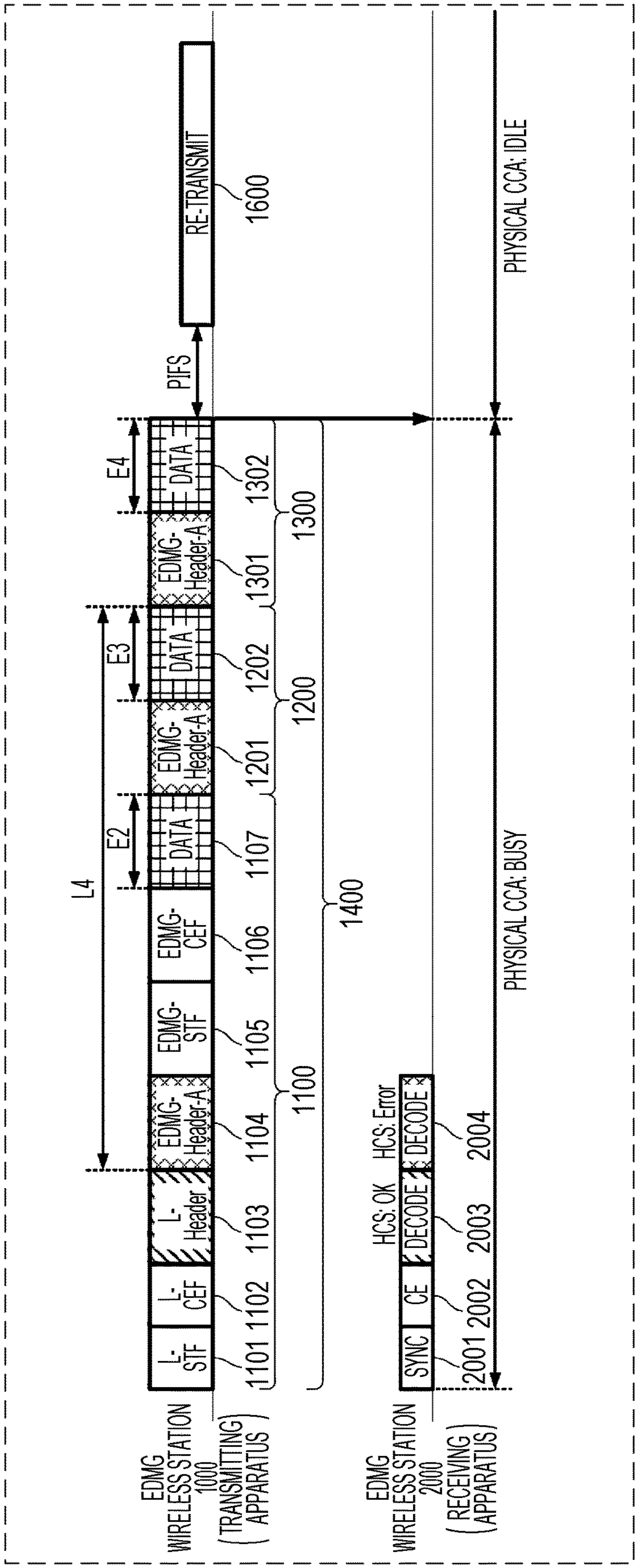
FIG. 40 is a diagram illustrating one example of a process of a transmission source EDMG wireless station and a destination EDMG wireless station when an HCS error occurs in the EDMG-Header-A in communication using EDMG A-PPDU according to Embodiment 4.

Note that in the case in which the destination EDMG wireless station 2000 detects an error by the FCS in all of the MPDUs obtained by the decoding processes 2007, 2008, and 2011 (see FIG. 39), or in the case of detecting an error by the HCS in the decoding 2004 (see FIG. 40), the destination EDMG wireless station 2000 does not transmit the BA 2012. In this case, the transmission source EDMG wireless station 1000 does not receive the BA 2012 within the PIFS time from the completion of transmitting the EDMG A-PPDU 1400, and therefore determines that the EDMG A-PPDU 1400 has not reached the destination EDMG wireless station 2000 correctly, and executes the re-transmission process 1600 of the EDMG A-PPDU 1400. These processes are the same as the processes of the destination EDMG wireless station 2000 in FIGS. 19 and 20 of Embodiment 2.

Figure 41:
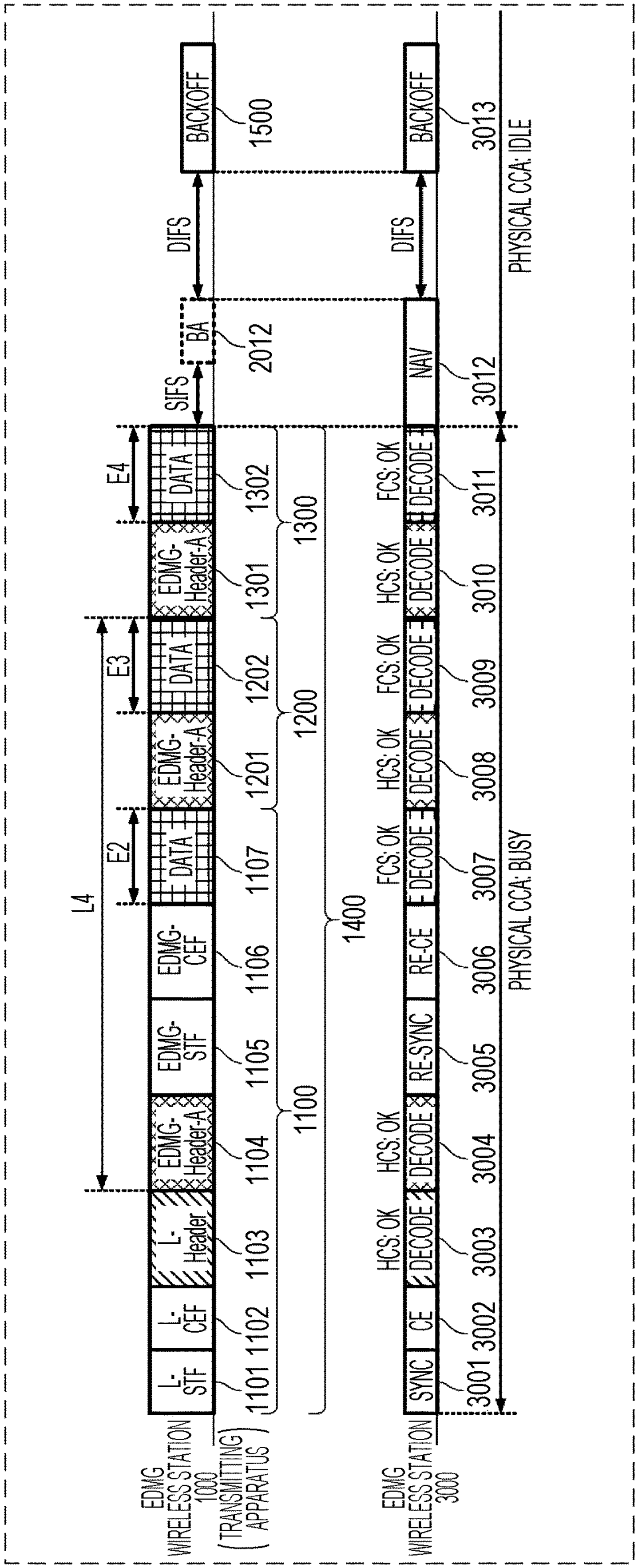
FIG. 41 is a diagram illustrating one example of a process of a transmission source EDMG wireless station and a non-destination EDMG wireless station when receiving correctly in communication using EDMG A-PPDU according to Embodiment 4.

FIG. 41 is a diagram illustrating one example of fields transmitted by and processes executed by a transmission source EDMG wireless station 1000 and a non-destination EDMG wireless station 3000 in communication using EDMG A-PPDU according to Embodiment 4, and corresponds to FIG. 11 of Embodiment 1. Portions which are the same as FIG. 11 are denoted with the same signs, and description thereof is omitted.

In FIG. 11, after the virtual CCA that is busy for the duration of the nominal data field length L2 changes to idle, the non-destination EDMG wireless station 3000 sets the NAV 3012, and after the NAV 3012 ends, stands by for the duration of the DIFS, and starts the backoff control 3013. However, in FIG. 41, after the transmission of the third EDMG PPDU 1300 aggregated exceeding the nominal data field length L4 ends and the physical CCA changes from busy to idle, the non-destination EDMG wireless station 3000 sets the NAV 3012, and after the end of the NAV 3012, stands by for the duration of the DIFS, and starts the backoff control 3013. This operation is the same as the operation of the non-destination EDMG wireless station 3000 in FIG. 21 of Embodiment 2.

Figure 42:
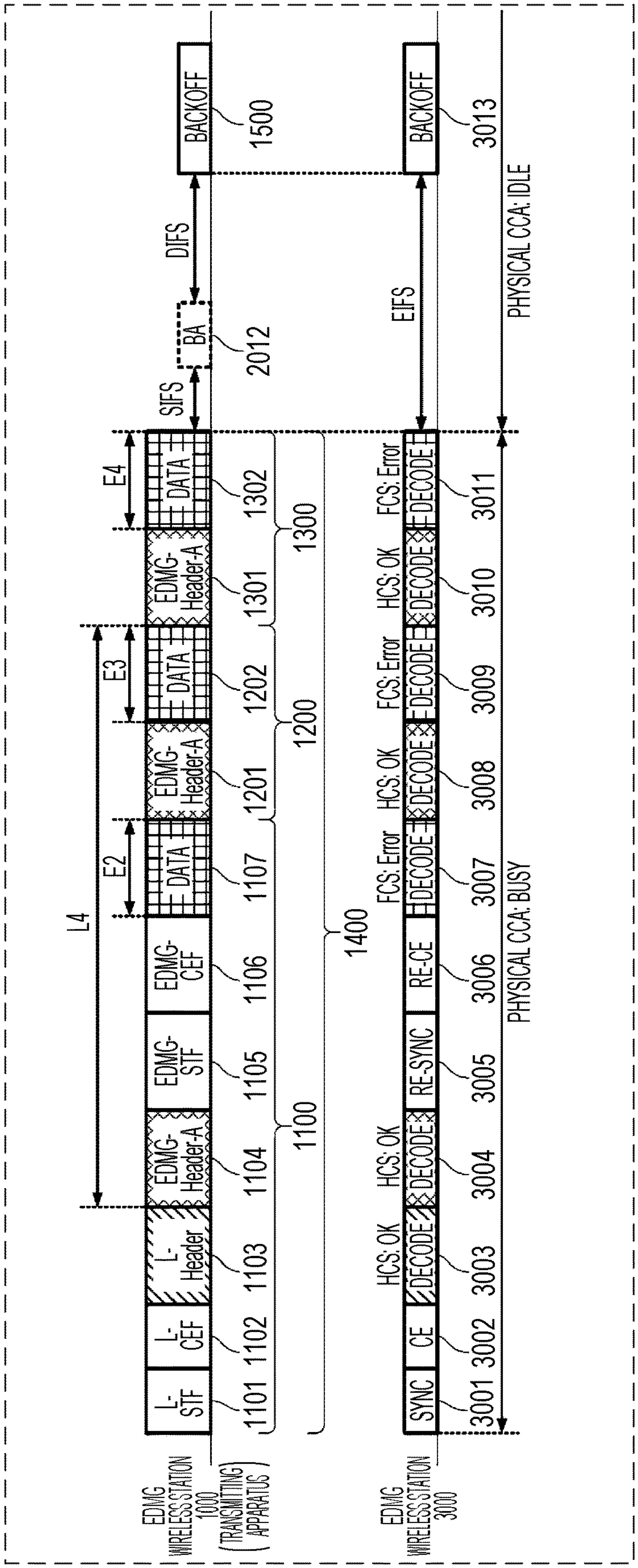
FIG. 42 is a diagram illustrating one example of a process of a transmission source EDMG wireless station and a non-destination EDMG wireless station when an FCS error occurs in all data fields in communication using EDMG A-PPDU according to Embodiment 4.
Figure 43:
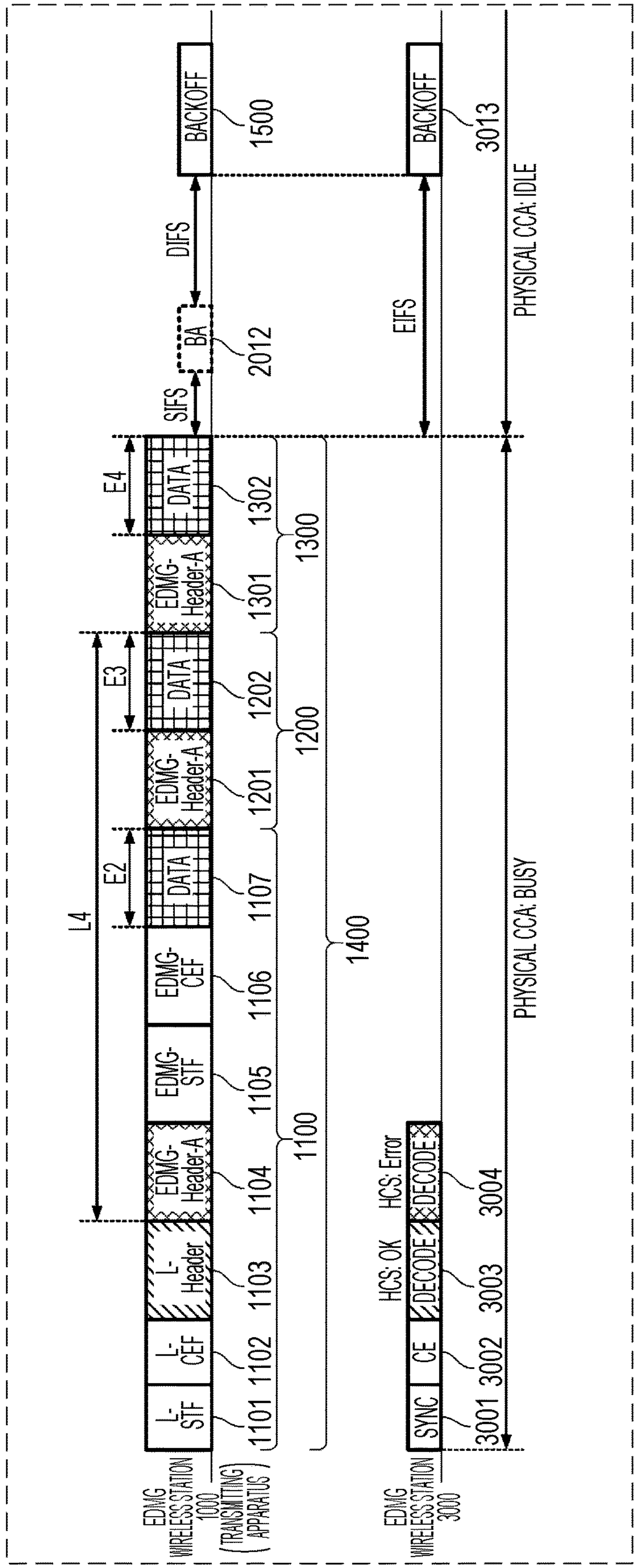
FIG. 43 is a diagram illustrating one example of a process of a transmission source EDMG wireless station and a non-destination EDMG wireless station when an HCS error occurs in the EDMG-Header-A in communication using EDMG A-PPDU according to Embodiment 4.

Note that in the case in which the non-destination EDMG wireless station 3000 detects an error by the FCS in all of the MPDUs obtained by the decoding processes 3007, 3009, and 3011 (see FIG. 42), or in the case of detecting an error by the HCS in the decoding 3004 (see FIG. 43), after the physical CCA changes from busy to idle, the non-destination EDMG wireless station 3000 stands by for the duration of the EIFS, and starts the backoff control 3013. These processes are the same as the processes of the non-destination EDMG wireless station 3000 in FIGS. 22 and 23 of Embodiment 2.

Figure 44:
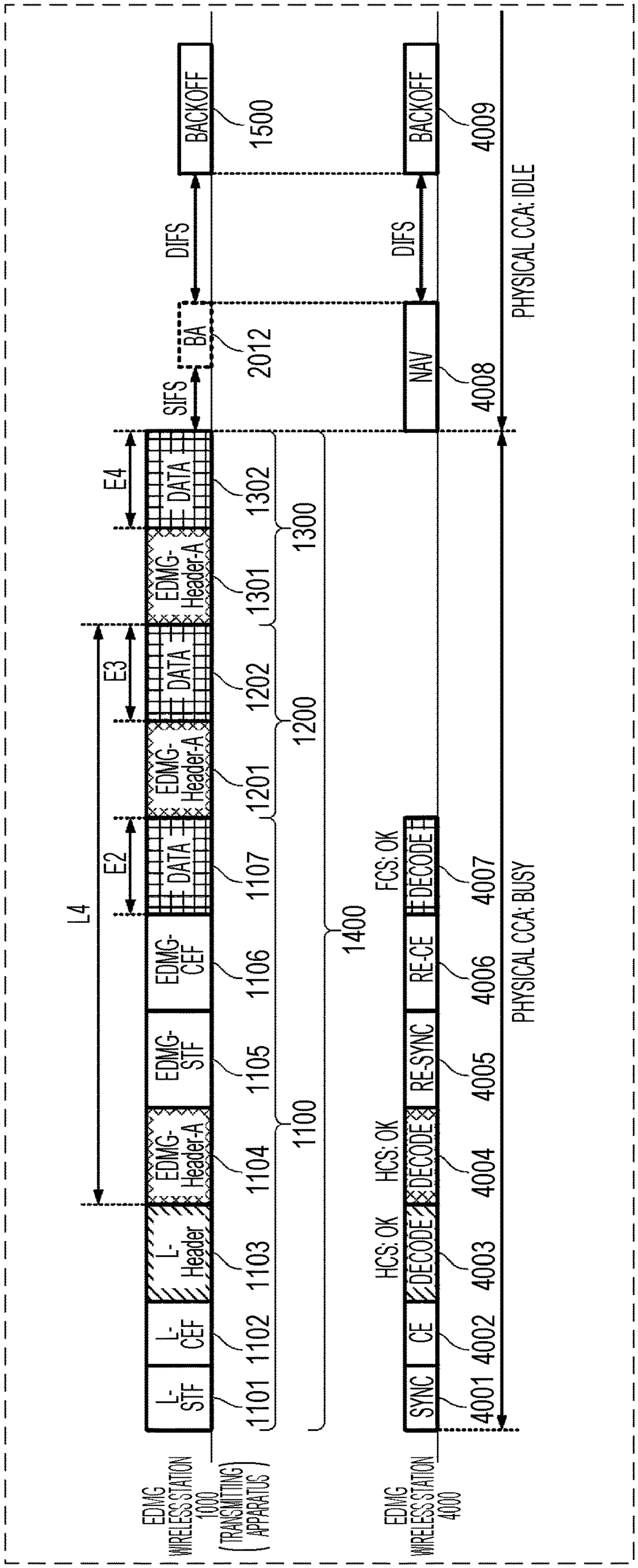
FIG. 44 is a diagram illustrating one example of a process of a transmission source EDMG wireless station and an EDMG wireless station not supporting EDMG A-PPDU when receiving correctly according to Embodiment 4.

FIG. 44 is a diagram illustrating one example of fields transmitted by and processes executed by a transmission source EDMG wireless station 1000 and an EDMG A-PPDU non-supporting EDMG wireless station 4000 in communication using EDMG A-PPDU according to Embodiment 4, and corresponds to FIG. 14 of Embodiment 1. Portions which are the same as FIG. 14 are denoted with the same signs, and description thereof is omitted.

In FIG. 14, after the virtual CCA that is busy for the duration of the nominal data field length L2 changes to idle, the EDMG A-PPDU non-supporting EDMG wireless station 4000 sets the NAV 4008, and after the NAV 4008 ends, stands by for the duration of the DIFS, and starts the backoff control 4009. However, in FIG. 44, after the transmission of the third EDMG PPDU 1300 aggregated past the nominal data field length L4 ends and the physical CCA changes from busy to idle, the EDMG A-PPDU non-supporting EDMG wireless station 4000 sets the NAV 4008, and after the NAV 4008 ends, stands by for the duration of the DIFS, and starts the backoff control 4009. This operation is the same as the operation of the EDMG A-PPDU non-supporting EDMG wireless station 4000 in FIG. 24 of Embodiment 2.

Figure 45:
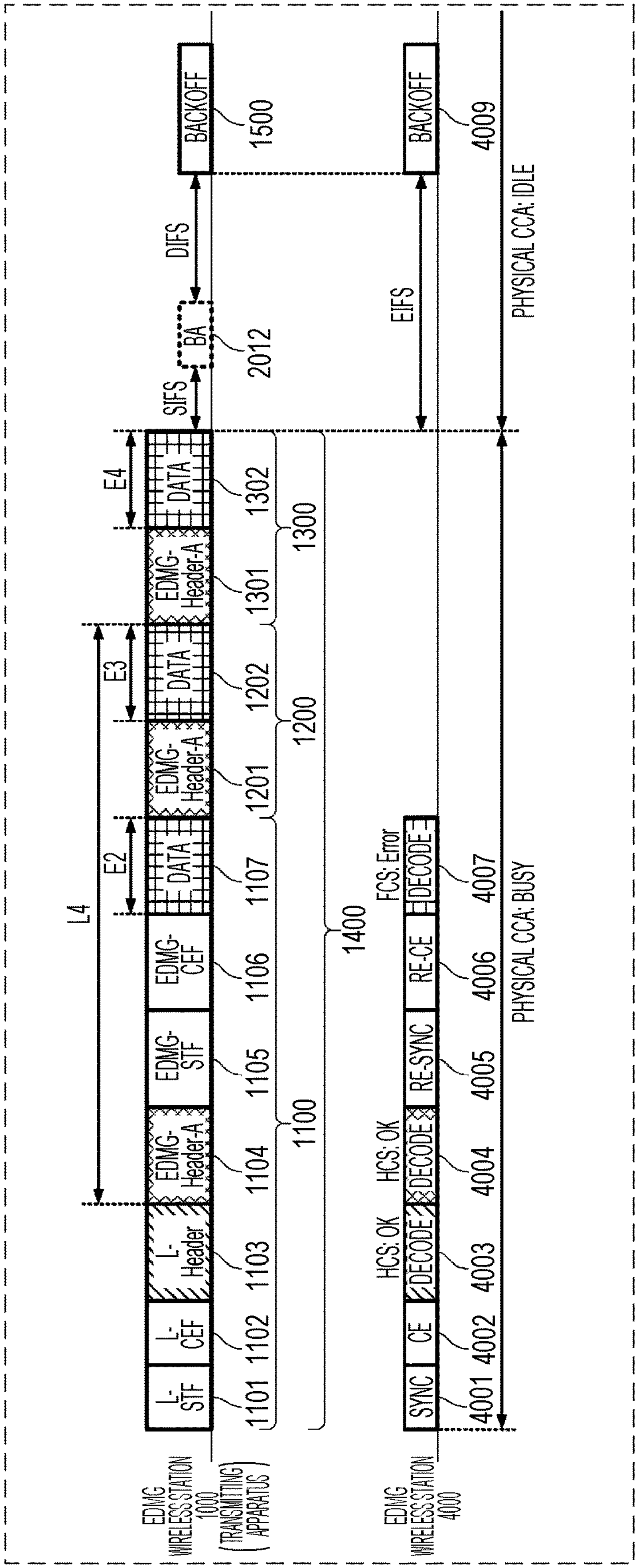
FIG. 45 is a diagram illustrating one example of a process of a transmission source EDMG wireless station and an EDMG wireless station not supporting EDMG A-PPDU when an FCS error occurs in communication using EDMG A-PPDU according to Embodiment 4.
Figure 46:
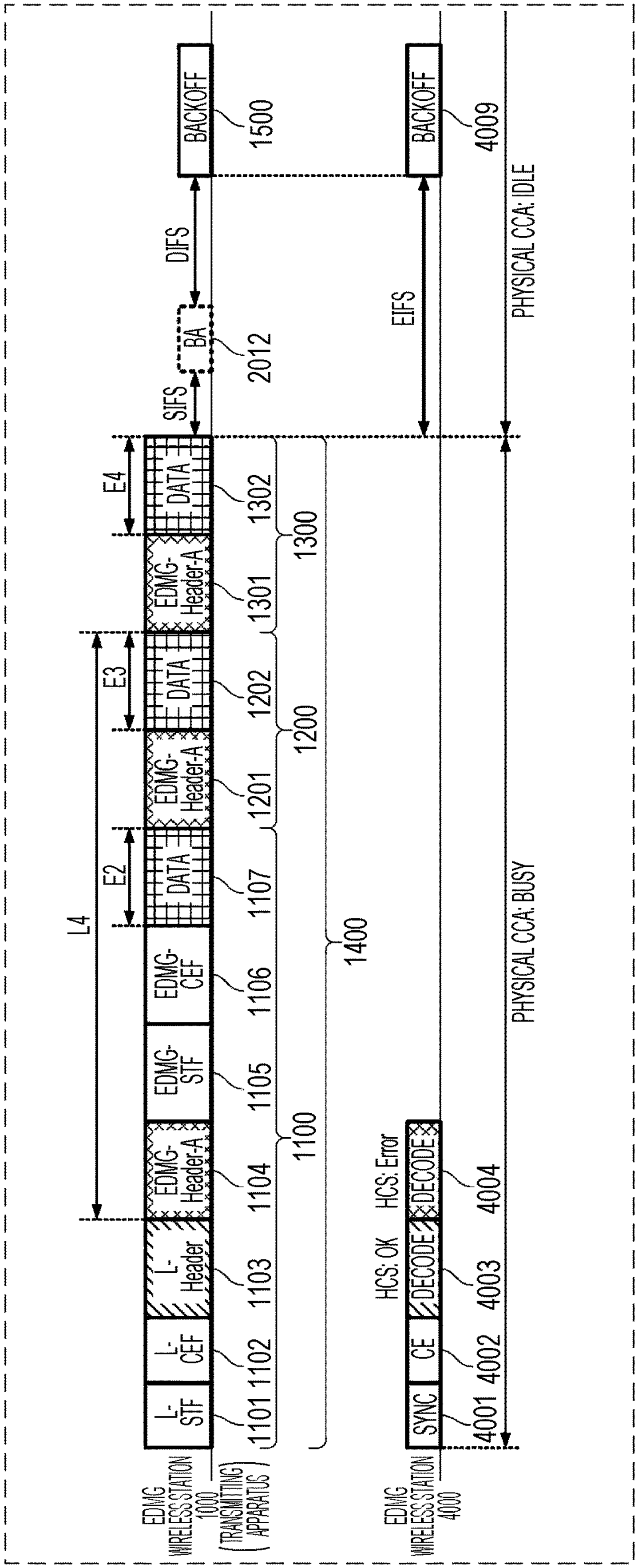
FIG. 46 is a diagram illustrating one example of a process of a transmission source EDMG wireless station and an EDMG wireless station not supporting EDMG A-PPDU when an HCS error occurs in the EDMG-Header-A in communication using EDMG A-PPDU according to Embodiment 4.

Note that in the case in which the EDMG A-PPDU non-supporting EDMG wireless station 4000 detects an error by the FCS in all of the MPDUs obtained by the decoding process 4007 (see FIG. 45), or in the case of detecting an error by the HCS in the decoding process 4004 (see FIG. 46), after the physical CCA changes from busy to idle, the EDMG A-PPDU non-supporting EDMG wireless station 4000 stands by for the duration of the EIFS, and starts the backoff control 4009. These operations are the same as the operations of the EDMG A-PPDU non-supporting EDMG wireless station 4000 in FIGS. 25 and 26 of Embodiment 2.

Figure 47:
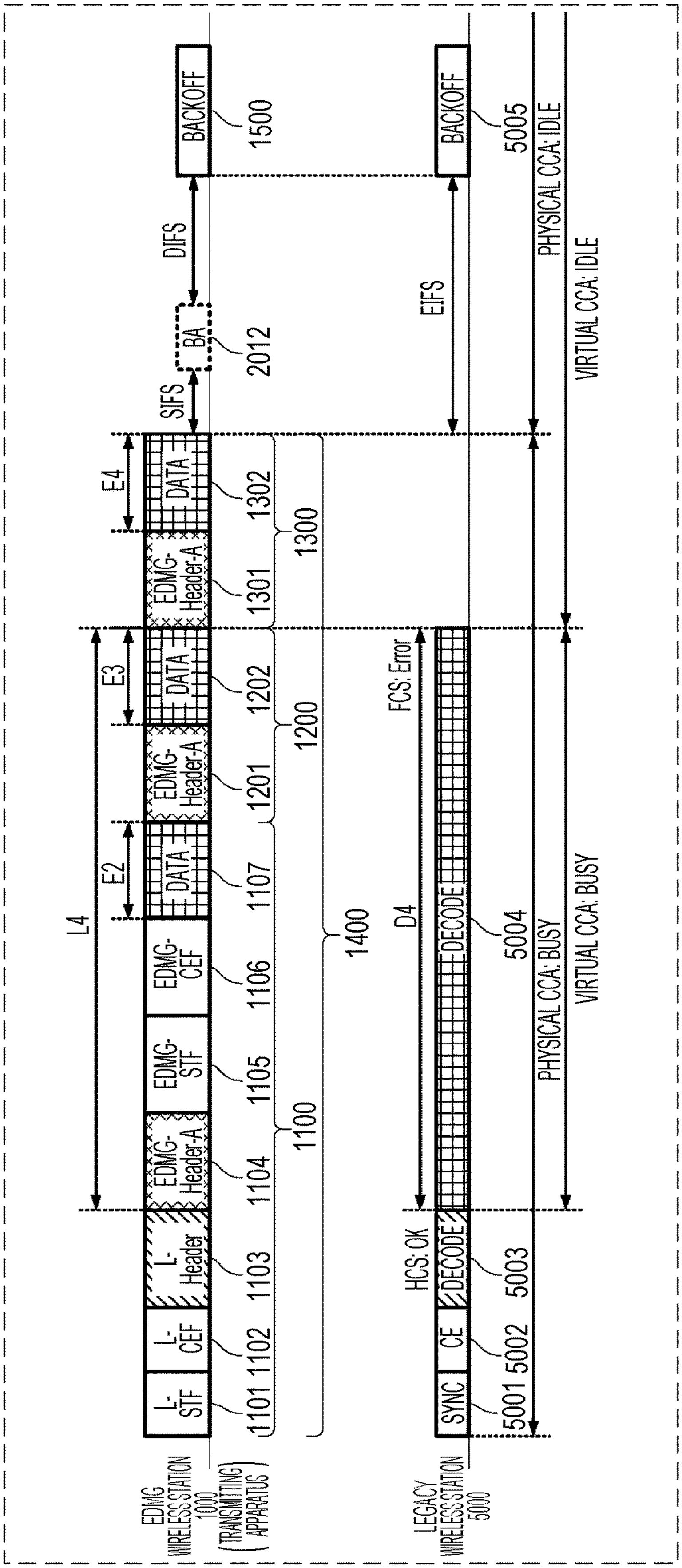
FIG. 47 is a diagram illustrating one example of a process of a transmission source EDMG wireless station and a Legacy EDMG wireless station in communication using EDMG A-PPDU according to Embodiment 4.

FIG. 47 is a diagram illustrating one example of fields transmitted/received by and processes executed by a transmission source EDMG wireless station 1000 and a legacy wireless station 5000 in communication using EDMG A-PPDU according to Embodiment 4, and corresponds to FIG. 17 of Embodiment 1. Portions which are the same as FIG. 17 are denoted with the same signs, and description thereof is omitted.

In FIG. 47, in the case in which an error is not detected by the HCS in the decoding process 5003, since the legacy wireless station 5000 is able to determine that the nominal data octet size is D4, the legacy wireless station 5000 sets the virtual CCA to busy and executes the decoding process 5004 treating from the EDMG-Header-A 1104 to the Data 1202 as the data field. Subsequently, similarly to FIG. 17, the legacy wireless station 5000 detects an error by the FCS in the decoding process 5004.

The legacy wireless station 5000 does not perform a decoding process on the EDMG-Header-A 1301 and the Data 1302, and sets the virtual CCA to idle. At this time, since the physical CCA is busy, the legacy wireless station 5000 determines that a wireless station not illustrated is using the wireless channel, and stands by to transmit.

After the physical CCA changes from busy to idle, the legacy wireless station 5000 stands by for the duration of the EIFS, and then starts the backoff control 5005.

By the above, according to Embodiment 4, after the completion of receiving the EDMG A-PPDU 1400, the destination EDMG wireless station 2000 is able to transmit the BA 2012 while moderating interruptions by other wireless stations, and the legacy wireless station 5000 is able to reduce power consumption.

Embodiment 5

Figure 48:
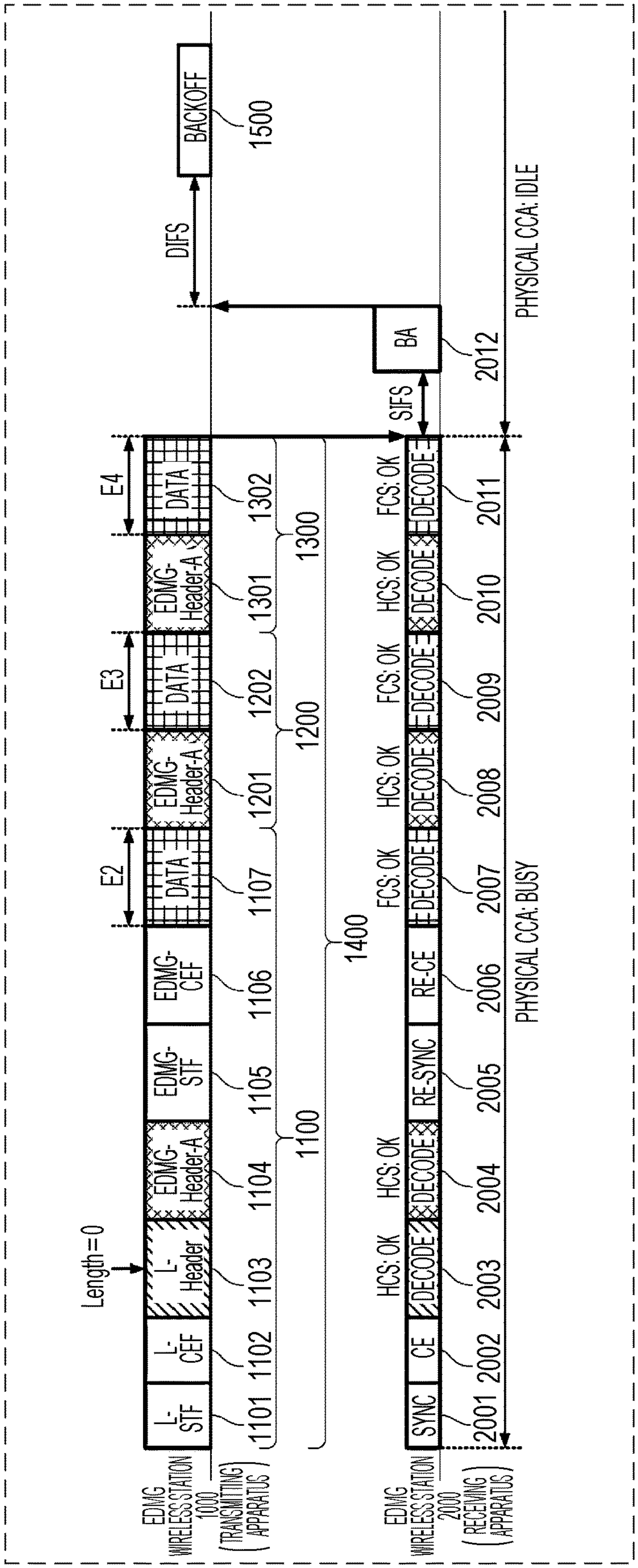
FIG. 48 is a diagram illustrating one example of a process of a transmission source EDMG wireless station and a destination EDMG wireless station when receiving correctly according to Embodiment 5.

FIG. 48 is a diagram illustrating one example of fields transmitted/received by and processes executed by a transmission source EDMG wireless station 1000 and a destination EDMG wireless station 2000 in communication using EDMG A-PPDU according to Embodiment 5, and corresponds to FIG. 38 of Embodiment 4. Portions which are the same as FIG. 38 are denoted with the same signs, and description thereof is omitted.

In FIG. 38, the transmission source EDMG wireless station 1000 sets a nominal data field length L4 for a legacy wireless station from a data size known in advance before the transmission of the EDMG A-PPDU 1400, such as the data size accumulated in the buffer, for example, converts the nominal data field length L4 to the octet size D4 on the basis of a predetermined calculation method, sets the size in the Length field of the L-Header 1103. However, in FIG. 48, the transmission source EDMG wireless station 1000 sets the Length field of the L-Header 1103 to 0.

Other processes of the transmission source EDMG wireless station 1000 and the processes of the destination EDMG wireless station 2000 in FIG. 48 are the same as those in FIG. 38.

Note that, although not illustrated, in the case in which the BA 2012 indicates the existence of an MPDU that was not received correctly, or in the case in which an HCS error or an FCS error occurs in the decoding of the BA 2012, the transmission source EDMG wireless station 1000 stands by for the duration of the SIFS after the completion of receiving the BA 2012, and then executes re-transmission 1600 of a packet including the MPDU that was not received correctly, or stands by for the duration of the DIFS, and after performing the backoff control, re-transmits a packet including the MPDU that was not received correctly.

Figure 49:
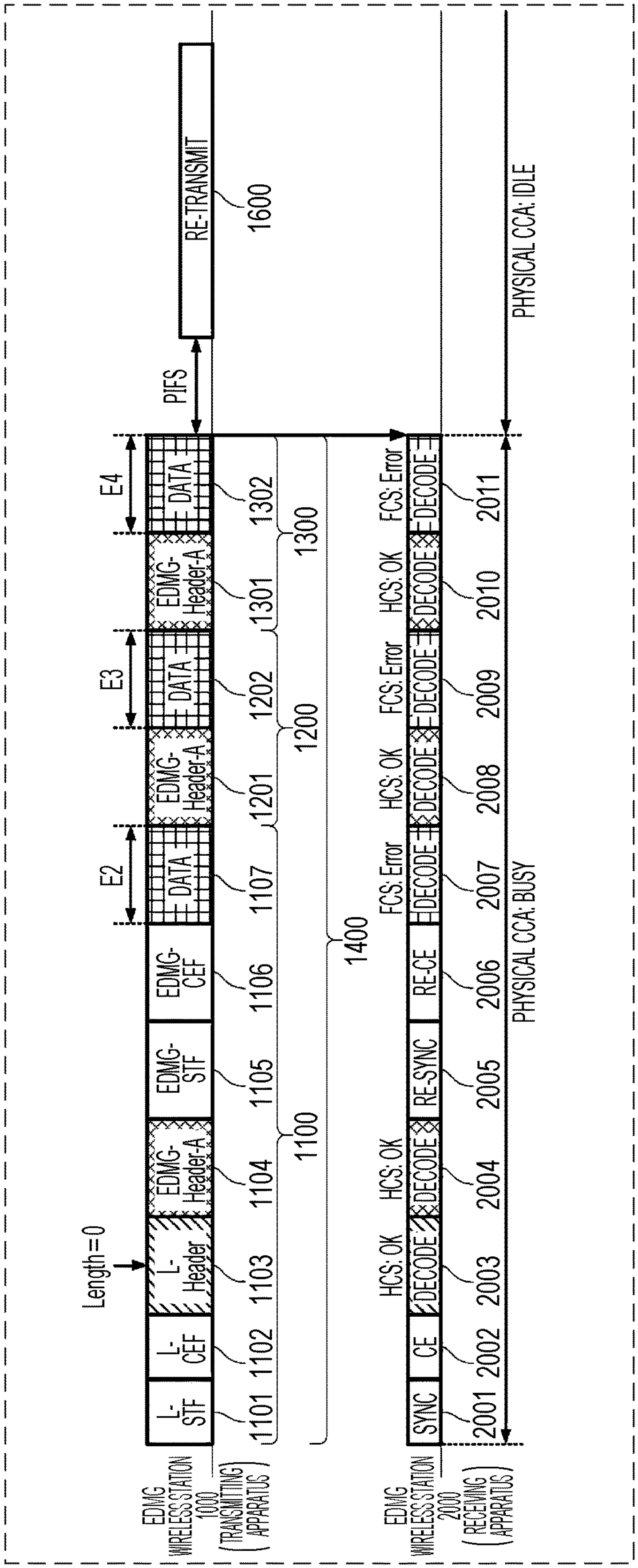
FIG. 49 is a diagram illustrating one example of a process of a transmission source EDMG wireless station and a destination EDMG wireless station when an FCS error occurs in all data fields in communication using EDMG A-PPDU according to Embodiment 5.
Figure 50:
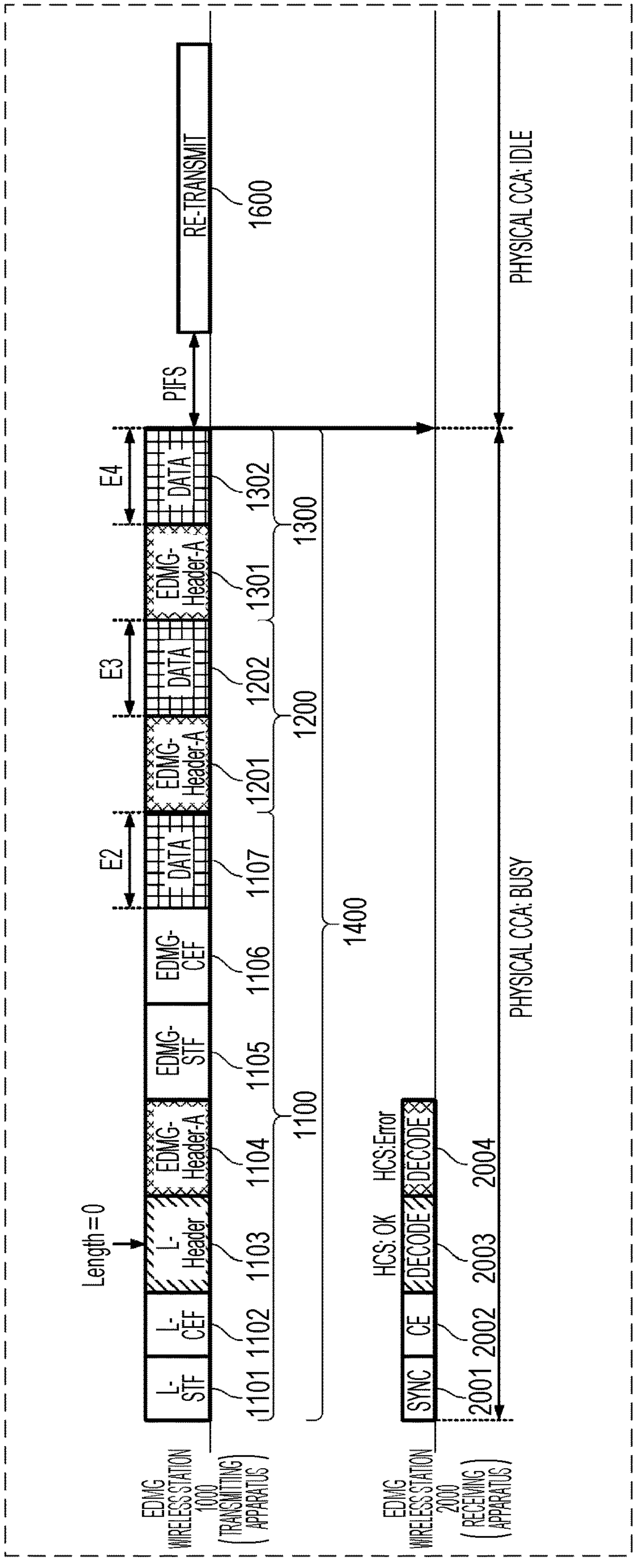
FIG. 50 is a diagram illustrating one example of a process of a transmission source EDMG wireless station and a destination EDMG wireless station when an HCS error occurs in the EDMG-Header-A in communication using EDMG A-PPDU according to Embodiment 5.

Note that in the case in which the destination EDMG wireless station 2000 detects an error by the FCS in all obtained by the decoding processes 2007, 2008, and 2011 (see FIG. 49), or in the case of detecting an error by the HCS in the decoding process 2004 (see FIG. 50), the destination EDMG wireless station 2000 does not transmit the BA 2012.

In this case, the transmission source EDMG wireless station 1000 does not receive the BA 2012 within the PIFS time from the completion of transmitting the EDMG A-PPDU 1400, and therefore determines that the EDMG A-PPDU 1400 has not reached the destination EDMG wireless station 2000 correctly, and executes the re-transmission process 1600 of the EDMG A-PPDU 1400. These processes are the same as the processes of the destination EDMG wireless station 2000 in FIGS. 39 and 40 of Embodiment 4.

Figure 51:
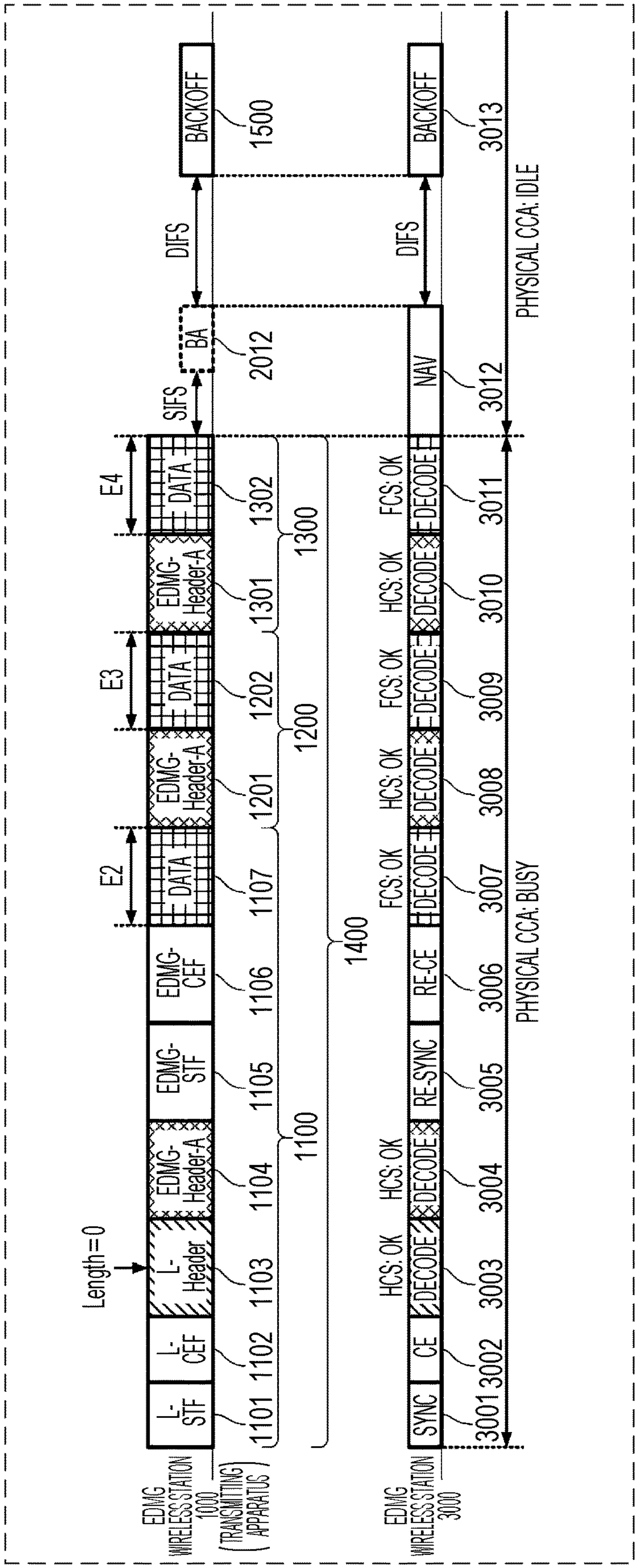
FIG. 51 is a diagram illustrating one example of a process of a transmission source EDMG wireless station and a non-destination EDMG wireless station when receiving correctly in communication using EDMG A-PPDU according to Embodiment 5.

FIG. 51 is a diagram illustrating one example of fields transmitted/received by and processes executed by a transmission source EDMG wireless station 1000 and a non-destination EDMG wireless station 3000 in communication using EDMG A-PPDU according to Embodiment 5, and corresponds to FIG. 41 of Embodiment 4. Portions which are the same as FIG. 41 are denoted with the same signs, and description thereof is omitted.

In FIG. 51, similarly to FIG. 41, after the physical CCA changes from busy to idle, the non-destination EDMG wireless station 3000 sets the NAV 3012, and after the end of the NAV 3012, stands by for the duration of the DIFS, and starts the backoff control 3013.

Figure 52:
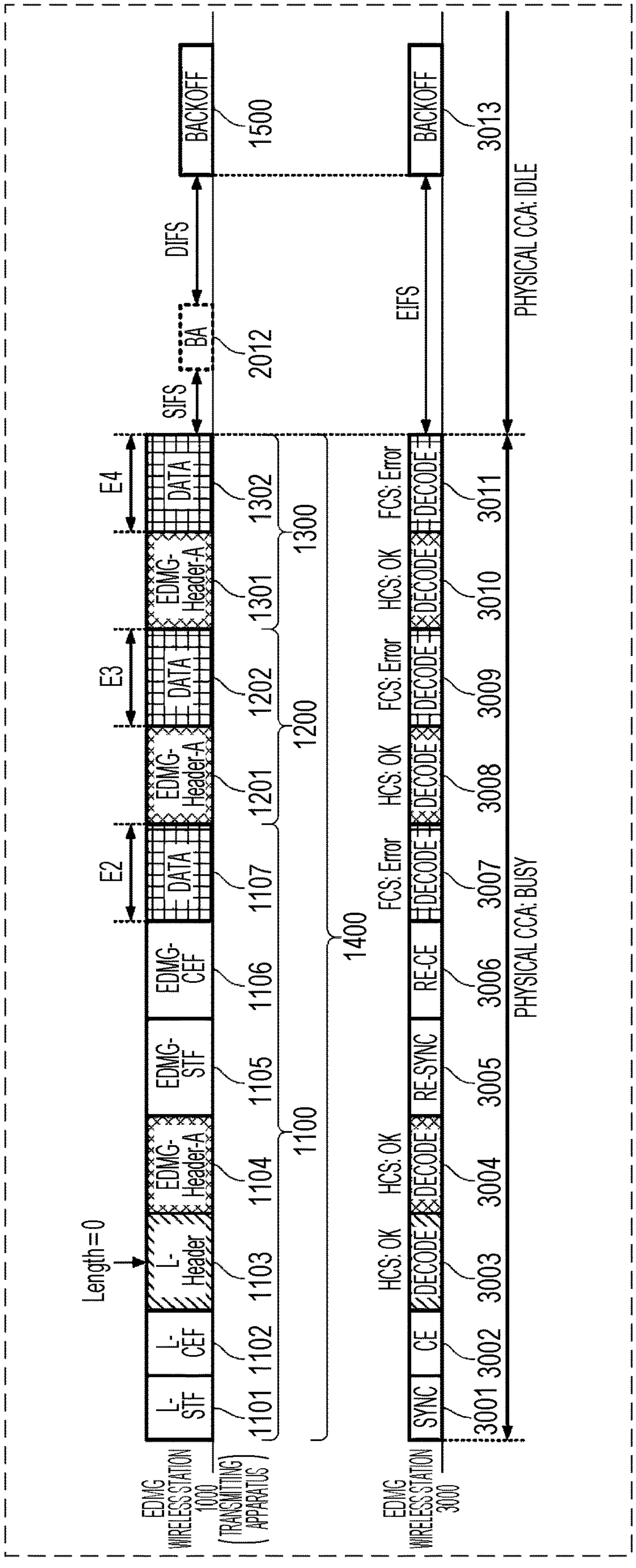
FIG. 52 is a diagram illustrating one example of a process of a transmission source EDMG wireless station and a non-destination EDMG wireless station when an FCS error occurs in all data fields in communication using EDMG A-PPDU according to Embodiment 5.
Figure 53:
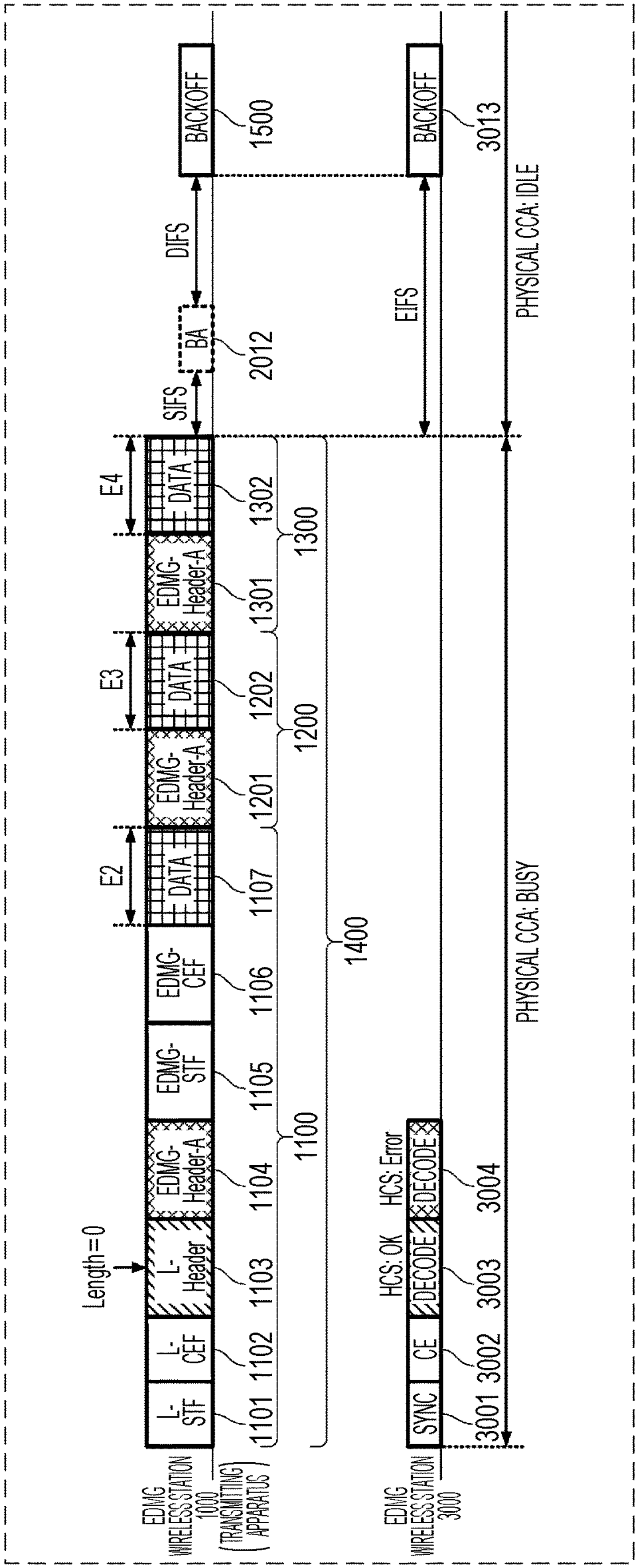
FIG. 53 is a diagram illustrating one example of a process of a transmission source EDMG wireless station and a non-destination EDMG wireless station when an HCS error occurs in the EDMG-Header-A in communication using EDMG A-PPDU according to Embodiment 5.

Note that in the case in which the non-destination EDMG wireless station 3000 detects an error by the FCS in all of the MPDUs obtained by the decoding processes 3007, 3009, and 3011 (see FIG. 52), or in the case of detecting an error by the HCS in the decoding 3004 (see FIG. 53), after the physical CCA changes from busy to idle, the non-destination EDMG wireless station 3000 stands by for the duration of the EIFS, and starts the backoff control 3013. These processes are the same as the processes of the non-destination EDMG wireless station 3000 in FIGS. 42 and 43 of Embodiment 4.

Figure 54:
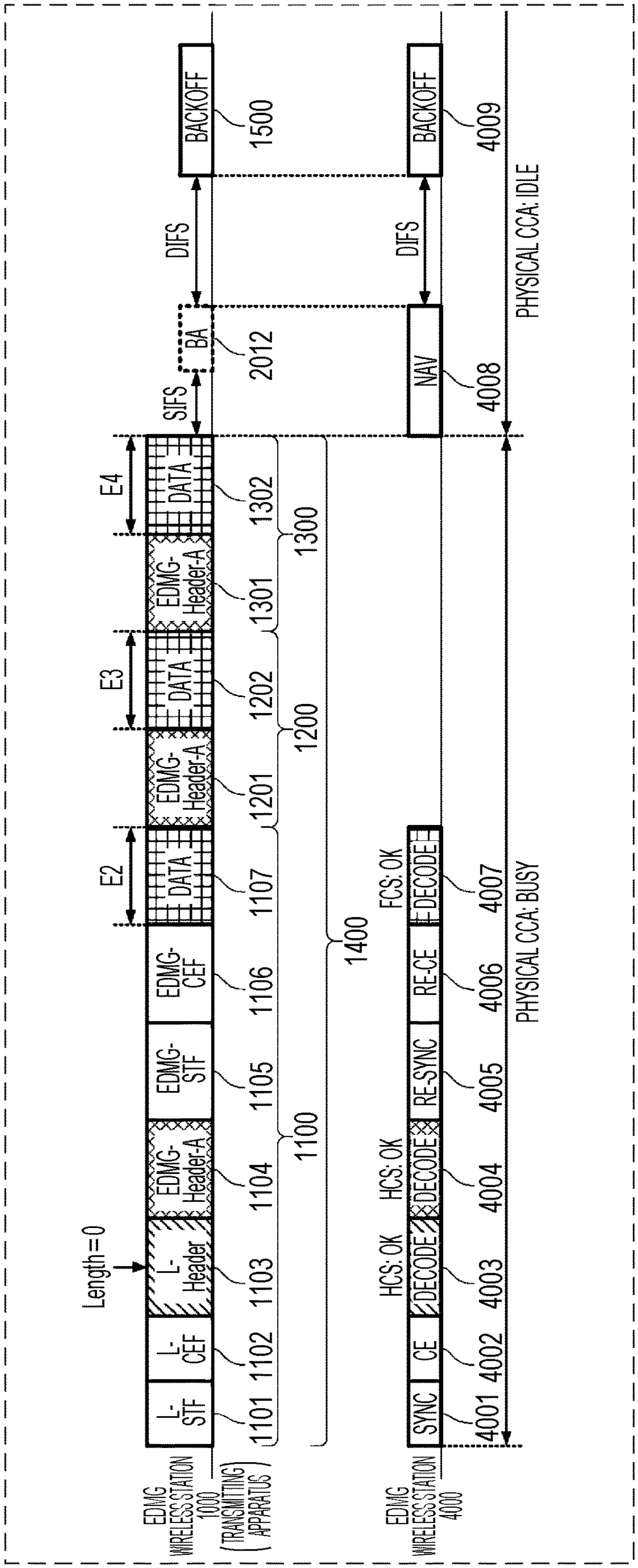
FIG. 54 is a diagram illustrating one example of a process of a transmission source EDMG wireless station and an EDMG wireless station not supporting EDMG A-PPDU when receiving correctly according to Embodiment 5.

FIG. 54 is a diagram illustrating one example of fields transmitted/received by and processes executed by a transmission source EDMG wireless station 1000 and an EDMG A-PPDU non-supporting EDMG wireless station 4000 in communication using EDMG A-PPDU according to Embodiment 5, and corresponds to FIG. 44 of Embodiment 4. Portions which are the same as FIG. 44 are denoted with the same signs, and description thereof is omitted.

In FIG. 54, similarly to FIG. 44, after the physical CCA changes from busy to idle, the EDMG A-PPDU non-supporting EDMG wireless station 4000 sets the NAV 4008, and after the end of the NAV 4008, stands by for the duration of the DIFS, and starts the backoff control 4009.

Figure 55:
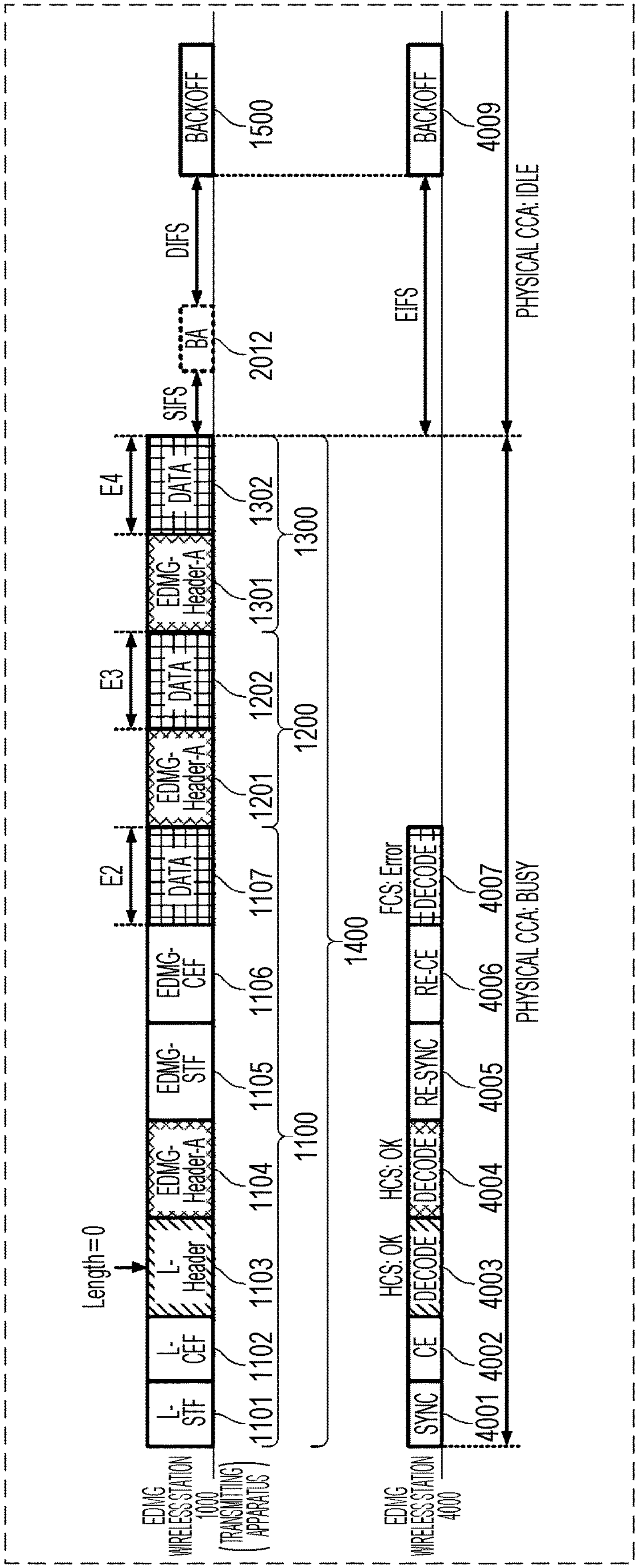
FIG. 55 is a diagram illustrating one example of a process of a transmission source EDMG wireless station and an EDMG wireless station not supporting EDMG A-PPDU when an FCS error occurs in communication using EDMG A-PPDU according to Embodiment 5.
Figure 56:
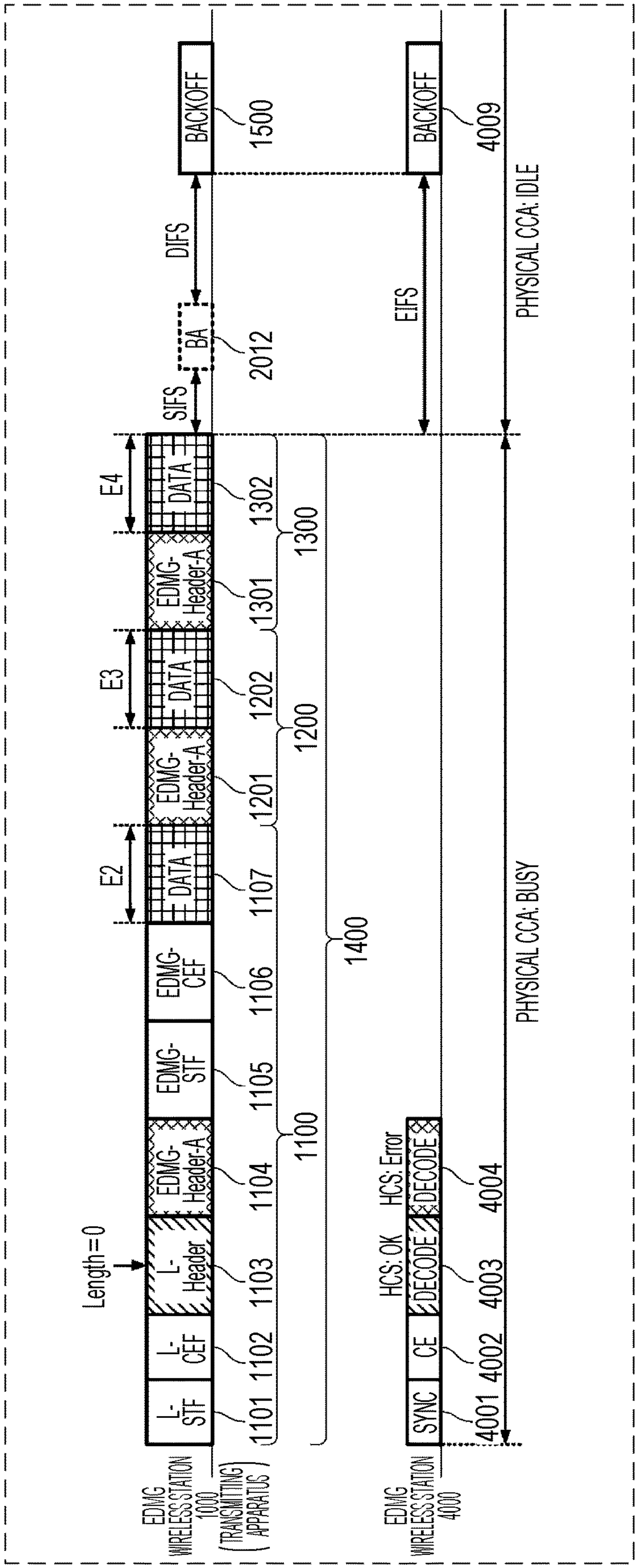
FIG. 56 is a diagram illustrating one example of a process of a transmission source EDMG wireless station and an EDMG wireless station not supporting EDMG A-PPDU when an HCS error occurs in the EDMG-Header-A in communication using EDMG A-PPDU according to Embodiment 5.

Note that in the case in which the EDMG A-PPDU non-supporting EDMG wireless station 4000 detects an error by the FCS in all of the MPDUs in the decoding 4007 (see FIG. 55), or in the case of detecting an error by the HCS in the decoding 4004 (see FIG. 56), after the physical CCA changes from busy to idle, the EDMG A-PPDU non-supporting EDMG wireless station 4000 stands by for the duration of the EIFS, and starts the backoff control 4009. These operations are the same as the operations of the EDMG A-PPDU non-supporting EDMG wireless station 4000 in FIGS. 45 and 46 of Embodiment 4.

Figure 57:
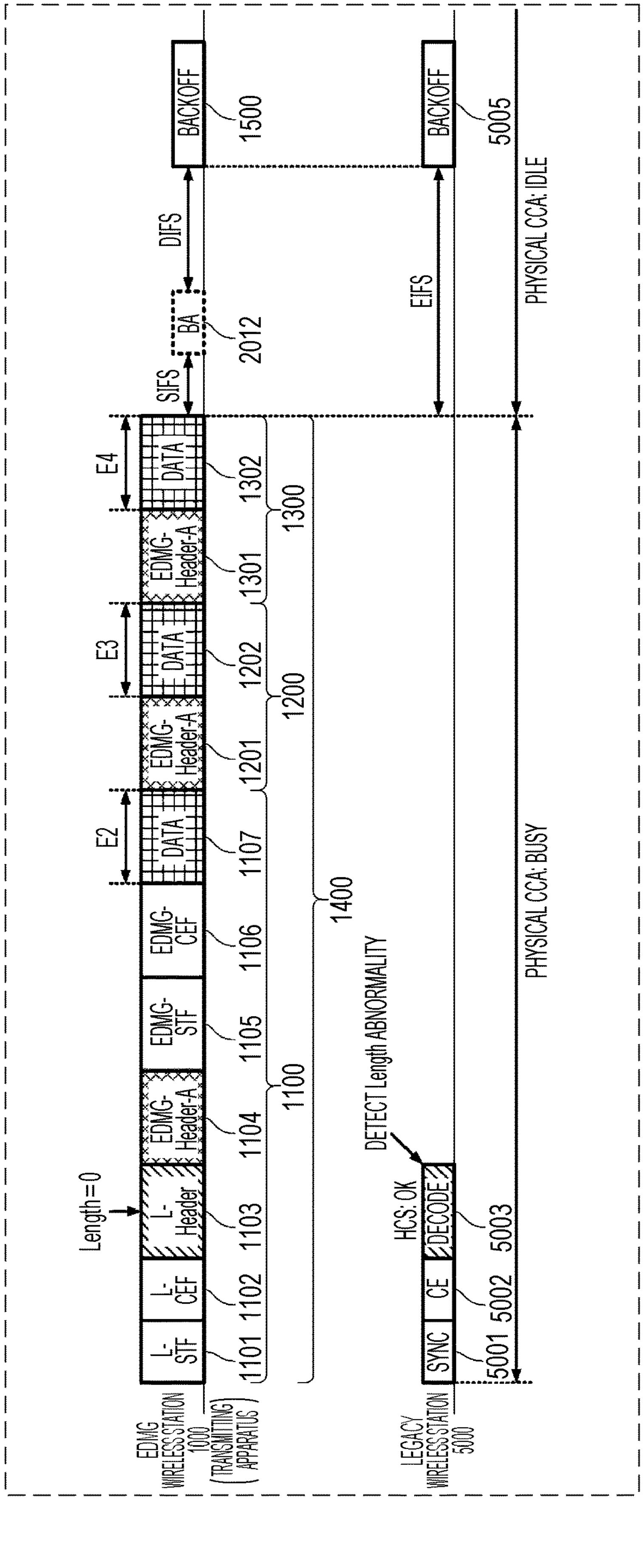
FIG. 57 is a diagram illustrating one example of a process of a transmission source EDMG wireless station and a Legacy EDMG wireless station in communication using EDMG PPDU according to Embodiment 5.

FIG. 57 is a diagram illustrating one example of fields transmitted/received by and processes executed by a transmission source EDMG wireless station 1000 and a legacy wireless station 5000 in communication using EDMG A-PPDU according to Embodiment 5, and corresponds to FIG. 47 of Embodiment 4. Portions which are the same as FIG. 47 are denoted with the same signs, and description thereof is omitted.

In FIG. 57, in the case in which an error is not detected by the HCS in the decoding process 5003, the legacy wireless station 5000 acquires "0" as the value of the Length field from the L-Header 1103.

However, in IEEE 802.11ad, since the Length field of the L-Header is prescribed to be set within a range from 1 to 262143, the legacy wireless station 5000 is able to determine that the Length setting is non-standard, and stop the decoding process of the fields from the EDMG-Header-A.

Similarly to FIG. 47, after the physical CCA changes from busy to idle, the legacy wireless station 5000 stands by for the duration of the EIFS and starts the backoff control 5005.

By the above, according to Embodiment 5, after the completion of receiving the EDMG A-PPDU 1400, the destination EDMG wireless station 2000 is able to transmit the BA 2012 while moderating interruptions by other wireless stations, and the legacy wireless station 5000 is able to reduce power consumption even further.

Embodiment 6

Figure 58:
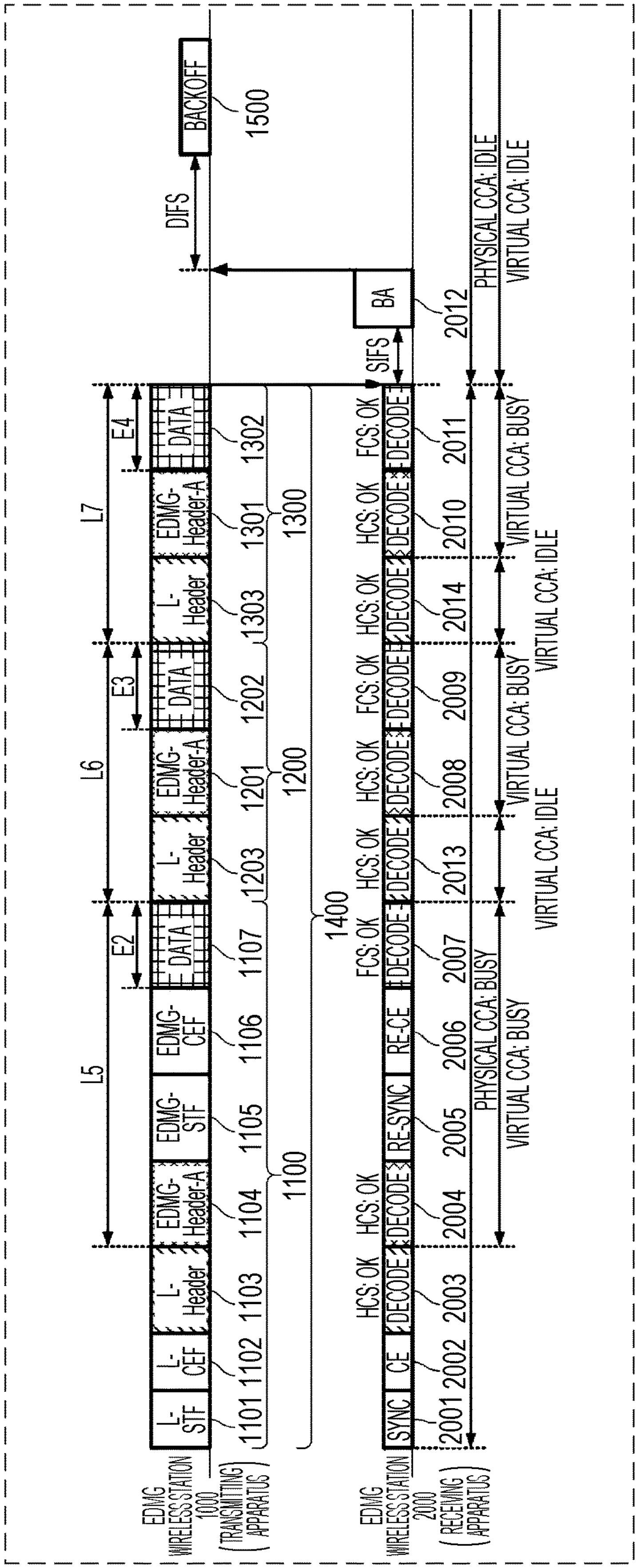
FIG. 58 is a diagram illustrating one example of a process of a transmission source EDMG wireless station and a destination EDMG wireless station when receiving correctly according to Embodiment 6.

FIG. 58 is a diagram illustrating one example of fields transmitted/received by and processes executed by a transmission source EDMG wireless station 1000 and a destination EDMG wireless station 2000 in communication using EDMG A-PPDU according to Embodiment 6.

In Embodiment 6, the format of the EDMG A-PPDU 1400 is different from the format of the EDMG A-PPDU 1400 in Embodiment 1 to Embodiment 5.

Specifically, the second EDMG PPDU 1200 newly includes an L-Header 1203, and the third EDMG PPDU 1300 newly includes an L-Header 1303.

The transmission source EDMG wireless station 1000 executes the following process in the transmission of the EDMG A-PPDU 1400.

To inform a legacy wireless station of the nominal data octet size, the transmission source EDMG wireless station 1000 converts the combined field length L5 of the EDMG-Header-A 1104, the EDMG-STF 1105, the EDMG-CEF 1106, and the Data 1107 to a nominal data octet size D5 on the basis of a predetermined calculation method and sets the size in the Length field of the L-Header 1103, converts the combined field length L6 of the L-Header 1203, the EDMG-Header-A 1201, and the Data 1202 to a nominal data octet size D6 on the basis of a predetermined calculation method and sets the size in the Length field of the L-Header 1203, and converts the field length L7 on the wireless channel of the combined fields of the L-Header 1303, the EDMG-Header-A 1301, and the Data 1302 to a data octet size on the basis of a predetermined calculation method and sets the size in the Length field of the L-Header 1303.

The transmission source EDMG wireless station 1000 sets the octet size E2 of the Data 1107 in the Length field of the EDMG-Header-A 1104, sets the octet size E3 of the Data 1202 in the Length field of the EDMG-Header-A 1201, and sets the octet size E4 of the Data 1302 in the Length field of the EDMG-Header-A 1301.

The transmission source EDMG wireless station 1000 sets an EDMG Indication field to 1 in the L-Header 1103, the L-Header 1203, and the L-Header 1303 to indicate that the EDMG-Header-A exists in each EDMG PPDU forming the EDMG A-PPDU 1400.

To indicate that the first EDMG PPDU 1100, the second EDMG PPDU 1200, and the third EDMG PPDU 1300 are aggregated, the transmission source EDMG wireless station 1000 sets the Additional PPDU field to 1 in the L-Header 1103 and the L-Header 1203, and sets the Additional PPDU field to 0 in the L-Header 1303.

In Embodiment 6, since the Additional PPDU field in the existing L-Header is used to indicate that multiple EDMG PPDUs are aggregated, the Additional PPDU field does not have to exist in the EDMG-Header-A 1104, the EDMG-Header-A 1201, and the EDMG-Header-A 1301.

The destination EDMG wireless station 2000 executes the following process on the received EDMG A-PPDU 1400.

First, the destination EDMG wireless station 2000 uses the L-STF 1101 to execute a synchronization process 2001.

Next, the destination EDMG wireless station 2000 uses the L-CEF 1102 to execute the channel estimation (CE) process 2002. The destination EDMG wireless station 2000 is able to use the channel estimation result in a process of equalizing the fields from the L-Header 1103.

Next, the destination EDMG wireless station 2000 executes the decoding process 2003 of the L-Header 1103. In the decoding process 2003, in the case in which an error is not detected by the HCS, the destination EDMG wireless station 2000 recognizes that the EDMG-Header-A 1104 exists in the first EDMG PPDU 1100, and recognizes that the second EDMG PPDU 1200 exists after the first EDMG PPDU 1100.

Next, the destination EDMG wireless station 2000 executes the decoding process 2004 of the EDMG-Header-A 1104. In the decoding process 2004, in the case in which an error is not detected by the HCS, the destination EDMG wireless station 2000 recognizes that the size of the Data 1107 is E2 octets.

Next, the destination EDMG wireless station 2000 uses the EDMG-STF 1105 to execute the re-synchronization process 2005.

Next, the destination EDMG wireless station 2000 uses the EDMG-CEF 1106 to execute the channel re-estimation (re-CE) process 2006.

Next, the destination EDMG wireless station 2000 executes the decoding process 2007 of the Data 1107 in accordance with the set value (E2) of the Length field of the EDMG-Header-A 1104.

Next, because the destination EDMG wireless station 2000 recognizes the existence of the second EDMG PPDU 1200 from the result of the decoding process 2003, the destination EDMG wireless station 2000 executes a decoding process 2013 of the L-Header 1203. In the decoding process 2013, in the case in which an error is not detected by the HCS, the destination EDMG wireless station 2000 recognizes that the EDMG-Header-A 1201 exists in the second EDMG PPDU 1200, and recognizes that the third EDMG PPDU 1300 follows after the second EDMG PPDU 1200.

Next, the destination EDMG wireless station 2000 executes the decoding process 2008 of the EDMG-Header-A 1201. In the decoding process 2008, in the case in which an error is not detected by the HCS, the destination EDMG wireless station 2000 recognizes that the size of the Data 1202 is E3 octets.

Next, the destination EDMG wireless station 2000 executes a decoding process 2009 of the Data 1202 in accordance with the set value (E3) of the Length field of the EDMG-Header-A 1201.

Next, because the destination EDMG wireless station 2000 recognizes the existence of the third EDMG PPDU 1300 from the result of the decoding process 2013, the destination EDMG wireless station 2000 executes a decoding process 2014 of the L-Header 1303. In the decoding process 2014, in the case in which an error is not detected by the HCS, the destination EDMG wireless station 2000 recognizes that the EDMG-Header-A 1301 exists in the third EDMG PPDU 1300, and recognizes that an additional EDMG PPDU does not exist after the third EDMG PPDU 1300.

Next, the destination EDMG wireless station 2000 executes the decoding process 2010 of the EDMG-Header-A 1301. In the decoding process 2010, in the case in which an error is not detected by the HCS, the destination EDMG wireless station 2000 recognizes that the size of the Data 1302 is E4 octets.

Next, the destination EDMG wireless station 2000 executes the decoding process 2011 of the Data 1302 in accordance with the set value (E4) of the Length field of the EDMG-Header-A 1301.

Next, in the case in which an FCS error is not detected in one or more of the MPDUs obtained by the decoding processes 1107, 1202, and 1302, after the physical CCA changes from busy to idle, or after the virtual CCA with respect to the third EDMG PPDU 1300 positioned at the tail end changes from busy to idle, the destination EDMG wireless station 2000 stands by for the duration of the SIFS, and transmits the BA 2012 to the transmission source EDMG wireless station 1000.

After the BA 2012 is received correctly, to transmit the next packet, the transmission source EDMG wireless station 1000 stands by for the duration of the DIFS, and starts a backoff control 1500, or stands by for the duration of the DIFS, and after performing the backoff control, re-transmits an MPDU that was not received correctly.

Note that, although not illustrated, in the case in which the BA 2012 indicates the existence of an MPDU that was not received correctly, or in the case in which an HCS error or an FCS error occurs in the decoding of the BA 2012, the transmission source EDMG wireless station 1000 stands by for the duration of the SIFS after the completion of receiving the BA 2012, and executes the re-transmission process 1600 of a packet including the MDPU that was not received correctly.

Figure 59:
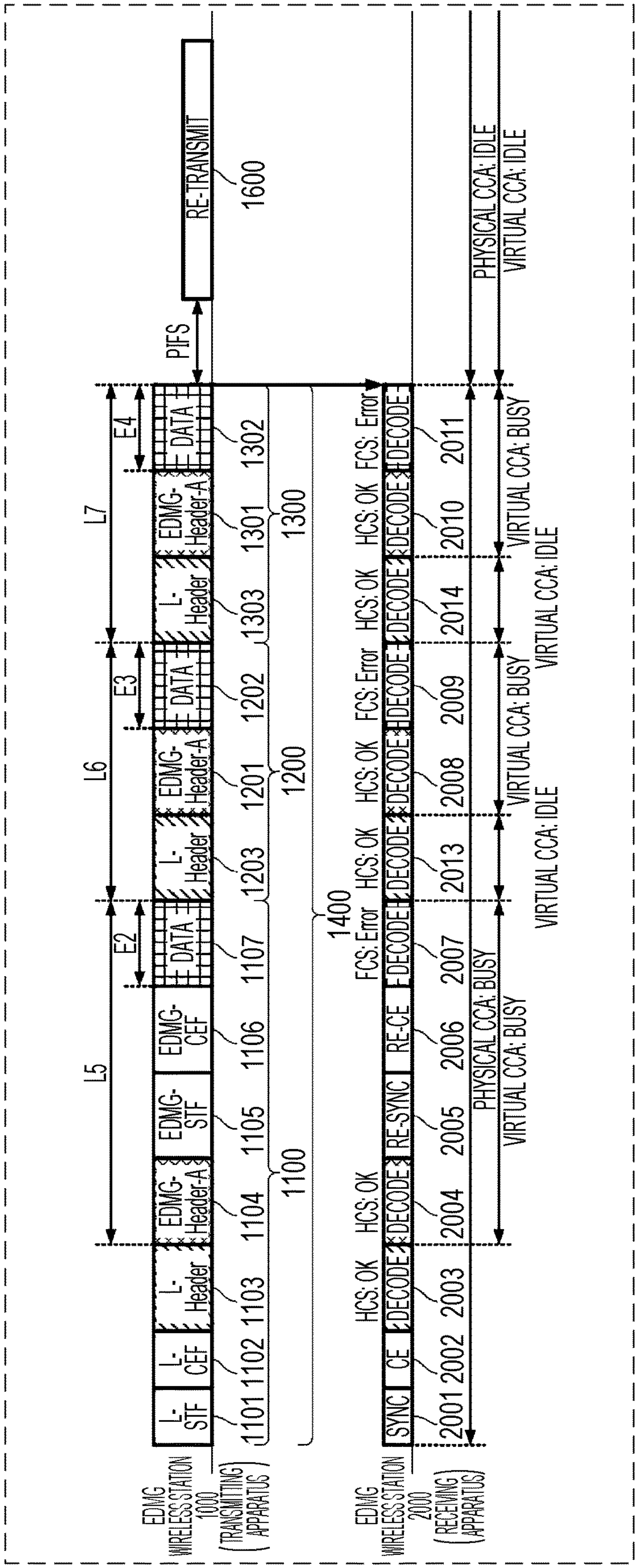
FIG. 59 is a diagram illustrating one example of a process of a transmission source EDMG wireless station and a destination EDMG wireless station when an FCS error occurs in all data fields in communication using EDMG A-PPDU according to Embodiment 6.
Figure 60:
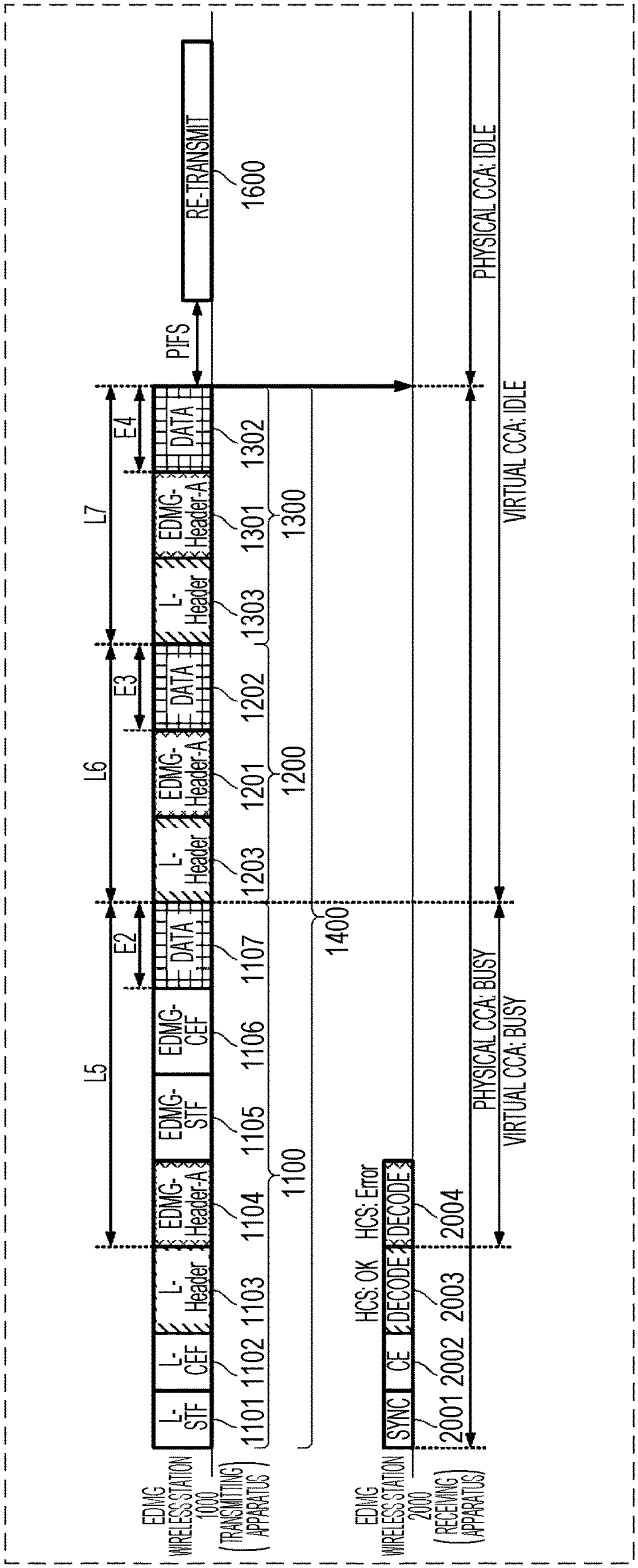
FIG. 60 is a diagram illustrating one example of a process of a transmission source EDMG wireless station and a destination EDMG wireless station when an HCS error occurs in the EDMG-Header-A in communication using EDMG A-PPDU according to Embodiment 6.

Note that in the case in which the destination EDMG wireless station 2000 detects an error by the FCS in all of the MPDUs obtained by the decoding processes 2007, 2009, and 2011 (see FIG. 59), or in the case of detecting an error by the HCS in the decoding process 2004 (see FIG. 60), the destination EDMG wireless station 2000 does not transmit the BA 2012. In this case, the transmission source EDMG wireless station 1000 does not receive the BA 2012 within the PIFS time from the completion of transmitting the EDMG A-PPDU 1400, and therefore determines that the EDMG A-PPDU 1400 has not reached the destination EDMG wireless station 2000 correctly, and executes the re-transmission process 1600 of the EDMG A-PPDU 1400.

Figure 61:
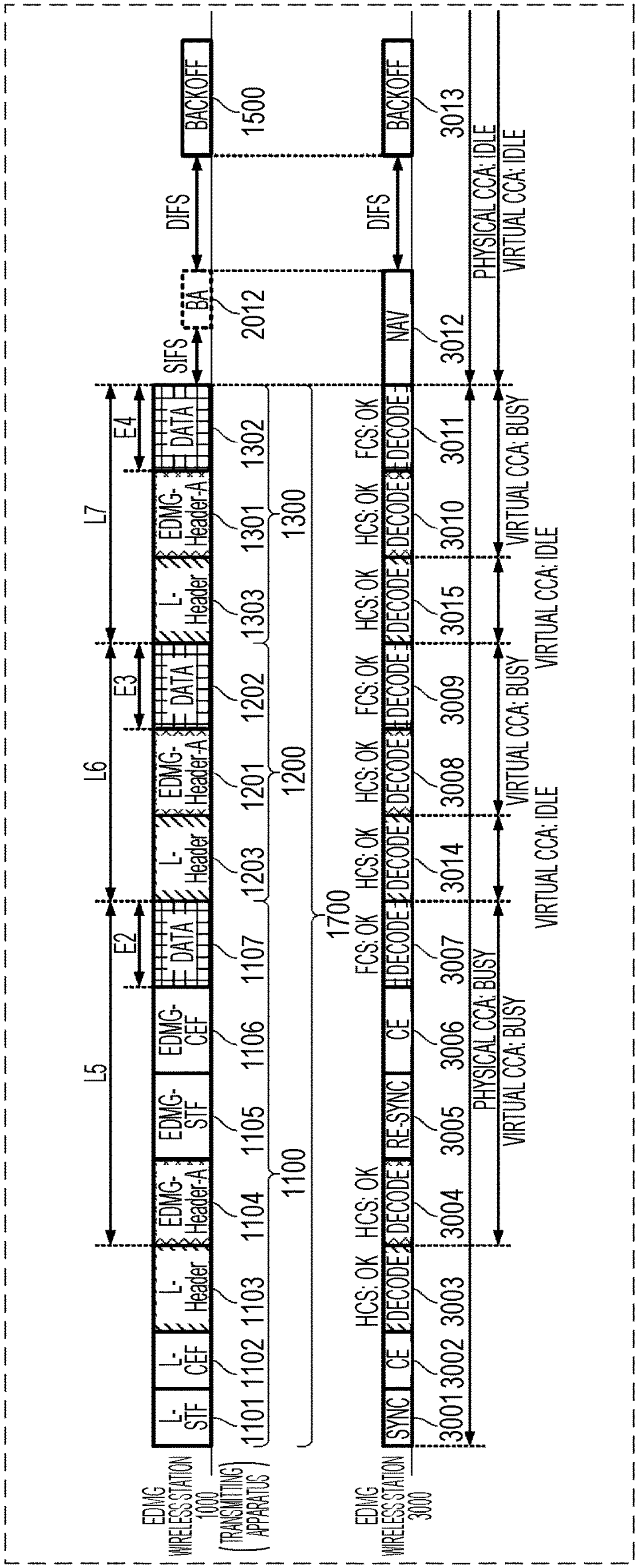
FIG. 61 is a diagram illustrating one example of a process of a transmission source EDMG wireless station and a non-destination EDMG wireless station when receiving correctly in communication using EDMG A-PPDU according to Embodiment 6.

FIG. 61 is a diagram illustrating one example of fields transmitted/received by and processes executed by a transmission source EDMG wireless station 1000 and a non-destination EDMG wireless station 3000 in communication using EDMG A-PPDU according to Embodiment 6. The transmission source EDMG wireless station 1000 of FIG. 61 transmits the EDMG A-PPDU 1400 to the destination EDMG wireless station 2000 of FIG. 58 and correctly receives the BA 2012, while the non-destination EDMG wireless station 3000 of FIG. 61 is not a destination station of the EDMG A-PPDU 1400, but exists in an environment where the EDMG A-PPDU 1400 is receivable.

The non-destination EDMG wireless station 3000 of FIG. 61 executes a process similar to the destination EDMG wireless station 2000 of FIG. 58 on the received EDMG A-PPDU 1400, but the processing after the decoding process 3011 is different from the destination EDMG wireless station 2000 of FIG. 58. Specifically, in the case in which an error is not detected by the FCS in one or more of the MPDUs obtained by the decoding processes 3007, 3009, and 3011, the non-destination EDMG wireless station 3000 of FIG. 61 recognizes that the destination of the EDMG A-PPDU 1400 is not the non-destination EDMG wireless station 3000 itself, and after the physical CCA changes from busy to idle, or after the virtual CCA with respect to the third EDMG PPDU 1300 changes from busy to idle, sets a NAV 3012, and after the end of the NAV 3012, stands by for the duration of the DIFS, and starts the backoff control 3013.

Figure 62:
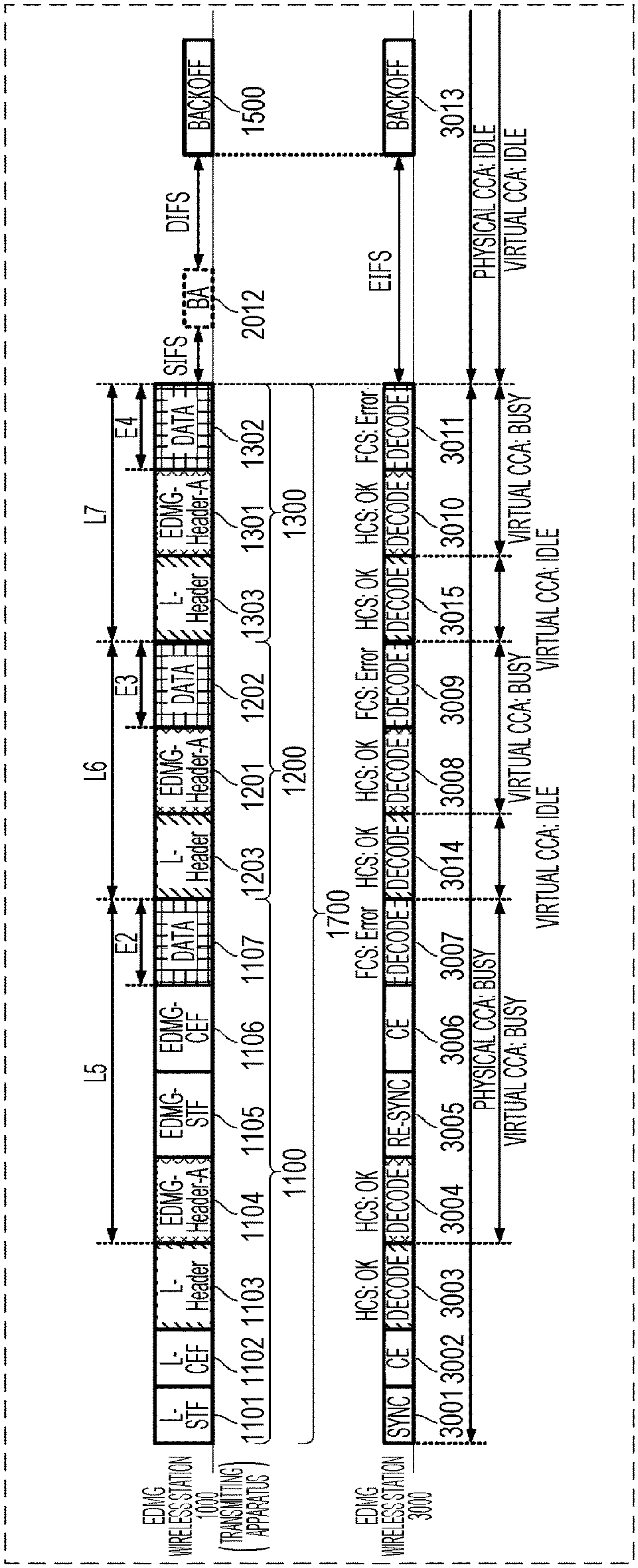
FIG. 62 is a diagram illustrating one example of a process of a transmission source EDMG wireless station and a non-destination EDMG wireless station when an FCS error occurs in all data fields in communication using EDMG A-PPDU according to Embodiment 6.
Figure 63:
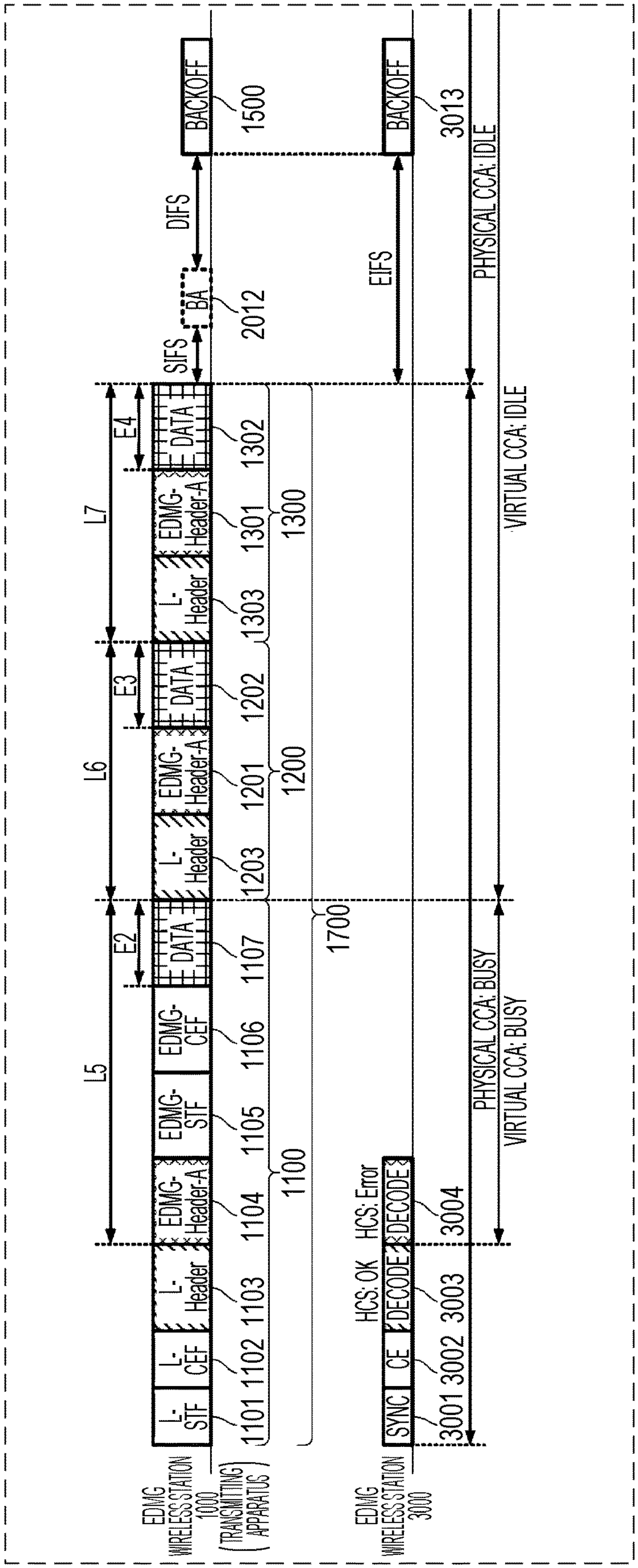
FIG. 63 is a diagram illustrating one example of a process of a transmission source EDMG wireless station and a non-destination EDMG wireless station when an HCS error occurs in the EDMG-Header-A in communication using EDMG A-PPDU according to Embodiment 6.

Note that in the case in which the non-destination EDMG wireless station 3000 detects an error by the FCS in all of the MPDUs obtained by the decoding processes 3007, 3009, and 3011 (see FIG. 62), or in the case of detecting an error by the HCS in the decoding process 3004 (see FIG. 63), after the physical CCA changes from busy to idle, the non-destination EDMG wireless station 3000 stands by for the duration of the EIFS, and starts the backoff control 3013.

Figure 64:
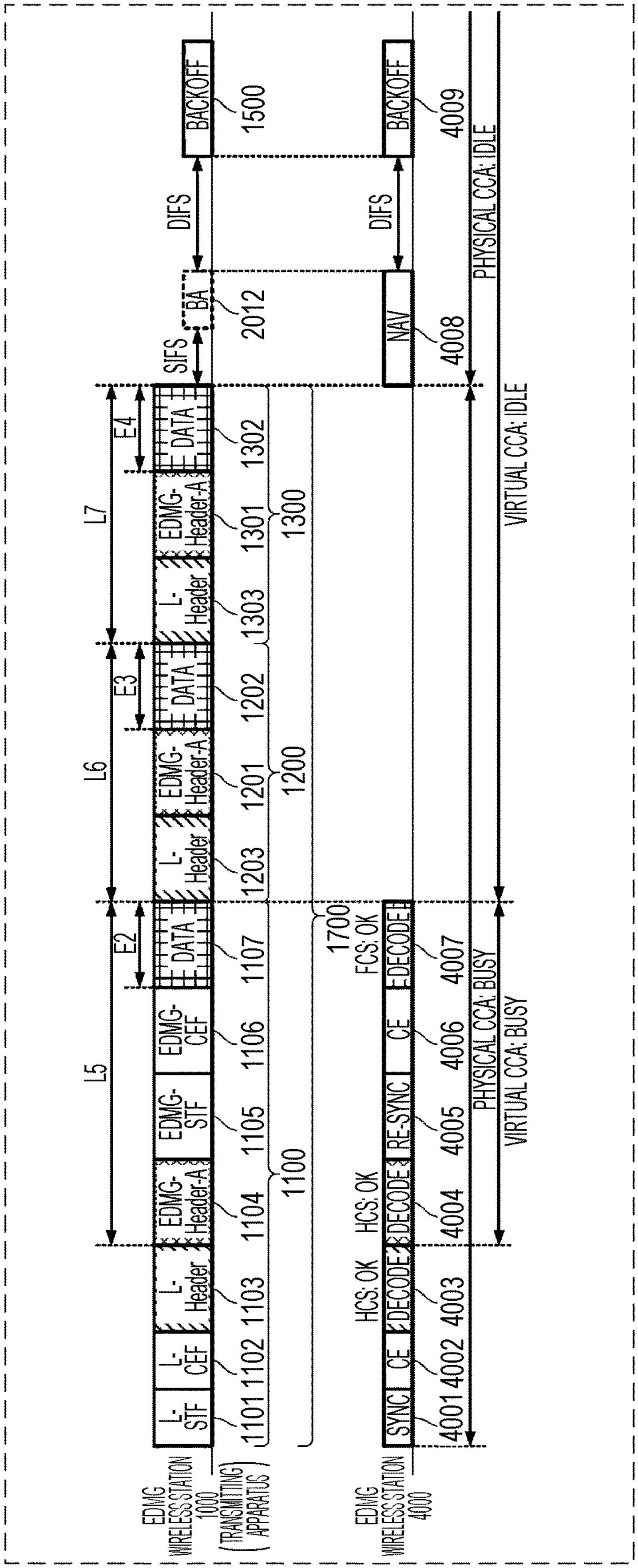
FIG. 64 is a diagram illustrating one example of a process of a transmission source EDMG wireless station and an EDMG wireless station not supporting EDMG A-PPDU when receiving correctly according to Embodiment 6.

FIG. 64 is a diagram illustrating one example of fields transmitted/received by and processes executed by a transmission source EDMG wireless station 1000 and an EDMG A-PPDU non-supporting EDMG wireless station 4000 in communication using EDMG A-PPDU according to Embodiment 6. The transmission source EDMG wireless station 1000 of FIG. 64 transmits the EDMG A-PPDU 1400 to the destination EDMG wireless station 2000 of FIG. 58 and correctly receives the BA 2012, while the EDMG A-PPDU non-supporting EDMG wireless station 4000 of FIG. 64 is not a destination station of the EDMG A-PPDU 1400, but exists in an environment where the EDMG A-PPDU 1400 is receivable.

The EDMG A-PPDU non-supporting EDMG wireless station 4000 does not support the EDMG A-PPDU, and therefore executes a decoding process up to the Data 1107, and does not execute a decoding process on the fields from the L-Header 1203. In the case in which an error is not detected by the FCS in the decoding process 4007, the EDMG A-PPDU non-supporting EDMG wireless station 4000 recognizes that the destination of the EDMG A-PPDU 1400 is not the EDMG A-PPDU non-supporting EDMG wireless station 4000, sets the NAV 4008 after the physical CCA changes from busy to idle, and after the NAV 4008 ends, stands by for the duration of the DIFS, and starts the backoff control 4009.

Figure 65:
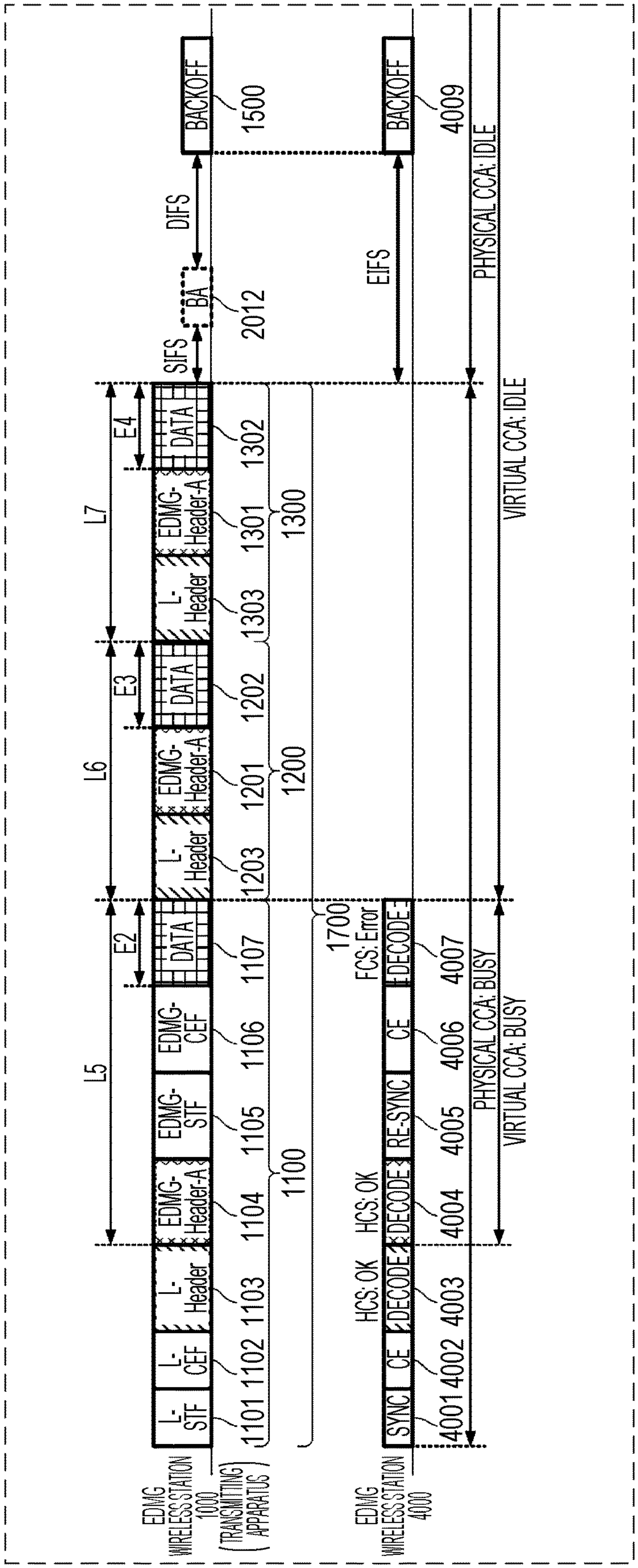
FIG. 65 is a diagram illustrating one example of a process of a transmission source EDMG wireless station and an EDMG wireless station not supporting EDMG A-PPDU when an FCS error occurs in communication using EDMG A-PPDU according to Embodiment 6.
Figure 66:
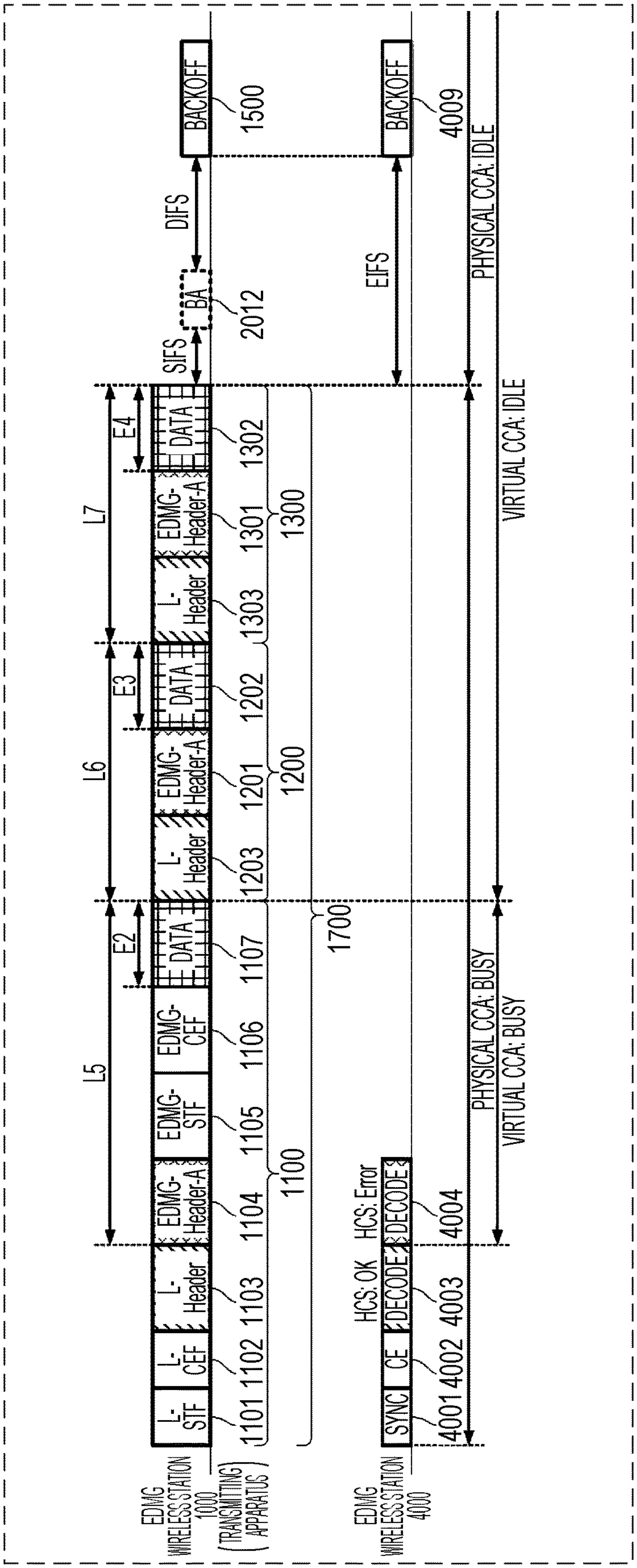
FIG. 66 is a diagram illustrating one example of a process of a transmission source EDMG wireless station and an EDMG wireless station not supporting EDMG A-PPDU when an HCS error occurs in the EDMG-Header-A in communication using EDMG A-PPDU according to Embodiment 6.

Note that in the case in which the EDMG A-PPDU non-supporting EDMG wireless station 4000 detects an error by the FCS in all of the MPDUs obtained by the decoding process 4007 (see FIG. 65), or in the case of detecting an error by the HCS in the decoding process 4004 (see FIG. 66), after the physical CCA changes from busy to idle, the EDMG A-PPDU non-supporting EDMG wireless station 4000 stands by for the duration of the EIFS, and starts the backoff control 4009.

Figure 67:
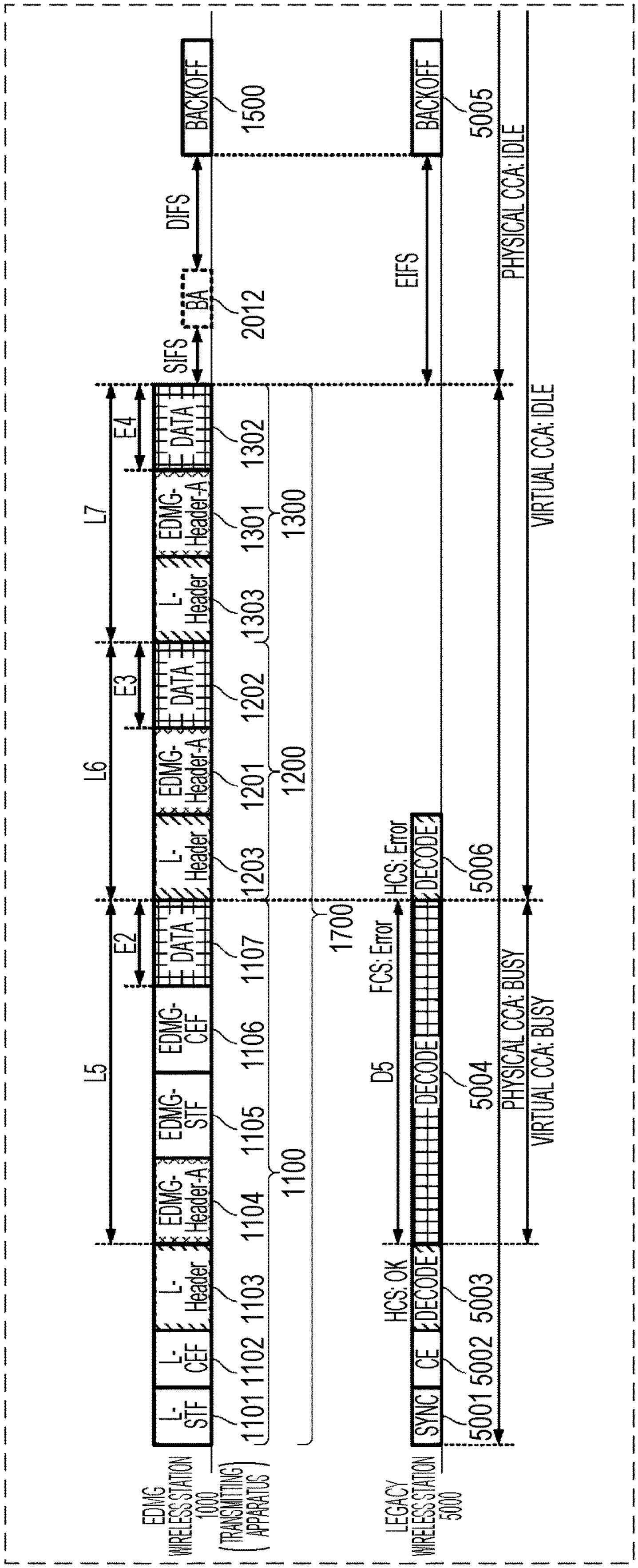
FIG. 67 is a diagram illustrating one example of a process of a transmission source EDMG wireless station and a Legacy EDMG wireless station in communication using EDMG A-PPDU according to Embodiment 6.

FIG. 67 is a diagram illustrating one example of fields transmitted/received by and processes executed by a transmission source EDMG wireless station 1000 and a legacy wireless station 5000 in communication using EDMG A-PPDU according to Embodiment 6. The transmission source EDMG wireless station 1000 of FIG. 67 transmits the EDMG A-PPDU 1400 to the destination EDMG wireless station 2000 of FIG. 58 and correctly receives the BA 2012, while the legacy wireless station 5000 is not a destination station of the EDMG A-PPDU 1400, but exists in an environment where the EDMG A-PPDU 1400 is receivable.

The legacy wireless station 5000 does not support the EDMG A-PPDU, and therefore processes the received EDMG A-PPDU 1400 as a typical legacy A-PPDU. In other words, the legacy wireless station 5000 executes the synchronization process 5001 and channel estimation (CE) 5002, followed by the decoding 5003 of the L-Header 1103. In the decoding 5003, in the case in which an error is not detected by the HCS, since the Additional PPDU field is set to 1, the legacy wireless station 5000 understands that the second EDMG PPDU 1200 follows immediately after the first EDMG PPDU 1100. Also, from the Length field of the L-Header 1103, the legacy wireless station is able to learn the octet size D5 of the nominal data field of the first EDMG PPDU 1100.

Subsequently, the legacy wireless station 5000 executes the decoding process 5004 treating the fields from the EDMG-Header-A 1104 to the Data 1107 as a data field of the size D5 octets. In the decoding process 5004, the legacy wireless station 5000 detects an error by the FCS.

Also, since the EDMG-STF 1105, the EDMG-CEF 1106, and the Data 1107 are sometimes transmitted using channel bonding technology or MIMO technology, there is a possibility that the legacy wireless station 5000 may lose synchronization in the middle of the decoding process 5004.

The legacy wireless station 5000 recognizes the existence of the second EDMG PPDU 1200 from the result of the decoding process 5003, and therefore executes a decoding process 5006 of the L-Header 1203. However, as described earlier, since the legacy wireless station 5000 sometimes loses synchronization in the middle of the decoding process 5004, there is a high probability of detecting an error by the HCS in the decoding process 5006.

In the case in which an error is detected by the HCS in the decoding process 5006, the legacy wireless station 5000 does not execute the decoding process on the fields from the EDMG-Header-A 1201. After the physical CCA changes from busy to idle, the legacy wireless station 5000 stands by for the duration of the EIFS and starts the backoff control 5005.

According to Embodiment 6, after the completion of receiving the EDMG A-PPDU 1400, the destination EDMG wireless station 2000 is able to transmit the BA 2012 while moderating interruptions by other wireless stations, and the legacy wireless station 5000 is able to reduce power consumption. Also, the backoff control start timings of an EDMG wireless station and a legacy wireless station may be aligned, and a transmit opportunity may be given uniformly to each wireless station.

(Configuration of EDMG Wireless Station)

Figure 68:
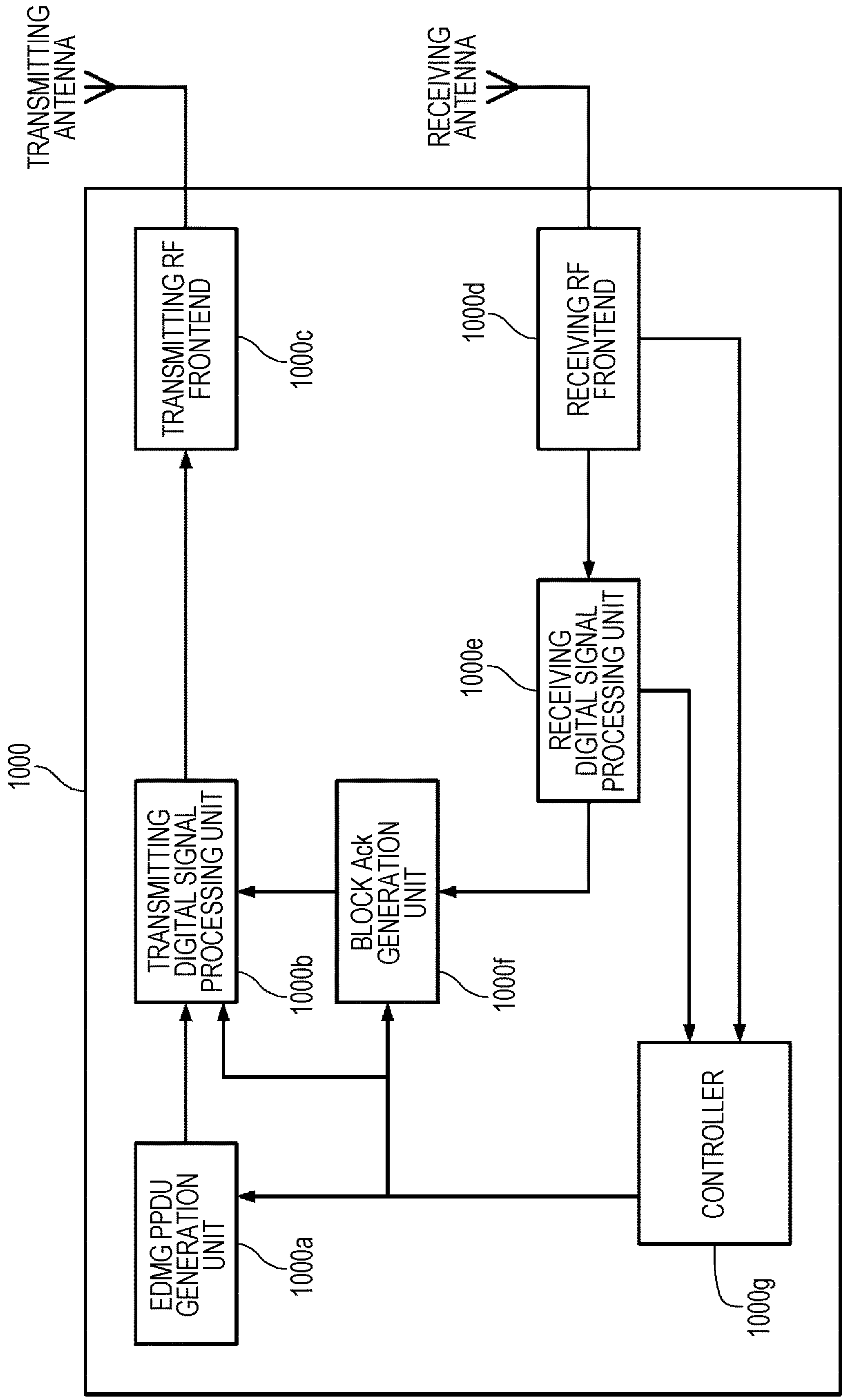
FIG. 68 is a diagram illustrating one example of a configuration of an EDMG wireless station according to the present disclosure.

FIG. 68 is a diagram illustrating an example of the configuration of an EDMG wireless station according to the present disclosure. In the present disclosure, the EDMG wireless station 1000, the EDMG wireless station 2000, the EDMG wireless station 3000, and the EDMG wireless station 4000 have the same configuration. In FIG. 68, the EDMG wireless station 1000 is provided with an EDMG PPDU generation unit 1000*a*, a transmitting digital signal processing unit 1000*b*, a transmitting RF frontend 1000*c*, a receiving RF frontend 1000*d*, a receiving digital signal processing unit 1000*e*, a block Ack generation unit 1000*f*, and a controller 1000*g*.

The EDMG PPDU generation unit 1000*a* generates each EDMG PPDU forming the EDMG A-PPDU.

Figure 69:
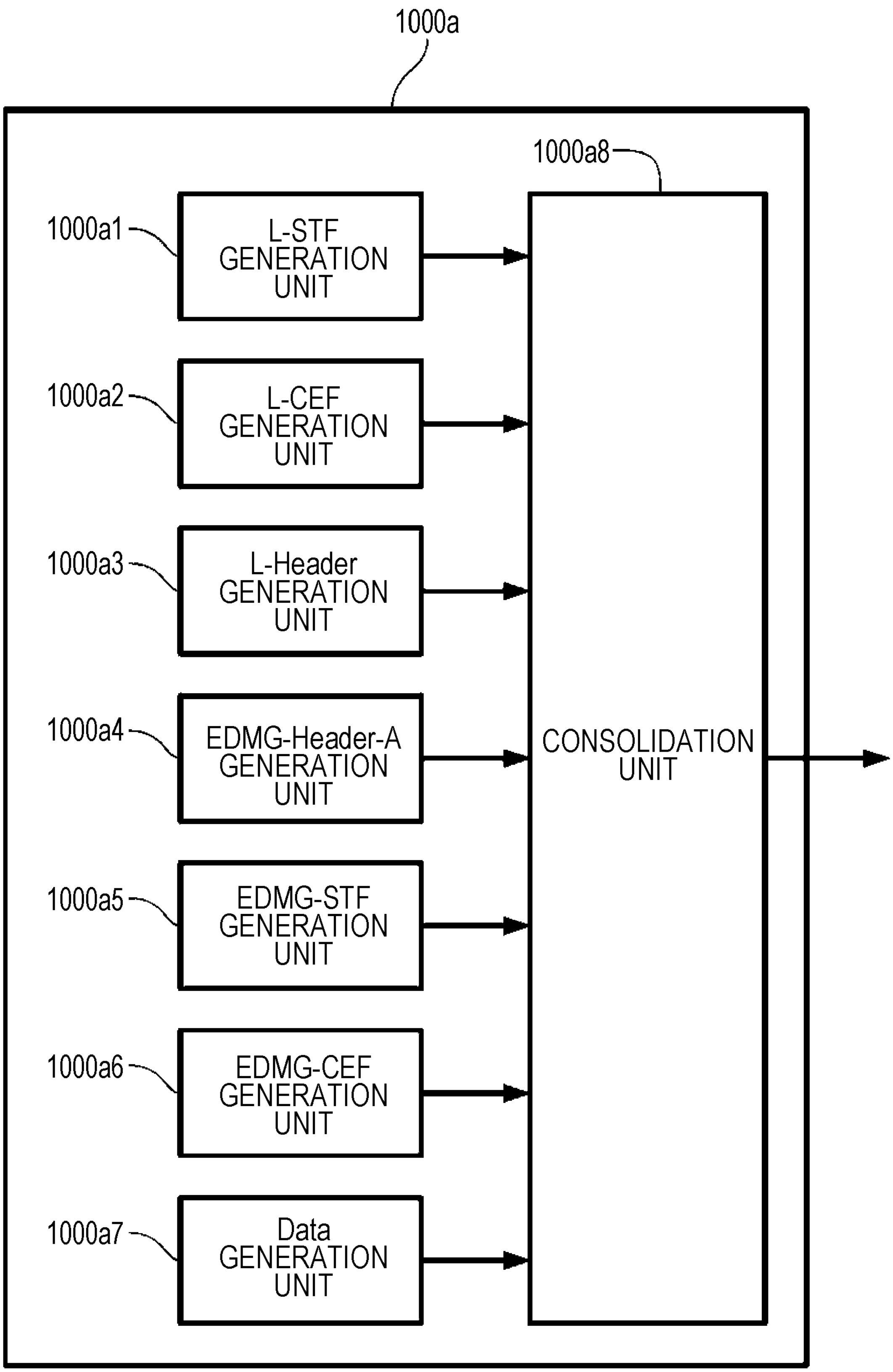
FIG. 69 is a diagram illustrating one example of a configuration of an EDMG PPDU generation unit of an EDMG wireless station according to the present disclosure.

As illustrated in FIG. 69, the EDMG PPDU generation unit 1000*a* is provided with an L-STF generation unit 1000*a*1, an L-CEF generation unit 1000*a*2, an L-Header generation unit 1000*a*3, an EDMG-Header-A generation unit 1000*a*4, an EDMG-STF generation unit 1000*a*5, an EDMG-CEF generation unit 1000*a*6, a Data generation unit 1000*a*7, and a consolidation unit 1000*a*8.

The L-STF generation unit 1000*a*1 generates the L-STF with which legacy wireless stations and EDMG wireless stations execute packet detection, the synchronization process, automatic gain control (AGC), and the like.

The L-CEF generation unit 1000*a*2 generates the L-CEF with which legacy wireless stations and EDMG wireless stations execute channel estimation.

The L-Header generation unit 1000*a*3 calculates the nominal data octet size for legacy wireless stations, and sets the calculation result in the Length field of the L-Header. Also, the L-Header generation unit 1000*a*3 sets the EDMG Indication field of the L-Header to 1. Also, the L-Header generation unit 1000*a*3 sets the Additional PPDU field of the L-Header according to the presence or absence of a subsequent EDMG PPDU.

The EDMG-Header-A generation unit 1000*a*4 sets the octet size of the actual data field in the Length field of the EDMG-Header-A. Also, the EDMG-Header-A generation unit 1000*a*4 sets the Additional PPDU field of the EDMG-Header-A according to the presence or absence of a subsequent EDMG PPDU.

When transmitting a packet using MIMO technology or channel bonding technology, the EDMG-STF generation unit 1000*a*5 generates the EDMG-STF with which EDMG wireless stations execute the re-synchronization process with respect to each MIMO stream or a channel-bonded broadband signal.

When transmitting a packet using MIMO technology or channel bonding technology, the EDMG-CEF generation unit 1000*a*6 generates the EDMG-CEF with which EDMG wireless stations execute the channel re-estimation process with respect to each MIMO stream or a channel-bonded broadband signal.

The Data generation unit 1000*a*7 generates payload data.

The consolidation unit 1000*a*8 consolidates the L-STF, L-CEF, L-Header, EDMG-Header-A, EDMG-STF, EDMG-CEF, and payload data on the basis of the settings in the Additional PPDU field of the L-Header and the Additional PPDU field of the EDMG-Header-A, and forms the EDMG A-PPDU.

The transmitting digital signal processing unit 1000*b* is a block that executes an aggregation process on multiple EDMG PPDUs in accordance with the set value in the Additional PPDU field of the L-Header or the Additional PPDU field of the EDMG-Header-A.

The transmitting RF frontend 1000*c* frequency-converts an input signal to an RF signal, and emits the RF signal from a transmitting antenna.

The receiving RF frontend 1000*d* receives a signal transmitted from another wireless station with a receiving antenna, and frequency-converts the received RF signal to a baseband signal. Also, the power of the received signal is measured, and the measurement value is sent to the controller 1000*g*.

The receiving digital signal processing unit 1000*e* executes a synchronization process, a channel estimation process, a header decoding process, and a data decoding process on the received signal. In the case in which the L-Header is received correctly, the receiving digital signal processing unit 1000*e* computes the nominal data field length on the wireless channel from the set value of the Length field, and outputs to the controller 1000*g*.

Also, the receiving digital signal processing unit 1000*e* outputs the L-Header HCS check result, the EDMG-Header-A HCS check result, the FCS check results for the multiple MPDUs forming the data field, and the Duration field value and destination address field value in the MAC header included in the data field to the controller 1000*g*. Additionally, the receiving digital signal processing unit outputs the HCS check results and the FCS check results to the block Ack generation unit 1000*f*.

The block Ack generation unit 1000*f* generates a block Ack frame on the basis of the HCS check results and the FCS check results.

The controller 1000*g* controls the operation of the EDMG wireless station 1000. The controller 1000*g* counts various IFS times and the time of the nominal data field length. In the case in which the EDMG wireless station 1000 operates as a transmitting device, if a block Ack is received correctly, the controller 1000*g* causes the EDMG wireless station 1000 to execute a backoff process or a re-transmission process depending on the content of the block Ack, whereas if a block Ack is not received correctly, the controller 1000*g* causes the wireless station to execute the re-transmission process.

Also, in the case in which the received frame is addressed to the wireless station itself, the controller 1000*g* sets the physical CCA on the basis of the received signal power level, sets the virtual CCA on the basis of the Length field of the L-Header, and causes the EDMG wireless station 1000 to execute a block Ack transmission process.

Also, in the case in which the received frame is not addressed to the wireless station itself, the controller 1000*g* sets the NAV and stops the transmission processes of the wireless station 1000 during the NAV period, or counts a predetermined IFS time, and causes the wireless station 1000 to execute a backoff control.

In each embodiment above, the present disclosure is suited to transmitting and receiving a moving image (movie), a still image (picture), sound (audio), text data, and control data using a wireless communication device, such as a smartphone, cellular phone, tablet, PC, or TV, for example.

Summary of Embodiments

A communication device according to a first aspect of the present disclosure includes: a PPDU generation circuit that, with respect to an aggregate physical layer convergence protocol data unit (A-PPDU) including a legacy STF, a legacy CEF, a legacy header field, a non-legacy STF, a non-legacy CEF, multiple non-legacy header fields, and multiple data fields, sets a nominal data octet size computed on a basis of a nominal data field length in the legacy header field, and sets an Additional PPDU field included in the legacy header field to 0; a signal processing circuit that forms the A-PPDU in the nominal data field length or less; and a transmission circuit that transmits the formed A-PPDU, wherein the nominal data field length is a time equal to or greater than a total of the non-legacy STF, the non-legacy CEF, the multiple non-legacy header fields, and the multiple data fields.

A communication device according to a second aspect of the present disclosure includes: a reception circuit that, with respect to an aggregate physical layer convergence protocol data unit (A-PPDU) including a legacy STF, a legacy CEF, a legacy header field, a non-legacy STF, a non-legacy CEF, multiple non-legacy header fields, and multiple data fields, receives the A-PPDU formed in a nominal data field length or less in which a nominal data octet size computed on a basis of the nominal data field length is set in the legacy header field and an Additional PPDU field included in the legacy header field is set to 0; and a transmission circuit that transmits an Ack frame in response to the received A-PPDU, wherein the nominal data field length is a time equal to or greater than a total of the non-legacy STF, the non-legacy CEF, the multiple non-legacy header fields, and the multiple data fields.

A communication method according to a third aspect of the present disclosure includes: setting, with respect to an aggregate physical layer convergence protocol data unit (A-PPDU) including a legacy STF, a legacy CEF, a legacy header field, a non-legacy STF, a non-legacy CEF, multiple non-legacy header fields, and multiple data fields, a nominal data octet size computed on a basis of a nominal data field length in the legacy header field, and setting an Additional PPDU field included in the legacy header field to 0; setting an Additional PPDU field included in the legacy header field to 0; forming the A-PPDU in the nominal data field length or less; and transmitting the formed A-PPDU, wherein the nominal data field length is a time equal to or greater than a total of the non-legacy STF, the non-legacy CEF, the multiple non-legacy header fields, and the multiple data fields.

A communication method according to a fourth aspect of the present disclosure includes: receiving, with respect to an aggregate physical layer convergence protocol data unit (A-PPDU) including a legacy STF, a legacy CEF, a legacy header field, a non-legacy STF, a non-legacy CEF, multiple non-legacy header fields, and multiple data fields, the A-PPDU formed in a nominal data field length or less in which a nominal data octet size computed on a basis of the nominal data field length is set in the legacy header field and an Additional PPDU field included in the legacy header field is set to 0; and transmitting an Ack frame in response to the received A-PPDU, wherein the nominal data field length is a time equal to or greater than a total of the non-legacy STF, the non-legacy CEF, the multiple non-legacy header fields, and the multiple data fields.

The above describes various embodiments with reference to the drawings. However, the present disclosure obviously is not limited to such examples. It is clear to persons skilled in the art that various modifications or alterations may occur insofar as they are within the scope stated in the claims, and it is to be understood that such modifications or alterations obviously belong to the technical scope of the present disclosure. Furthermore, the structural elements in the foregoing embodiments may also be combined arbitrarily within a scope that does not depart from the gist of the disclosure.

In each of the embodiments above, the present disclosure is described by taking an example of using hardware, but it is also possible to realize the present disclosure with software working in cooperation with hardware.

In addition, each function block used in the description of each of the embodiments above typically is realized by an LSI chip, that is, an integrated circuit including one or more input terminals and one or more output terminals. The function blocks may be realized individually as separate chips, or as a single chip that includes some or all function blocks. Although LSI is discussed herein, the circuit integration methodology may also be referred to as IC, system LSI, super LSI, or ultra LSI, depending on the degree of integration.

Furthermore, the circuit integration methodology is not limited to LSI, and may be also be realized by using special-purpose circuits or general-purpose processors. A field-programmable gate array (FPGA) capable of being programmed after fabrication of the LSI chip, or a reconfigurable processor whose circuit cell connections and settings inside the LSI chip may be reconfigured, may also be used.

Furthermore, if circuit integration technology that may be substituted for LSI appears as a result of progress in semiconductor technology or another derived technology, obviously the new technology may be used to integrate the function blocks. Biotechnology applications and the like are also a possibility.

The present disclosure may be applied to a method of forming and transmitting aggregate physical layer convergence protocol data units (PPDUs).

What is claimed is:

1. A communication apparatus supporting communication over a legacy WiGig and over Enhanced Directional Multi-Gigabit (EDMG), the communication apparatus comprising:

a Physical layer Protocol Data Unit (PPDU) generation circuit that generates an aggregate physical layer convergence protocol data unit (A-PPDU) including a legacy Short Training Field (STF), a legacy Channel Estimation Field (CEF), a legacy header field, a non-legacy STF, a non-legacy CEF, multiple non-legacy header fields, and multiple data fields, each of the multiple non-legacy header fields including a first Length field indicating an actual octet size of a corresponding one of the multiple data fields, and the legacy header field including an Additional PPDU subfield set to 0 and a second Length subfield indicating a nominal octet size of a nominal data field length which is a time equal to or greater than a total duration of the non-legacy STF, the non-legacy CEF, the multiple non-legacy header fields, and the multiple data fields;

a transmission circuit that transmits the generated A-PPDU; and a reception circuit that receives an Ack frame in response to the transmitted A-PPDU.

2. The communication apparatus according to claim 1, wherein the nominal octet size of the nominal data field length is to be interpreted as an octet size of an actual data field length by a legacy communication partner apparatus that does not support communication over the EDMG.

3. A communication apparatus supporting communication over a legacy WiGig and over Enhanced Directional Multi-Gigabit (EDMG), the communication apparatus comprising:

a reception circuit that receives an aggregate physical layer convergence protocol data unit (A-PPDU) including a legacy Short Training Field (STF), a legacy Channel Estimation Field (CEF), a legacy header field, a non-legacy STF, a non-legacy CEF, multiple non-legacy header fields, and multiple data fields, each of the multiple non-legacy header fields including a first Length field indicating an actual octet size of a corresponding one of the multiple data fields, and the legacy header field including an Additional PPDU subfield set to 0 and a second Length subfield indicating a nominal octet size of a nominal data field length which is a time equal to or greater than a total duration of the non-legacy STF, the non-legacy CEF, the multiple non-legacy header fields, and the multiple data fields; and a transmission circuit that transmits an Ack frame in response to the received A-PPDU.

4. The communication apparatus according to claim 3, wherein the nominal octet size of the nominal data field length is to be interpreted as an octet size of an actual data field length by a legacy communication partner apparatus that does not support communication over the EDMG.

5. A communication method supporting communication over a legacy WiGig and over Enhanced Directional Multi-Gigabit (EDMG), the communication method comprising:

generating an aggregate physical layer convergence protocol data unit (A-PPDU) including a legacy Short Training Field (STF), a legacy Channel Estimation Field (CEF), a legacy header field, a non-legacy STF, a non-legacy CEF, multiple non-legacy header fields, and multiple data fields, each of the multiple non-legacy header fields including a first Length field indicating an actual octet size of a corresponding one of the multiple data fields, and the legacy header field including an Additional PPDU subfield set to 0 and a second Length subfield indicating a nominal octet size of a nominal data field length which is a time equal to or greater than a total duration of the non-legacy STF, the non-legacy CEF, the multiple non-legacy header fields, and the multiple data fields;

transmitting the generated A-PPDU; and receiving an Ack frame in response to the transmitted A-PPDU.

6. The communication method according to claim 5, wherein the nominal octet size of the nominal data field length is to be interpreted as an octet size of an actual data field length by a legacy communication partner apparatus that does not support communication over the EDMG.

7. A communication method supporting communication over a legacy WiGig and over Enhanced Directional Multi-Gigabit (EDMG), the communication method comprising:

receiving an aggregate physical layer convergence protocol data unit (A-PPDU) including a legacy Short Training Field (STF), a legacy Channel Estimation Field (CEF), a legacy header field, a non-legacy STF, a non-legacy CEF, multiple non-legacy header fields, and multiple data fields, each of the multiple non-legacy header fields including a first Length field indicating an actual octet size of a corresponding one of the multiple data fields, and the legacy header field including an Additional PPDU subfield set to 0 and a second Length subfield indicating a nominal octet size of a nominal data field length which is a time equal to or greater than a total duration of the non-legacy STF, the non-legacy CEF, the multiple non-legacy header fields, and the multiple data fields; and transmitting an Ack frame in response to the received A-PPDU.

8. The communication method according to claim 7, wherein the nominal octet size of the nominal data field length is to be interpreted as an octet size of an actual data field length by a legacy communication partner apparatus that does not support communication over the EDMG.

* * * * *